US008629342B2

(12) United States Patent
Lee et al.

(10) Patent No.: US 8,629,342 B2
(45) Date of Patent: Jan. 14, 2014

(54) MUSIC INSTRUCTION SYSTEM

(75) Inventors: Harold Lee, Sherman Oaks, CA (US); Roger B. Dannenberg, Pittsburgh, PA (US)

(73) Assignee: The Way of H, Inc., Sherman Oaks, CA (US)

( * ) Notice: Subject to any disclaimer, the term of this patent is extended or adjusted under 35 U.S.C. 154(b) by 428 days.

(21) Appl. No.: 12/775,665

(22) Filed: May 7, 2010

(65) Prior Publication Data

US 2011/0003638 A1    Jan. 6, 2011

Related U.S. Application Data

(60) Provisional application No. 61/222,909, filed on Jul. 2, 2009.

(51) Int. Cl.
*G10H 1/36* (2006.01)

(52) U.S. Cl.
USPC ............... 84/610; 84/477 R; 84/609; 84/634; 84/649; 84/650; 84/666

(58) Field of Classification Search
None
See application file for complete search history.

(56) References Cited

U.S. PATENT DOCUMENTS

| | | | |
|---|---|---|---|
| 5,567,162 | A | 10/1996 | Park |
| 5,690,496 | A | 11/1997 | Kennedy |
| 5,990,405 | A | 11/1999 | Auten et al. |
| 6,211,451 | B1 | 4/2001 | Tohgi et al. |
| 6,390,923 | B1 | 5/2002 | Yoshitomi et al. |
| 6,417,435 | B2 | 7/2002 | Chantzis et al. |
| 6,751,439 | B2 | 6/2004 | Tice et al. |
| 7,030,307 | B2 | 4/2006 | Wedel |
| 7,064,261 | B2 | 6/2006 | Shao |
| 7,164,076 | B2 | 1/2007 | McHale et al. |
| 7,320,643 | B1 * | 1/2008 | Brosius et al. .................. 463/37 |

(Continued)

FOREIGN PATENT DOCUMENTS

| | | |
|---|---|---|
| JP | 60-023352 B | 6/1985 |
| JP | 61-043795 A | 3/1986 |

(Continued)

OTHER PUBLICATIONS

International Search Report and Written Opinion dated Feb. 8, 2011 issued in corresponding PCT application No. PCT/US2010/040285, 8 pages.

(Continued)

*Primary Examiner* — Marlon Fletcher
(74) *Attorney, Agent, or Firm* — Snyder, Clark, Lesch & Chung, LLP

(57) ABSTRACT

A method includes receiving a user selection of a musical piece; providing performance cues to a user to perform musical events on a musical instrument, wherein the performance cues are synchronized to expert performance data of the musical piece; receiving audio data corresponding to musical events performed by the user on the musical instrument; detecting fundamental frequencies associated with the user-performed musical events; determining an extent to which the user-performed musical events have been correctly or incorrectly performed; providing real-time or near real-time audio feedback and/or visual feedback indicating the extent to which the user-performed musical events have been correctly or incorrectly performed; and using the expert performance data as real-time or near real-time audio and/or video feedback by controlling an output level of the expert performance data output to the user during a session.

30 Claims, 29 Drawing Sheets

(56) References Cited

U.S. PATENT DOCUMENTS

| | | | |
|---|---|---|---|
| 7,435,169 B2 | 10/2008 | Ozaki et al. | |
| 7,459,624 B2* | 12/2008 | Schmidt et al. | 84/477 R |
| 7,482,529 B1 | 1/2009 | Flamini et al. | |
| 7,521,619 B2* | 4/2009 | Salter | 84/477 R |
| 7,547,840 B2 | 6/2009 | Noh et al. | |
| 7,579,541 B2 | 8/2009 | Guldi | |
| 7,923,620 B2* | 4/2011 | Foster | 84/477 R |
| 7,935,880 B2* | 5/2011 | Stoddard et al. | 84/609 |
| 7,982,114 B2* | 7/2011 | Applewhite et al. | 84/477 R |
| 8,003,872 B2* | 8/2011 | Lopiccolo et al. | 84/609 |
| 8,026,435 B2* | 9/2011 | Stoddard et al. | 84/477 R |
| 8,076,564 B2* | 12/2011 | Applewhite | 84/477 R |
| 8,079,901 B2* | 12/2011 | Brosius et al. | 463/7 |
| 8,080,722 B2* | 12/2011 | Applewhite et al. | 84/609 |
| 2002/0088337 A1 | 7/2002 | Devecka | |
| 2003/0110925 A1 | 6/2003 | Sitrick et al. | |
| 2004/0237756 A1 | 12/2004 | Forbes | |
| 2005/0031212 A1 | 2/2005 | Suino | |
| 2006/0058101 A1 | 3/2006 | Rigopulos | |
| 2006/0107826 A1 | 5/2006 | Knapp et al. | |
| 2007/0028751 A1 | 2/2007 | Hindman | |
| 2007/0232374 A1 | 10/2007 | Lopiccolo et al. | |
| 2007/0234885 A1* | 10/2007 | Schmidt et al. | 84/722 |
| 2007/0256540 A1* | 11/2007 | Salter | 84/485 R |
| 2007/0256541 A1 | 11/2007 | McCauley | |
| 2007/0256543 A1 | 11/2007 | Evans et al. | |
| 2007/0256551 A1 | 11/2007 | Knapp et al. | |
| 2008/0200224 A1 | 8/2008 | Parks | |
| 2008/0271591 A1 | 11/2008 | Lemons | |
| 2009/0025538 A1 | 1/2009 | Arimoto | |
| 2009/0038467 A1 | 2/2009 | Brennan | |
| 2009/0038468 A1 | 2/2009 | Brennan | |
| 2009/0104956 A1 | 4/2009 | Kay et al. | |
| 2010/0300264 A1* | 12/2010 | Foster | 84/610 |
| 2010/0300265 A1* | 12/2010 | Foster et al. | 84/610 |
| 2010/0300266 A1* | 12/2010 | Stoddard et al. | 84/610 |
| 2010/0300268 A1* | 12/2010 | Applewhite et al. | 84/610 |
| 2010/0300269 A1* | 12/2010 | Applewhite | 84/610 |
| 2010/0304863 A1* | 12/2010 | Applewhite et al. | 463/36 |
| 2011/0247479 A1* | 10/2011 | Helms et al. | 84/613 |
| 2011/0259176 A1* | 10/2011 | Pillhofer et al. | 84/470 R |
| 2011/0283867 A1* | 11/2011 | Ihara | 84/478 |

FOREIGN PATENT DOCUMENTS

| | | |
|---|---|---|
| JP | 01-126677 A | 5/1989 |
| JP | 01-248198 A | 10/1989 |
| JP | 02-077878 | 3/1990 |
| JP | 04-038355 B | 6/1992 |
| JP | 08-305356 A | 11/1996 |
| JP | 10-116088 A | 5/1998 |
| JP | 2001282095 A | 10/2001 |
| JP | 2007-264280 A | 10/2007 |
| JP | 2008-170789 A | 7/2008 |
| WO | 2008157477 A3 | 12/2008 |

OTHER PUBLICATIONS

Tim Conneally, "The Next Entry in the 'Guitar Hero' Genre Promises to Teach Real Guitar," 2010, 2 pages from http://www.betanews.com/article/The-next-entry-in-the-Guitar-Hero-genre-promises-to-teach-real-guitar/1263414648.

Littlebigstar Website, 2 pages from http://littlebigstar.net/main/, print date May 20, 2010.

Amazing Guitar Recognition Engine, Jam Origin Website, 2010, 1 page from http://www.JamOrigin.com/.

Zhiyao Duan et al., "Harmonically Informed Multi-Pitch Tracking," $10^{th}$ International Society for Music Information Retrieval Conference, 2009, pp. 333-338.

Paul Brossier et al., "Real-Time Temporal Segmentation of Note Objects in Musical Signals," 2004, 4 pages.

Jörn Loviscach, "Projecting Finger Placement onto the Fretboard," Proceedings of the International Computer Music Conference, 2009, pp. 279-282.

Jammit Iphone Software, Jammit Website, 1 page from http://www.jammit.com/, print date May 14, 2010.

Paul Lorton, Jr. et al., "Research on Computer-Assisted Instruction in Music," pp. 877-893.

StarPlayit Music Performance Technology Platforms, Starplayit Website, 1 page from http://starplayit.com/, print date May 14, 2010.

Anssi Klapuri, "A Perceptually Motivated Multiple-F0 Estimation Method," 2005 IEEE Workshop on Applications of Signal Processing to Audio and Acoustics, 4 pages.

Anssi Klapuri, "Multiple Fundamental Frequency Estimation by Summing Harmonic Amplitudes," 2006, 6 pages.

Extended European Search Report dated Jan. 14, 2013 issued in corresponding European application No. 10794612.1, 8 pages.

* cited by examiner

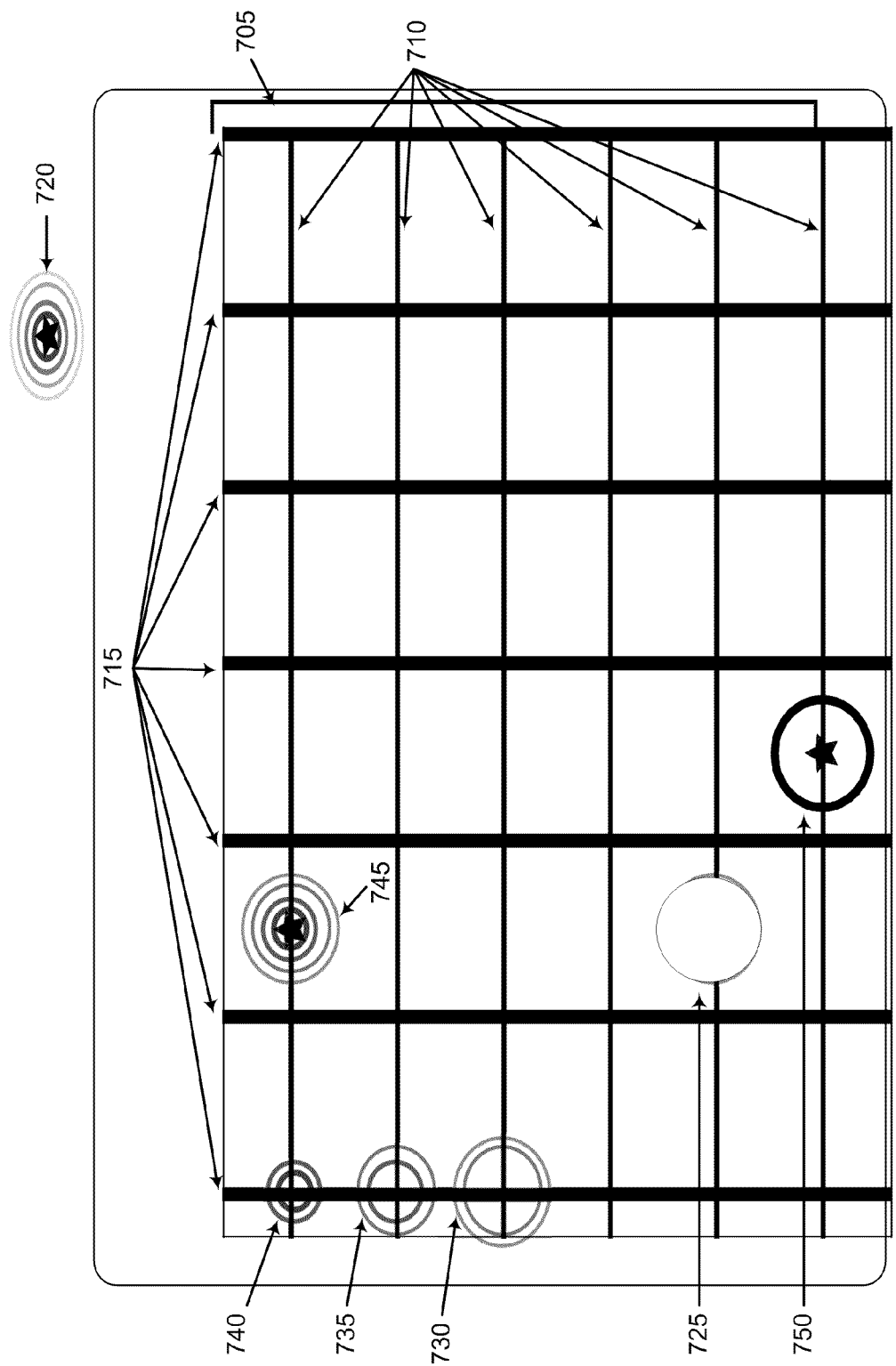

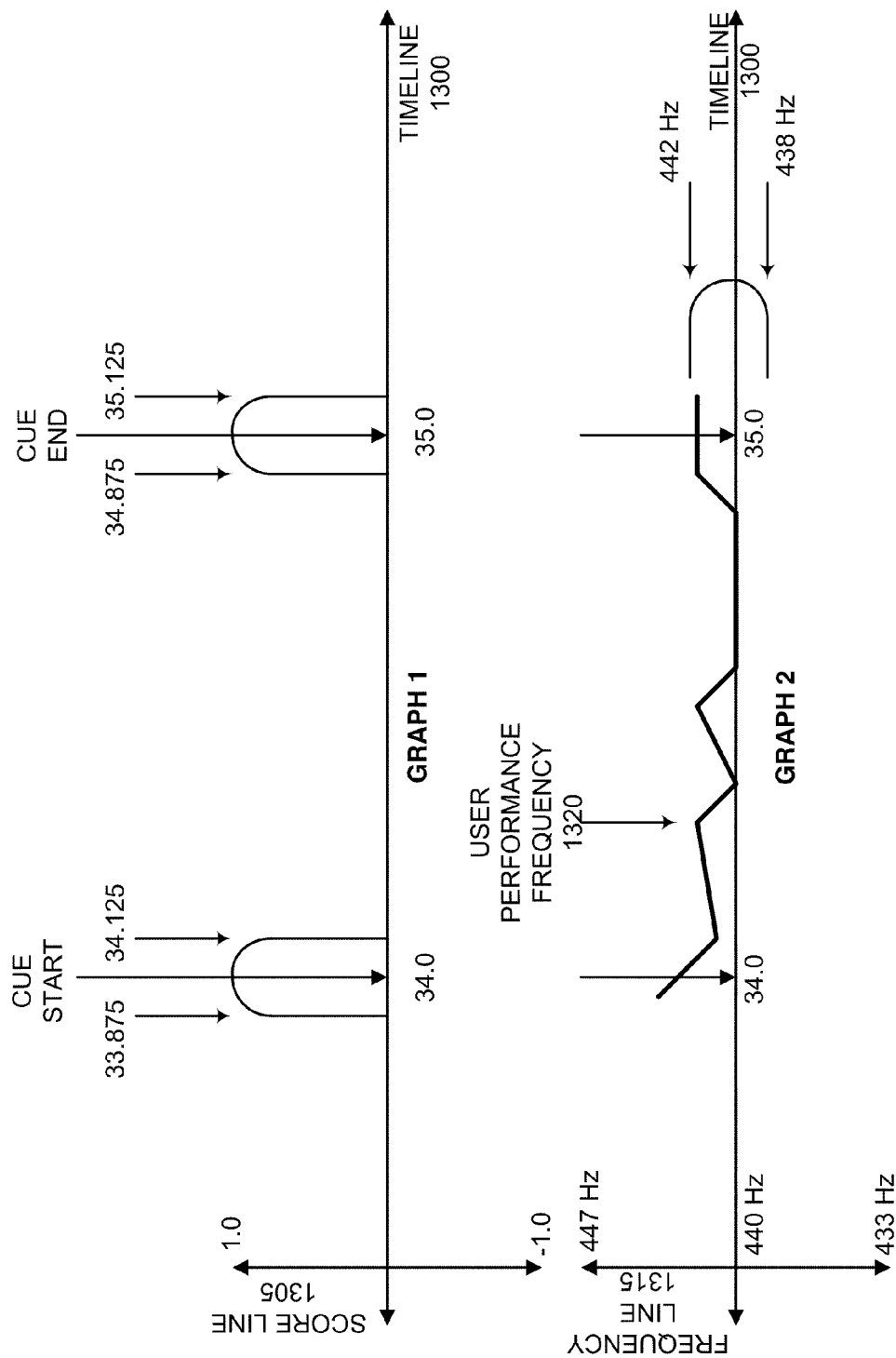

Your Score:
128,924

Congratulations!
You scored over 100,000 points

You have unlocked another song!
Choose one:

○ "Moonlight Sonata"
for guitar
Beethoven

● "Choro No. 1"
Heitor Villa-Lobos

○ "Roundabout"
Yes

|  | hours | sessions started | sessions complete | high score | session difficulty | average score | accuracy average |
|---|---|---|---|---|---|---|---|
| last year | 960 | 11,520 | 8,064 | 170,000 | 6.00 | 60,000 | 75% |
| last month | 80 | 960 | 720 | 180,000 | 7.00 | 70,000 | 80% |
| last week | 20 | 240 | 192 | 200,000 | 7.50 | 80,000 | 85% |
| this week | 10 | 120 | 108 | 220,000 | 8.00 | 85,000 | 90% |
| total | 1,070 | 12,840 | 9,084 | 220,000 | 6.13 | 61,513 | 75.79% |

| frets → | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| tuning | | | | | | | | | | | | | | | |
| 1 E | E | F | F# | G | G# | A | A# | B | C | C# | D | D# | E | F | F# |
| FREQ | 329.23 | 349.23 | 369.99 | 392 | 415.3 | 440 | 466.16 | 493.88 | 523.25 | 554.37 | 587.33 | 622.25 | 659.26 | 698.46 | 739.99 |
| MIDI NOTE | 64 | 65 | 66 | 67 | 68 | 69 | 70 | 71 | 72 | 73 | 74 | 75 | 76 | 77 | 78 |
| NOTE-OCTAVE | E4 | F4 | F#4 | G4 | G#4 | A4 | A#4 | B4 | C5 | C#5 | D5 | D#5 | E5 | F5 | F#5 |
| 2 B | B | C | C# | D | D# | E | F | F# | G | G# | A | A# | B | C | C# |
| FREQ | 246.94 | 261.63 | 277.18 | 293.67 | 311.13 | 329.23 | 349.23 | 369.99 | 392 | 415.3 | 440 | 466.16 | 493.88 | 523.25 | 554.37 |
| MIDI NOTE | 59 | 60 | 61 | 62 | 63 | 64 | 65 | 66 | 67 | 68 | 69 | 70 | 71 | 72 | 73 |
| NOTE-OCTAVE | B3 | C4 | C#4 | D4 | D#4 | E4 | F4 | F#4 | G4 | G#4 | A4 | A#4 | B4 | C5 | C#5 |
| 3 G | G | G# | A | A# | B | C | C# | D | D# | E | F | F# | G | G# | A |
| FREQ | 196 | 207.65 | 220 | 233.08 | 246.94 | 261.63 | 277.18 | 293.67 | 311.13 | 329.23 | 349.23 | 369.99 | 392 | 415.3 | 440 |
| MIDI NOTE | 55 | 56 | 57 | 58 | 59 | 60 | 61 | 62 | 63 | 64 | 65 | 66 | 67 | 68 | 69 |
| NOTE-OCTAVE | G3 | G#3 | A3 | A#3 | B3 | C4 | C#4 | D4 | D#4 | E4 | F4 | F#4 | G4 | G#4 | A4 |
| 4 D | D | D# | E | F | F# | G | G# | A | A# | B | C | C# | D | D# | E |
| FREQ | 146.83 | 155.56 | 164.81 | 174.61 | 185 | 196 | 207.65 | 220 | 233.08 | 246.94 | 261.63 | 277.18 | 293.67 | 311.13 | 329.23 |
| MIDI NOTE | 50 | 51 | 52 | 53 | 54 | 55 | 56 | 57 | 58 | 59 | 60 | 61 | 62 | 63 | 64 |
| NOTE-OCTAVE | D3 | D#3 | E3 | F3 | F#3 | G3 | G#3 | A3 | A#3 | B3 | C4 | C#4 | D4 | D#4 | E4 |
| 5 A | A | A# | B | C | C# | D | D# | E | F | F# | G | G# | A | A# | B |
| FREQ | 110 | 116.54 | 123.47 | 130.81 | 138.59 | 146.83 | 155.56 | 164.81 | 174.61 | 185 | 196 | 207.65 | 220 | 233.08 | 246.94 |
| MIDI NOTE | 45 | 46 | 47 | 48 | 49 | 50 | 51 | 52 | 53 | 54 | 55 | 56 | 57 | 58 | 59 |
| NOTE-OCTAVE | A2 | A#2 | B2 | C3 | C#3 | D3 | D#3 | E3 | F3 | F#3 | G3 | G#3 | A3 | A#3 | B3 |
| 6 E | E | F | F# | G | G# | A | A# | B | C | C# | D | D# | E | F | F# |
| FREQ | 82.407 | 87.307 | 92.499 | 97.999 | 103.83 | 110 | 116.54 | 123.47 | 130.81 | 138.59 | 146.83 | 155.56 | 164.81 | 174.61 | 185 |
| MIDI NOTE | 40 | 41 | 42 | 43 | 44 | 45 | 46 | 47 | 48 | 49 | 50 | 51 | 52 | 53 | 54 |
| NOTE-OCTAVE | E2 | F2 | F#2 | G2 | G#2 | A2 | A#2 | B2 | C3 | C#3 | D3 | D#3 | E3 | F3 | F#3 |

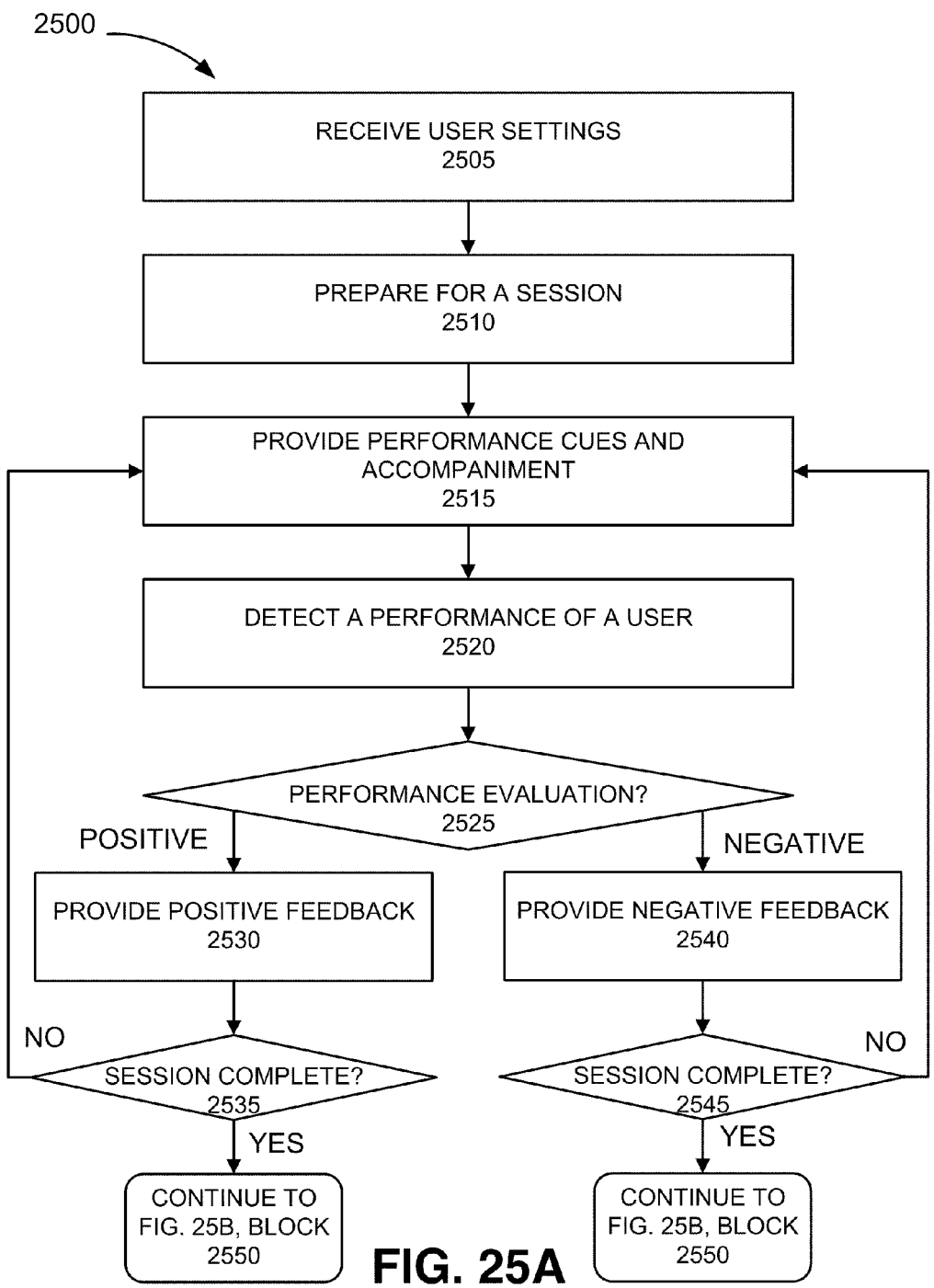

MUSIC INSTRUCTION SYSTEM

CROSS REFERENCE TO RELATED APPLICATION

This application claims priority under 35 U.S.C. §119 based on U.S. provisional application No. 61/222,909, filed Jul. 2, 2009, the disclosure of which is hereby incorporated by reference herein in its entirety.

BACKGROUND

Interactive games with musical themes have been introduced in which a user utilizes a game controller to simulate a performance of a song. For example, these interactive games may display a scrolling time-line that indicates when to press a button on the game controller, sing into the game controller, or strike the game controller (e.g., a drum). While these interactive games may be entertaining, such interactive games do not teach the user to play a real musical instrument.

BRIEF DESCRIPTION OF THE DRAWINGS

FIGS. 6-7B are diagrams illustrating exemplary performance cues when the musical instrument corresponds to a guitar;

FIG. 13 is a diagram illustrating an exemplary process in which the music instruction system may evaluate a musical event and score the musical event;

FIG. 19 is a diagram illustrating an exemplary user interface of the music instruction system that allows a user to select a musical piece based on a user's overall score;

FIG. 21 is a diagram illustrating an exemplary user interface of the music instruction system that may summarize a user's progress of music instruction over time;

FIG. 22 is a diagram illustrating an exemplary process in which the music instruction system may track the skill of a user according to musical genres;

FIG. 23 is a diagram illustrating an exemplary conversion chart that may be used by the music instruction system;

FIGS. 25A and 25B are diagrams illustrating an exemplary process in which the music instruction system may provide a session to a user.

DETAILED DESCRIPTION OF PREFERRED EMBODIMENTS

Figure 1:
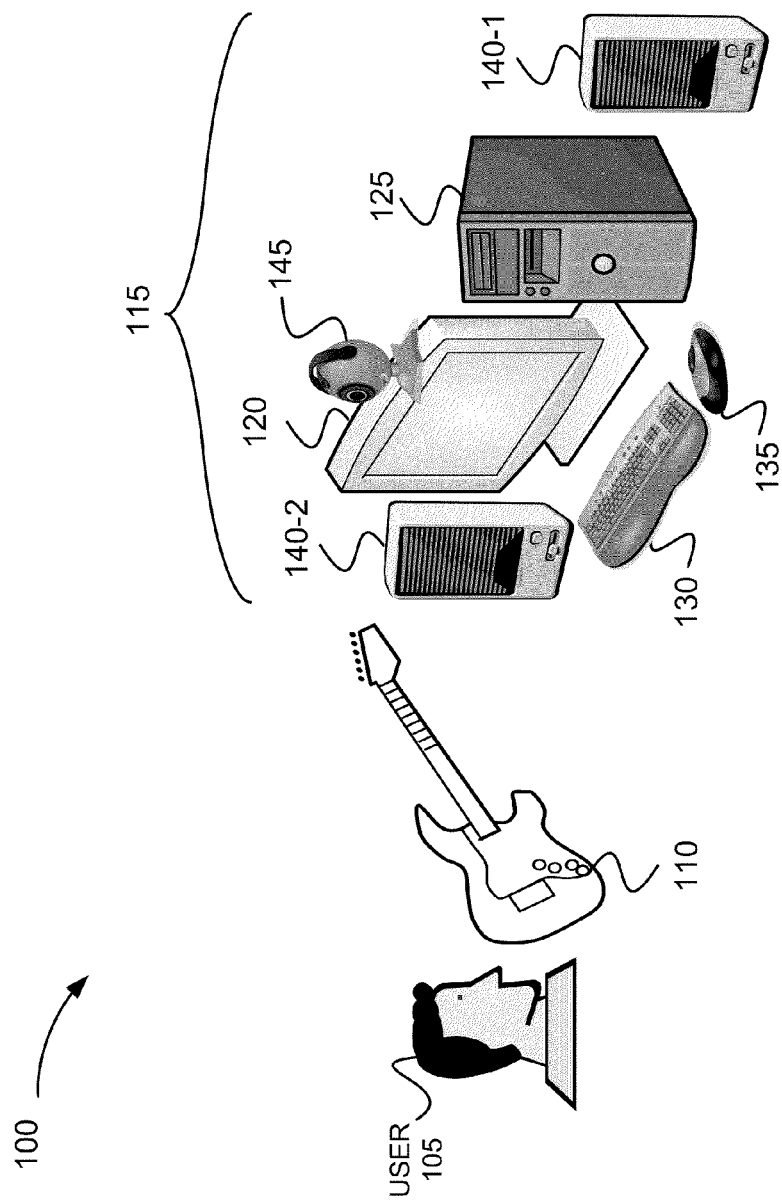
FIG. 1 is a diagram illustrating an exemplary environment in which an embodiment of an exemplary music instruction system may be implemented.

The following detailed description refers to the accompanying drawings. The same reference numbers in different drawings may identify the same or similar elements. Also, the following detailed description does not limit the invention.

The term "music instruction system," as used herein, is intended to be broadly interpreted to include a device or a system capable of providing musical instruction for playing a musical instrument. By way of example, but not limited thereto, the music instruction system may correspond to a computer, a game system or game console, a communication device, a client and a server arrangement via a network, a peer-to-peer arrangement, an application service provider (ASP) arrangement, network device residing in the Internet, etc. The music instruction system may be implemented in a distributed manner utilizing one or more devices or systems or in a centralized manner utilizing one or more devices or systems.

The term "musical instrument," as used herein, is intended to be broadly interpreted to include an instrument capable of producing sound. By way of example, but not limited thereto, a musical instrument may correspond to a wind instrument, a single reed instrument, a double reed instrument, a brass instrument, a string instrument, an electronic instrument, a keyboard instrument, drum(s), a percussion instrument, or a human voice. The term "musical instrument," is not intended to be interpreted to include a virtual musical instrument. By way of example, but not limited thereto, a virtual musical instrument may correspond to a game controller, such as a guitar controller utilized in Guitar Hero® or Rock Band® video games.

The term "musical piece," as used herein, is intended to be broadly interpreted to include an assembly of musical events. By way of example, but not limited thereto, a musical piece may correspond to a song (an instrumental with or without lyrics), a musical composition (e.g., a sonata, a concerto, etc.), a vocal piece, a fingering exercise, a musical scale, a beat or a rhythm, chord fingerings, a harmonic progression, or the like.

The term "musical event," as used herein, is intended to be broadly interpreted to include a sound producing event. By way of example, but not limited thereto, a musical event may correspond to a note, a vocal utterance (e.g., speech, etc.), or a percussive sound.

The term "musical data," as used herein, is intended to be broadly interpreted to include data used by the music instruction system. By way of example, but not limited thereto, musical data may include audio data (e.g., accompaniment audio tracks, expert performance audio tracks, audio performance cue data, audio feedback data, audio waveform data, etc.), visual data (e.g., expert performer video tracks, user video tracks, visual performance cue data, visual feedback data, etc.), musical piece data (e.g., artist, chords, melody, music theory, etc.), as well as other types of data described in this description.

According to exemplary embodiments described herein, a music instruction system may provide musical instruction to a user for playing a musical instrument. As previously described, according to an exemplary embodiment, the music instruction system may include a computer. By way of example, but not limited thereto, the computer may correspond to a desktop computer, a laptop computer, a handheld computer, or the like. According to another exemplary embodiment, the music instruction system may include a game system. By way of example, but not limited thereto, the game system may correspond to a Microsoft® Xbox, a Sony® PlayStation (II, III, etc.), a Nintendo® Wii, or the like. According to yet another exemplary embodiment, the music instruction system may include a communication device. By way of example, but not limited thereto, the communication device may correspond to an Apple® iPhone, an Apple® iPod, a Motorola® Droid, or the like. In still other embodiments, the music instruction system may include a client/server architecture. By way of example, but not limited thereto, the client/server architecture may correspond to the computer, the game system, or the communication device communicatively coupled to a server or another type of network device on the Internet. The music instruction system may also include combinations of the above device-types, as well as other arrangements as described herein.

According to an exemplary embodiment described herein, the music instruction system may provide a user with various visual and auditory instructional guides. For example, the music instruction system may include scrolling waveforms to give a user a visualization of the sound associated with a musical piece. According to an exemplary implementation, the scrolling waveforms may correspond to an expert's performance of the musical piece and the user's performance of the musical piece or performance cues. The music instruction system may provide performance cues that are synchronized to musical data (e.g., pre-recorded tracks, etc.). The performance cues may be specific to the user's musical instrument. Additionally, the music instructions system may display a video image of the user to permit the user to see himself/herself while performing. The music instruction system may also provide the user with a score corresponding to the user's performance.

Further, according to an exemplary embodiment, the music instruction system may use one or multiple fundamental frequency detection algorithms to detect frequencies associated with musical events (e.g., notes) played by the user. For example, the music instruction system may select one or multiple fundamental frequency detection algorithms depending on the musical instrument, the musical piece, a particular passage in the musical piece, etc. The music instruction system may provide to the user various types of feedback (e.g., visual feedback, auditory feedback, etc.) to the user. The music instruction system may provide a user with a particular type of feedback (e.g., positive feedback, negative feedback, etc.) based on, among other things, whether a musical event is played correctly or not, and/or how correctly or incorrectly the musical event is played (i.e., an extent with which a musical event is correctly/incorrectly played in terms of pitch, amplitude, onset time, etc.).

FIG. 1 is a diagram illustrating an exemplary environment 100 in which an embodiment of an exemplary music instruction system may be implemented. As illustrated in FIG. 1, environment 100 may include a user 105, a musical instrument 110, and a music instruction system 115.

The number of devices and configuration in environment 100 is exemplary and provided for simplicity. In practice, environment 100 may include more devices, fewer devices, different devices, and/or differently arranged devices than those illustrated in FIG. 1. Also, some functions described as being performed by a particular device may be performed by a different device or a combination of devices. Additionally, or alternatively, in other implementations, a device may include a combination of devices.

User 105 may be a person that performs with musical instrument 110. In this example, musical instrument 110 may correspond to a string instrument, such as a guitar. Further, in this example, music instruction system 115 may correspond to a computer system. For example, as illustrated in FIG. 1, the computer system may include a display 120, a computer 125, a keyboard 130, a mouse 135, speakers 140-1 and 140-2 (generally referred to as speakers 140), and a camera 145.

Musical instrument 110 may be connected to music instruction system 115 to provide music instruction system 115, among other things, its audio output. By way of example, but not limited thereto, musical instrument 110 may be connected to music instruction system 115 via a cable, a microphone, or a pickup, depending on the type of musical instrument 110. In this example, musical instrument 110 (i.e., the guitar) may be connected to an input of music instruction system 115 via a cable (not illustrated).

Display 120 may include a device capable of providing visual output. For example, display 120 may correspond to a computer monitor or a television. According to an exemplary implementation, display 120 may include a touch screen. According to other exemplary implementations, display 120 may not include a touch screen and/or may not be utilized as an input device. Computer 125 may include a computational device. According to an exemplary implementation, computer 125 may operate according to an operating system (e.g., Windows, Macintosh, Linux, etc.). In this example, computer 125 may correspond to a desktop computer. Keyboard 130 and mouse 135 may include devices that permit user 105 to input information into and navigate on computer 125. Speakers 140 may include a device that provides auditory output. According to other implementations, for example, speakers 140 may be associated with an audio system (e.g., a stereo system, etc.) or incorporated within display 120. Camera 145 may include a device capable of capturing visual images, such as pictures and/or video. In this example, camera 145 may correspond to a web cam. However, according to other implementations, for example, camera 145 may correspond to a camcorder or some other type of video camera. The visual images may be displayed on display 120. Music instruction system 115 may send and/or receive visual images to/from other persons (e.g., other users, a remote instructor, etc.) via a network (e.g., the Internet, etc.).

According to an exemplary operation, music instruction system 115 may provide user 105 musical instruction for playing musical instrument 110. As will be described herein, music instruction system 115 may provide user 105 with various user interfaces to assist user 105 in his/her performance of a musical piece. Music instruction system 115 may detect musical events performed by user 105 based on one or more frequency detection algorithms, which are described further below.

Figure 2:
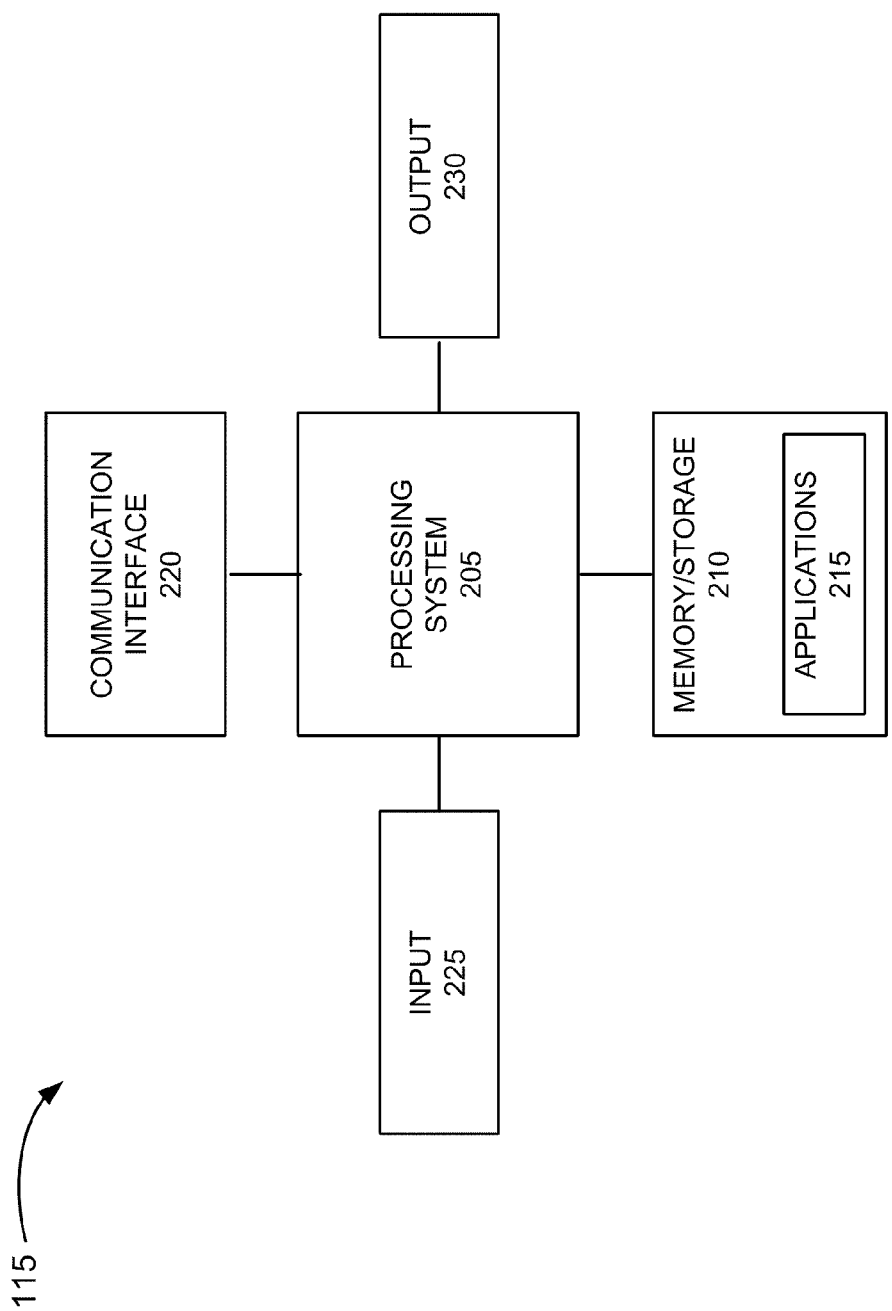
FIG. 2 is a diagram illustrating exemplary components of an exemplary music instruction system.

FIG. 2 is a diagram illustrating exemplary components of music instruction system 115. As illustrated, according to an exemplary implementation of music instruction system 115, music instruction system 115 may include a processing system 205, memory/storage 210 including applications 215, a communication interface 220, an input 225, and an output 230. According to other implementations, music instruction system 115 may include fewer components, additional components, different components, and/or a different arrangement of components than those illustrated in FIG. 2 and described herein.

Processing system 205 may include a processor, a microprocessor, a co-processor, an application specific integrated circuit (ASIC), a controller, a programmable logic device, a chipset, a field programmable gate array (FPGA), or some other component that may interpret and/or execute instructions and/or data. Processing system 205 may control the overall operation, or a portion thereof, of music instruction system 115, based on, for example, an operating system and one or more applications (e.g., applications 215).

Memory/storage 210 may include a memory and/or a secondary storage. For example, memory/storage 210 may include a random access memory (RAM), a dynamic random access memory (DRAM), a read only memory (ROM), a programmable read only memory (PROM), a flash memory, and/or some other type of memory. Memory/storage 210 may include a hard disk (e.g., a magnetic disk, an optical disk, a magneto-optic disk, a solid state disk, etc.) or some other type of computer-readable medium, along with a corresponding drive. Memory/storage 210 may include a memory, a storage device, or storage component that is external to and/or removable from music instruction system 115, such as, for example, a Universal Serial Bus (USB) memory stick, a hard disk, mass storage, off-line storage, cloud computing, etc.

The term "computer-readable medium," as used herein, is intended to be broadly interpreted to include, for example, a memory, a storage device (e.g., a hard disk and corresponding drive), a compact disc (CD), a digital versatile disc (DVD), or the like. The computer-readable medium may be implemented in a single device, in multiple devices, in a centralized manner, or in a distributed manner. Memory/storage 210 may store data, applications 215, and/or instructions related to the operation of music instruction system 115.

Applications 215 may include software that provides various services, functions, user interfaces, or the like. According to an exemplary implementation, applications 215 may include a music instruction application that provides one or more of the processes related to instructing a user to play a musical instrument. For example, theses processes may include providing user interfaces, detecting fundamental frequencies, scoring, providing feedback to the user, and/or other functions associated with music instruction system 115, as described herein. Applications 215 may be stored in memory/storage 210.

Communication interface 220 may permit music instruction system 115 to communicate with other devices, networks, systems and/or the like. Communication interface 220 may include a wireless interface and/or a wired interface. Communication interface 220 may operate according to one or more protocols, standards, and/or the like. Communication interface 220 may include a receiver, a transmitter, and/or a transceiver.

Input 225 may permit an input into music instrument system 115. For example, input 225 may include a button, a keypad, a knob, a touchpad, keyboard 130, an input port, display 120, a microphone, mouse 135, voice recognition logic, fingerprint recognition logic, a web cam (e.g., camera 145), and/or some other type of input component.

Output 230 may permit music instrument system 115 to provide an output. For example, output 230 may include display 120, light emitting diodes (LEDs), an output port, speakers 140, a vibratory mechanism, and/or some type of output component.

As described herein, according to an exemplary embodiment, music instrument system 115 may perform one or more processes in response to processing system 205 executing software instructions contained in a computer-readable medium, such as memory/storage 210. The software instructions may be read from memory/storage 210 or received from another device via communication interface 220. The software instructions may cause processing system 205 to perform processes described herein. Alternatively, music instruction system 115 may perform processes in response to processing system 205, or other combinations with processing system 205 (e.g., hardware and firmware, hardware, software and firmware).

Figure 3:
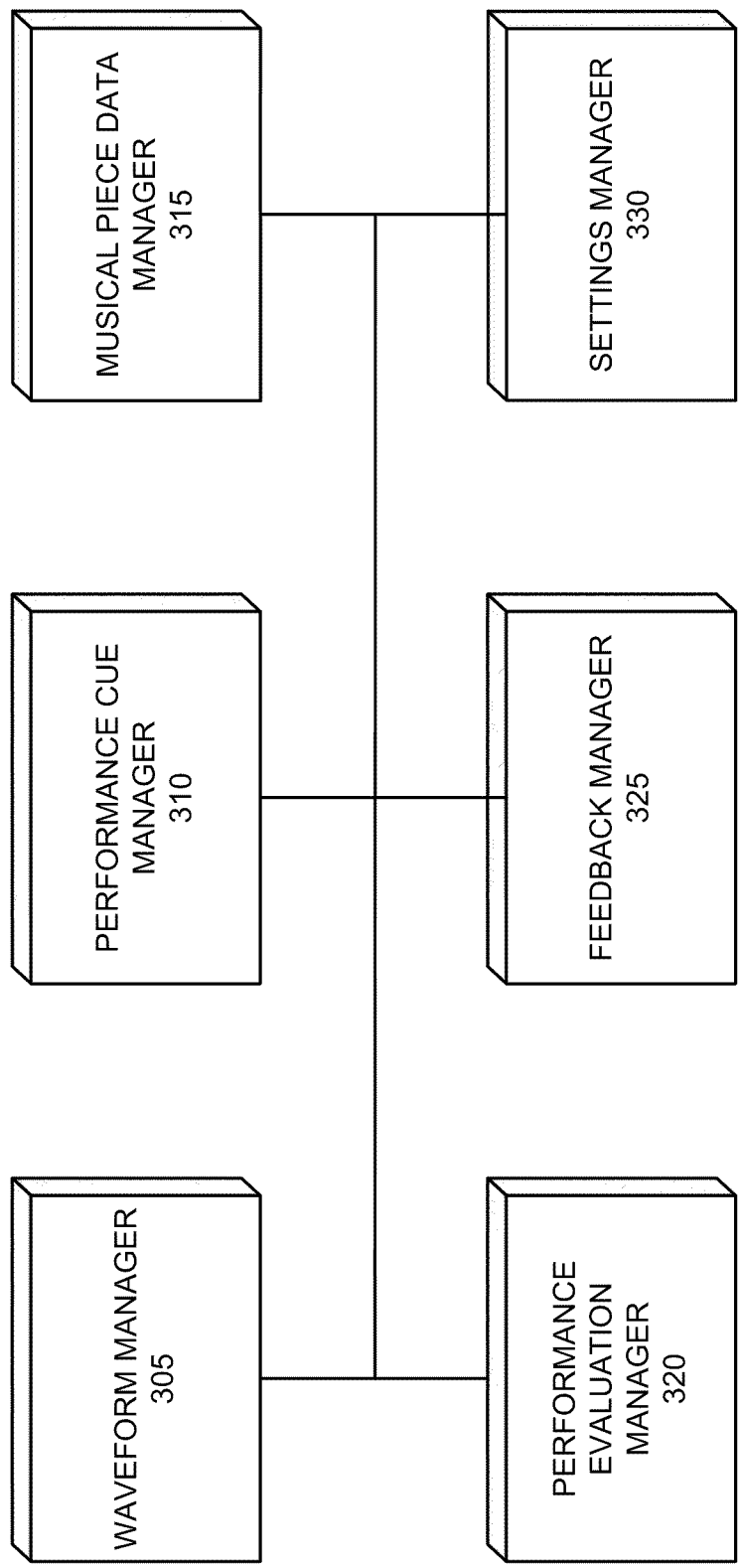
FIG. 3 is a diagram illustrating exemplary functional components associated with an exemplary music instruction system.

FIG. 3 is a diagram illustrating exemplary functional components associated with music instruction system 115. As illustrated, music instruction system 115 may include a waveform manager 305, a performance cue manager 310, a musical piece data manager 315, a performance evaluation manager 320, a feedback manager 325, and a settings manager 330. Waveform manager 305, performance cue manager 310, musical piece data manager 315, performance evaluation manager 320, feedback manager 325, and/or settings manager 330 may be implemented as a combination of hardware (e.g., processing system 205, memory/storage 210) and software (e.g., applications 215) based on the components illustrated and described with respect to FIG. 2. Alternatively, waveform manager 305, performance cue manager 310, musical piece data manager 315, performance evaluation manager 320, feedback manager 325, and/or settings manager 330 may be implemented as hardware and firmware or hardware, software, and firmware.

Waveform manager 305 may manage audio waveform data. According to an exemplary implementation, waveform manager 305 may display a waveform corresponding to an expert performance of the musical piece. As described further below, music instruction system 115 may use musical data, which includes pre-recorded audio tracks, during a session. The pre-recorded audio tracks may include, among other things, audio tracks corresponding to expert performances of musical pieces. Waveform manager 305 may select an expert performance audio track from the musical data according to the musical piece and/or the musical instrument to be performed during the session. Waveform manager 305 may display a waveform representative of the expert performance audio track. According to an exemplary implementation, the waveform may scroll and include other indicators (e.g., a cue line to indicate a current time position of the expert performance, etc.), similarity scores, etc., as will be described further below.

Additionally, or alternatively, according to an exemplary implementation, waveform manager 305 may display a waveform representative of a user's performance of the musical piece. For example, waveform manager 305 may process an input from the user's musical instrument to generate and display a scrolling waveform representative of the user's performance of the musical piece.

The waveform of the expert performance audio track may be displayed in real-time and the waveform of the user's performance may be displayed in real-time or substantially in real-time as the user performs the musical piece. In instances when waveform manager 305 displays both of the waveforms, the user may be able to make a visual comparison, which may be useful to the user during the user's performance. The visual comparison may offer the user further insight with respect to various musical characteristics associated with musical events in the musical piece, such as, for example, timing (e.g., onset of musical event, ending of musical event), amplitude, timbre, and/or other musical characteristics associated with musical events. For example, the visual comparison may allow the user to discern when an attack of a musical event occurs, a sustain portion of a musical event occurs, an amplitude of a musical event, etc., and allow the user to adjust his/her performance to make the scrolling waveforms look substantially the same.

Additionally, as previously described, waveform manager 305 may display similarity scores. The similarity scores may indicate a degree of similarity between both waveforms. According to an exemplary embodiment, waveform manager 305 may perform a comparison between the waveform of the expert performance audio track and the waveform of the user's performance. Waveform manager 305 may use conventional methods for performing the waveform comparison. Waveform manager 305 may generate similarity scores for portions of the musical piece (e.g., measure-by-measure, section-by-section (e.g., verse, chorus, bridge, etc.)) and/or an overall similarity score (e.g., the entire musical piece). The user may discern from the similarity score(s) how well the user is performing the musical piece relative to the expert performance.

Performance cue manager 310 may manage performance cue data. The performance cue data may include visual performance cues and auditory performance cues associated with musical pieces. For example, performance cue manager 310 may display a variety of visual performance cues (e.g., tablatures, standard music notation (i.e., staff(s) with notes), fingerings, etc.) during a session. Performance cue manager 310 may display different visual performance cues depending on the user's musical instrument. For example, performance cues for a guitar may include a moving guitar tablature, performance cues for a piano may include a moving piano key tablature, performance cues for drums may include a moving drum kit tablature, etc.

Additionally, or alternatively, performance cues may include standard music notation corresponding to the user's particular musical instrument. According to an exemplary embodiment, the standard music notation may correspond to a transcription of an expert performance of a musical piece. For example, according to an exemplary implementation, if the musical piece corresponds to, for example, a classic rock song (e.g., Stairway To Heaven), the standard music notation may correspond to a note-by-note transcription of a performance of the classic rock song as performed by the artist (e.g., Led Zeppelin, Jimmy Page). According to another exemplary implementation, the transcription may correspond to an expert performance of the musical piece; however, the transcription may not be a note-by-note transcription. Rather, the transcription may be representative of the artist's performance. By way of example, but not limited thereto, assume, a guitar lead includes multiple guitar parts (e.g., overlapping parts, a duo, a trio, etc.). In such a case, the transcription may not be a note-for-note transcription. Rather, the transcription may include cherry-picked notes performed by the artist(s) that best represent the overall performance or some other reduction, simplification, derivative, complementary and/or interpretation of the notes performed by the artist(s). According to other exemplary implementations, the standard music notation may not be derived from a transcription of an expert performance. For example, expert performances of classical musical pieces (e.g., Bach Concertos, etc.) may correspond exactly to the musical piece, as originally written. Performance cue manager 310 may also use different versions of the standard music notation, as well as other forms of visual performance cues, in correspondence to a difficulty level of the session.

Additionally, or alternatively, performance cues may include fingering positions for musical events (e.g., chords, melody notes, etc.) in correspondence to the user's musical instrument. For example, performance cue manager 310 may display a representation of a guitar neck along with fingering positions to demonstrate how to perform the musical events, as described further below.

Performance cue manager 310 may provide various auditory performance cues. For example, performance cue manager 310 may play a metronome, vocal coaching tracks (e.g., associated with a virtual mentor/instructor/coach), etc., during a session. Performance cue manager 310 may provide different auditory performance cues depending on the user's musical instrument. For example, vocal coaching tracks may provide instructive remarks related to a passage in the musical piece and specific to the user's musical instrument. Examples of performance cue data are described further below in this description.

Musical piece data manager 315 may manage musical piece data. For example, musical piece data may include visual musical piece data and auditory musical piece data. For example, musical piece data manager 315 may display a variety of visual musical piece data, such as, for example, a title, a name of an artist, a name of a composer, an original publication date, and/or a genre (e.g., country, rock, blues, etc.) associated with the musical piece. Additionally, or alternatively, for example, musical piece data manager 315 may display tempo information, a time signature, a key, a section of a musical piece (e.g., verse, chorus, solo, bridge, etc.), a current bar, a current beat, a current chord, a next chord, a current melody note, a next melody note, and/or other data (e.g., music theory information, etc.) associated with the musical piece. According to an exemplary implementation, musical piece data manager 315 may display musical piece data in synchronization with a time-code associated with musical data. Musical piece data manager 315 may assist the user in developing his/her musical interpretation, style, musical knowledge, etc.

Musical piece data manager 315 may play various auditory musical piece data (e.g., accompaniment audio tracks, expert performance audio tracks) associated with a musical piece. For example, an accompaniment audio track may include a recording of an accompaniment performance of a musical piece and an expert performance audio track may include a recording of an expert performance of a musical piece performed on the same type of musical instrument as the user's musical instrument. According to an exemplary embodiment, as described further below, feedback manager 325 may govern the playing of expert performance audio tracks by musical piece data manager 315 during a session. For example, music instruction system 115 may use the playing of the expert performance audio tracks as a feedback mechanism to the user when the user correctly performs the musical piece. Examples of musical piece data are described further below in this description.

Performance evaluation manager 320 may evaluate the user's performance of musical events associated with a musical piece. For example, performance evaluation manager 320 may compare performance data associated with a user's performance of the musical piece with musical data of music instruction system 115. According to an exemplary implementation, performance evaluation manager 320 may use one or multiple fundamental frequency detection algorithms to evaluate musical events played by the user. According to an exemplary implementation, performance evaluation manager 320 may evaluate other musical characteristics of musical events performed by the user, such as, for example, amplitude, rhythm, etc.

According to an exemplary embodiment, performance evaluation manager 320 may evaluate the extent with which a musical event is played correctly. For example, with reference to frequency, a threshold value may indicate a difference frequency within which the musical event should be performed by the user. For example, if the difference frequency corresponds to 2 Hz and the correctly played musical event corresponds to 440 Hz ($A_4$), performance evaluation manager 320 may determine whether the musical event played by the user is within the range of 438 Hz-442 Hz. If so, performance evaluation manager 320 may evaluate the user's performance of the musical event as being correct. Conversely, if the musical event played by the user is not within the range of 438 Hz-442 Hz, performance evaluation manager 320 may evaluate the user's performance of the musical event as being incorrect. Further, performance evaluation manager 320 may evaluate the extent of the correctness of the user's performance of the musical event based on whether the frequency associated with the musical event is played exactly at 440 Hz, is played 1 Hz off (e.g., 439 Hz or 441 Hz), or is played 2 Hz off (e.g., 438 Hz or 442 Hz). Additionally, performance evaluation manager 320 may evaluate the extent of the incorrectness of the user's performance of the musical event based on an offset (e.g., in Hz) from 440 Hz. This is in contrast to conventional music instruction systems or music game systems, which may evaluate whether a musical event is played correctly or not in a binary manner (e.g., exactly 440 Hz, or not or more generally whether a particular note is played or not played). A further description of exemplary processes associated with the evaluation of the user's performance is described further below in this description.

Feedback manager 325 may provide feedback to a user regarding the user's performance. The feedback may take the form of visual feedback, auditory feedback, or tactile feedback. Feedback manager 325 may provide the feedback to the user during the session (e.g., in an interactive manner) or at the end of the session (e.g., final score results, etc.).

Feedback manager 325 may display various types of visual feedback. For example, feedback manager 325 may display various types of scores (e.g., an overall score, an accuracy score, a bonus score, etc.), error tendencies, number of musical events played without mistakes, number of consecutive musical events played without mistakes, number of mistakes, etc., and/or other types of visual feedback to the user (e.g., a virtual mentor/instructor/coach providing facial feedback, audience videos, visual effects, etc.). Feedback manager 325 may also display a session difficulty level and/or a user level (e.g., beginner, easy, novice, skilled, difficult, advanced, prodigy, or the like).

Feedback manager 325 may play various types of auditory feedback. For example, feedback manager 325 may play pre-recorded approval tracks (e.g., cheers of a crowd, virtual mentor/instructor/coach vocal remarks, etc.) or pre-recorded disapproval tracks (e.g., boos of a crowd, virtual mentor/ instructor/coach vocal remarks, etc.). Feedback manager 325 may introduce signal processing effects to either enhance or diminish the user's performance.

According to an exemplary embodiment, feedback manager 325 may provide feedback in correspondence to the evaluation of the user's performance of the musical events. For example, feedback manager 325 may provide varying levels of positive feedback or negative feedback in correspondence to the varying levels of correctness or incorrectness associated with the user's performance, as described further below.

Additionally, according to an exemplary embodiment, feedback manager 325 may use the expert performance audio tracks as a mechanism of feedback. For example, according to one implementation, when the user correctly performs musical event(s), feedback manager 325 may mute the audio produced by the user's performance and play the auditory musical piece data (e.g., the expert performance audio track). In this way, the user may perform and hear himself/herself as the expert performer. According to another exemplary implementation, when the user correctly performs the musical event(s), feedback manager 325 may play the auditory musical piece data (e.g., the expert performance audio track) along with the audio associated with the user's own performance. In this way, the user may hear a mix of both the expert performer and the user. The mix levels between the expert performance and the user's performance may be user-configured or adjusted by feedback manager 325 according to the extent of or level of correctness of the user's performance. For example, feedback manager 325 may bias an audio level of the expert performance. According to yet another exemplary implementation, when the user correctly performs the musical event(s), feedback manager 325 may mute the auditory musical piece data (e.g., the expert performance audio track) and play the user's performance. Additionally, when the user correctly performs the musical event(s), feedback manager 325 may enhance the user's performance by introducing signal processing effects (e.g., reverb, chorus, flange, harmony, etc.).

Conversely, according to an exemplary implementation, when the user incorrectly performs the musical event(s), feedback manager 325 may mute the auditory musical piece data (e.g., the expert performance audio track), play the auditory musical piece data at a low output level, or provide a mix of both the auditory musical piece data and the user's performance. The mix level may be user-configured or adjusted by feedback manager 325 according to the extent of or level of incorrectness of the user's performance. For example, feedback manager 325 may bias an audio level of the user's performance. Additionally, when the user incorrectly performs the musical event(s), feedback manager 325 may diminish the user's performance by introducing signal processing effects (e.g., detuning, distortion, exaggerated equalization, etc.).

Feedback manager 325 may also provide tactile feedback. For example, feedback manager 325 may use various pulsating rhythms and/or intensity levels of vibration to indicate varying levels of positive or negative feedback. Examples of feedback are described further below in this description.

Settings manager 330 may display status information, allow the user to adjust various performance-related parameters, and allow the user to ensure proper interactivity and connectivity with music instruction system 115. For example, settings manager 330 may display a tuner, an input level, currently detected frequencies, pitches, and/or chords, audio mixing controls, a musical instrument level, digital audio effects levels, a pre-recorded expert performance level, a pre-recorded accompaniment level, a master level, and/or the like. Settings manager 330 may also provide various digital processing controls. For example, settings manager 330 may provide various digital audio effects, such as reverb, auto-tune, distortion, compression, flange, echo, and/or other signal processing effects. Additionally, settings manager 330 may display interfaces that allow the user to stop, rewind, forward, loop, etc., the visuals/audio associated with a musical piece and/or session.

Although FIG. 3 illustrates exemplary functional components of music instruction system 115, in other implementations, music instruction system 115 may include fewer functional components, additional functional components, and/or different functional components than those illustrated in FIG. 3 and described herein. Additionally, or alternatively, in other implementations, functions or processes described as being performed by a particular functional component may be performed by another functional component, or a combination of functional components.

As previously described, music instruction system 115 may use musical data during a session. Described below are examples of musical data.

Figure 4:
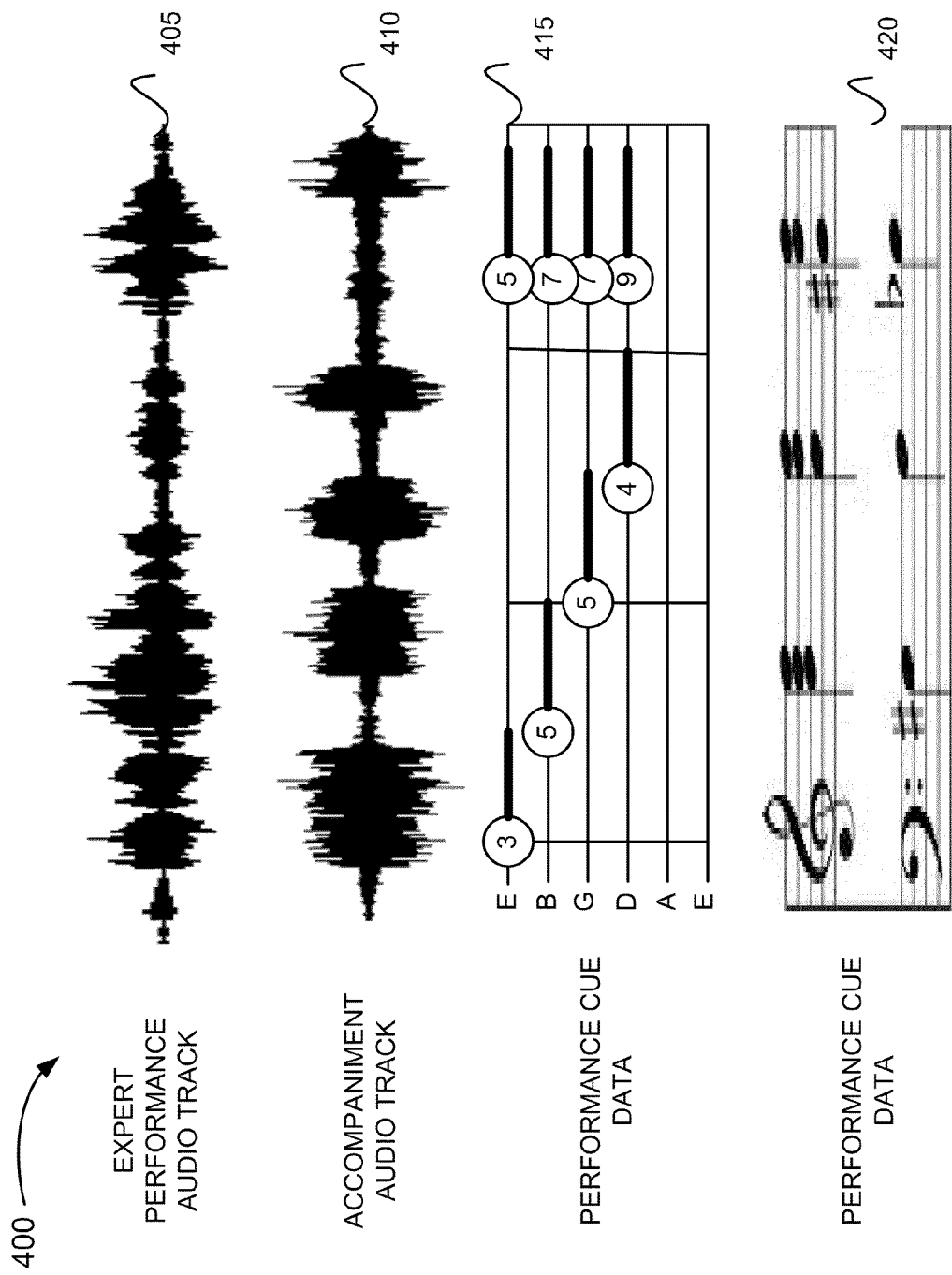
FIG. 4 is a diagram illustrating exemplary musical data that may be associated with musical pieces.

FIG. 4 is a diagram illustrating exemplary musical data 400 that may be associated with musical pieces. As illustrated, musical data 400 may include, among other things, expert performance audio track 405, accompaniment audio track 410, performance cue data 415, and performance cue data 420.

As previously described, musical data may include musical piece data. Musical piece data may include auditory musical piece data, such as expert performance audio tracks. As illustrated, according to an exemplary implementation, expert performance audio track 405 may include a recording of an expert performance of a musical piece performed on a musical instrument. For example, expert performance audio track 405 may include an expert pianist playing a concerto on a piano, an expert drummer playing a rock song, or an expert saxophonist playing a jazz piece. According to another example, expert performance audio track 405 may include multiple musical instruments, typically of the same type, mixed to one audio track. For example, expert performance audio track 405 may include one (e.g., overdubbing) or multiple experts playing multiple guitars. Expert performance audio track 405 may include signal processing (e.g., reverb, etc.) or other audio effects.

Expert performance audio track 405 may serve as an instructional tool for the user. For example, the user may attempt to mimic the performance associated with expert performance audio track 405. Additionally, as previously described, according to exemplary embodiments, feedback manager 325 may use expert performance audio track 405 as a feedback mechanism. For example, feedback manager 325 may govern the volume or output level, signal processing effects, etc., associated with the playing of expert performance audio track 405 by musical piece data manager 315. Additionally, or alternatively, feedback manager 325 may govern an audio/video representation of an expert performance (e.g., a music video) as a feedback mechanism. Additionally, waveform manager 305 may display a scrolling waveform corresponding to expert performance audio track 405.

Auditory musical piece data may include accompaniment tracks. As illustrated, accompaniment audio track 410 may include a recording of accompaniment performance(s) of a musical piece. For example, if the user is playing a musical piece with an electric guitar, accompaniment audio track 410 may include the recordings of an electric bass, drums, and vocals associated with the musical piece. Depending on the musical piece, there may be instances in which a musical piece may not include accompaniment audio track 410. For example, the musical piece may be a solo piece, etc. Musical piece data manager 315 may play accompaniment audio track 410.

As previously described, performance cue data may include data that illustrates proper performance of a musical piece with a musical instrument. Performance cue data may take many forms, such as, for example, standard music notation, a tablature, etc. Performance cue data may differ depending on the type of musical instrument, level of difficulty of the session, etc. According to an exemplary implementation, performance cue data may be synchronized to auditory musical piece data (e.g., expert performance audio track 405, etc.).

Referring to FIG. 4, performance cue data 415 and performance cue data 420 are examples performance cue data. Additional examples of performance cue data are described throughout this description.

As illustrated in FIG. 4, when the musical instrument corresponds to a guitar, performance cue data 415 may indicate a time, a string, and a position with which the user may play a musical event (e.g., a note, chords, etc.). Additionally, performance cue data 415 may indicate other aspects associated with the performance of the musical piece, such as, for example, loudness, strumming style, picking style, release time, and the like.

As further illustrated, performance cue data 420 may correspond to standard music notation. As previously described, according to an exemplary embodiment, the standard music notation may correspond to a transcription-based rendition of the musical piece performed by an artist or some other professional/expert performer. In this example, performance cue data 420 may indicate the pitches and times in which notes are to be played. Performance cue data 420 may include other types of data, such as words/phrases to indicate changes in dynamics, to indicate mood or feeling, to indicate tempo, to indicate articulation, etc., as well as musical instrument-dependent data, such as, bow position, pedal marks, etc. Performance cue data 420 may include other characteristics associated with the performance of a musical event and/or musical piece.

According to other implementations, the representation of performance cue data may take other forms. By way of example, but not limited, pitch of a musical event may be represented numerically as a frequency (e.g., in Hertz), a Musical Instrument Digital Interface (MIDI) key number, a letter, or the like. Additionally, performance cue data may be altered to reflect tempo changes, transposition, or the like. In this regard, performance cue data may be adaptable to situations in which music instruction system 115 may play the musical piece faster or slower to change the level of difficulty, or to play the musical piece in a different key to adapt to a range of different musical instruments. According to an exemplary implementation, music instruction system 115 may use conventional time-stretching techniques and/or conventional pitch-shifting techniques.

Although FIG. 4 illustrates exemplary musical data 400, in other implementations, musical data 400 may include additional data, fewer data, and/or different data than that illustrated in FIG. 4 and described.

Figure 5:
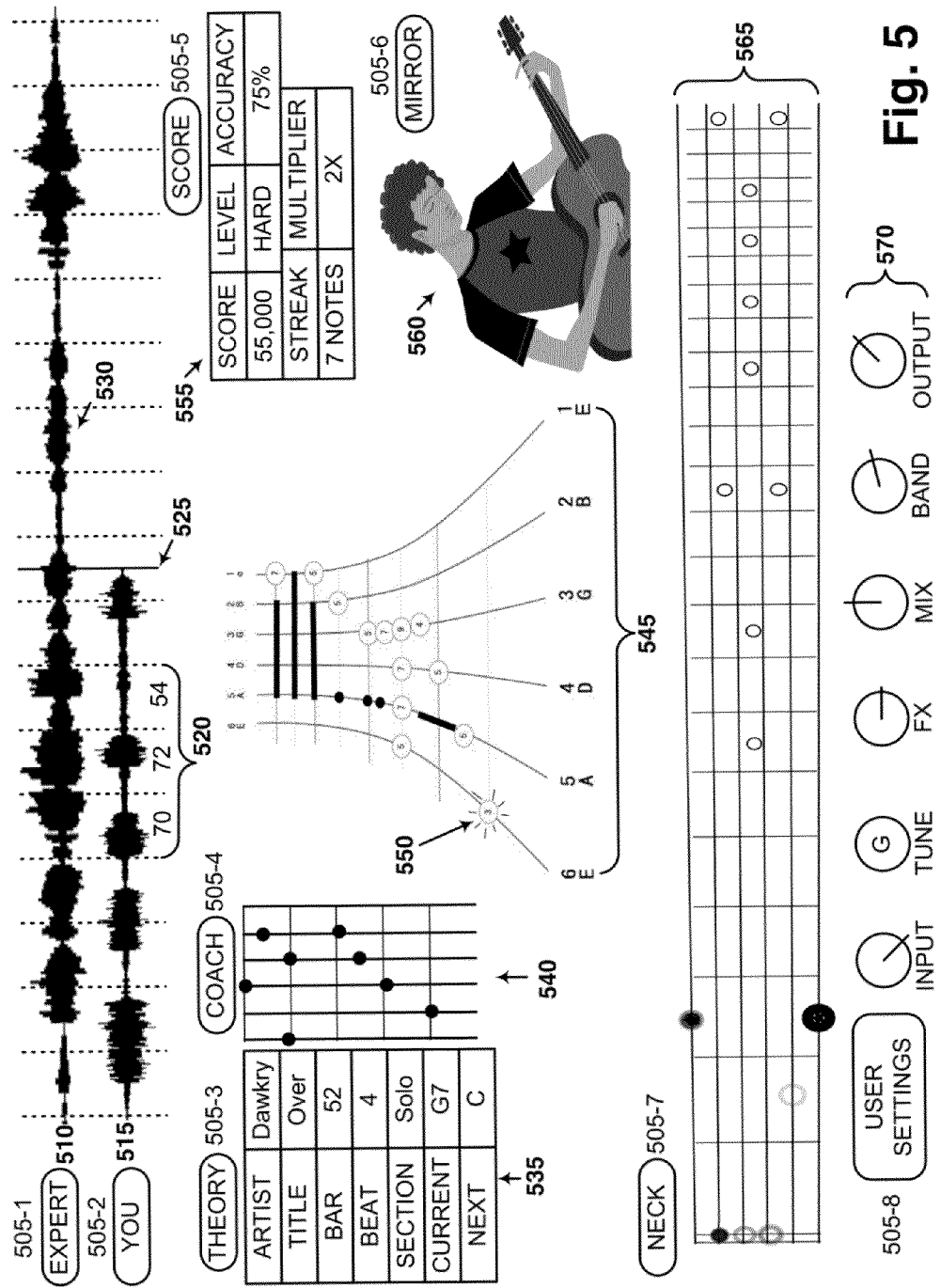
FIG. 5 is a diagram illustrating an exemplary user interface of the music instruction system that includes exemplary visuals for providing music instruction.

FIG. 5 is a diagram illustrating an exemplary user interface of music instruction system 115 that includes exemplary visuals for providing music instruction. The user interface may be displayed to the user on display 120. According to other implementations, music instruction system 115 may include additional visuals, fewer visuals, different visuals, and/or a different arrangement of visuals than those illustrated in FIG. 5 and described. For example, according to an exemplary implementation, a user may chose to omit particular visuals. For example, graphical buttons 505-1 through 505-8 (referred to generally as graphical buttons 505 or graphical button 505) may be displayed within the user interface to allow the user to select which visuals to display or hide. In this way, the user may control the information he/she may wish to see. According to other implementations, the user interface may allow the user to control what is displayed based on other interfaces (e.g., a drop-down menu, etc.). According to an exemplary implementation, music instruction system 115 may automatically resize visuals to occupy unused portions of the user interface. In practice, the relative size of each visual may not be proportional to the size of each visual illustrated in FIG. 5.

In this example, it may be assumed that the musical instrument corresponds to a guitar (e.g., a 6-string guitar). Referring to FIG. 5, at a top portion of the user interface, the user interface may include visuals associated with waveform manager 305. For example, an audio waveform 510 may correspond to expert performance audio track 405 and an audio waveform 515 may correspond to the user's performance. In this way, the user may visually compare the expert's performance to the user's performance. In addition, a degree of similarity may be shown to the user. For example, similarity scores 520 may indicate a degree of similarity, which may be expressed, for example, numerically or graphically, between the user's performance and the expert's performance on a section-by-section (e.g., measure-by-measure, etc.) basis of the musical piece. A cue line 525 may indicate a current time of the performance. In this example, audio waveforms 510 and 515 may move from right to left so that the portion located to the right of cue line 525 may depict a performance waveform 530 corresponding to that which is to be played and to the left of cue line 525 may depict the immediate history of the user's performance in comparison to the expert's performance.

The left portion of the user interface may include visuals associated with musical piece data. In this example, music content area 535 may include a name of an artist, a name of a musical piece, a current bar, a current beat, a current section, a current chord, and a next chord.

To the right of music content area 535 may include fingerings 540 to assist the user when performing. According to an exemplary implementation, fingerings 540 may display fingering positions for musical events (e.g., chords, melody, etc.) that are currently expected to be performed and future fingering positions. Fingerings 540 may display a series of fingering positions in a scrolling fashion.

Additionally, to the right of fingerings 540 may include performance cues 545. In this example, performance cues 545 correspond to a scrolling guitar tablature. The scrolling guitar tablature may include musical event indicators (illustrated as circles in FIG. 5). According to other implementations, the musical event indicators may have a shape different than a circle (e.g., square, etc.). The musical event indicators may be synchronized with musical data (e.g., expert performance audio tracks 405, etc.) and may indicate characteristics of a musical event (e.g., effects, gesture, duration, etc.). Performance cues 545 may include real-time or near real-time feedback cues, such as musical event indicators "glowing" to indicate positive feedback 550 or musical event indicators "dimming" to indicate negative feedback. According to other implementations, performance cues 545 may take the form of a scrolling musical staff indicating musical events. Additionally, according to other implementations, performance cues 545 may not use scrolling tablatures. Rather, the tablatures may be laid out (e.g., like a long road) and the user's point of view moves along the tablature (e.g., travels down the road). Other examples of visual performance cues are described throughout this description.

The area to the right of performance cues 545 may include performance results 555. In this example, performance results 555 may include a score, a difficulty level, an accuracy score, a streak score and a multiplier, which may be reflected in a real-time or near real-time basis (e.g., during a user's performance, at the end of session, etc.). For example, the score may represent an overall performance value or an ongoing performance value associated with the current session. The streak score may correspond to, for example, a number of consecutive musical events played correctly. The accuracy score may reflect an accuracy of the user's performance relative to the musical piece. For example, the accuracy score may be expressed as a percentage of correctly performed musical events divided by a total number of expected musical events. The multiplier may correspond to a score modifier. For example, a score may be multiplied by the multiplier if the user performs difficult passages correctly, the accuracy score is above a particular threshold value, the difficulty level is a particular level, or the like. The multiplier may enhance a score. Conversely, the multiplier may diminish the user's score. For example, a score may be multiplied by the multiplier if the user does not perform difficult passages correctly, the accuracy score is below a particular threshold level, or the like.

As further illustrated, the right portion of the user interface may include video images 560. For example, as previously described, music instruction system 115 may include a camera 145 that may capture video images 560 of the user during the user's performance. According to such an exemplary implementation, the user may be able to continue to observe the user interface and simultaneously view his/her performance. For example, when the musical instrument corresponds to a guitar, the user may be inclined to look downward at the neck of the guitar to observe his/her fingerings and actions. However, video images 560 may allow the user to observe his/her performance without diverting his/her attention elsewhere. Video images 560 may permit the user to identify issues associated with the user's performance (e.g., technique, artistic issues, etc.) that otherwise may not be identifiable. According to other exemplary implementations, video images 560 may correspond to that of an expert performer or a virtual mentor/instructor/coach character which may coach, react, and/or provide feedback according to the user's performance. According to other exemplary implementations, video image 560 may correspond to other users' performances of the musical piece (e.g., a music video of a popular artist, or a video of another's user's performance of the musical piece, etc.). Music instruction system 115 may allow the user to adjust a size of a window in which video images 560 are displayed. Further, according to other exemplary implementations, video images 560 may show video images of the user that are augmented with computer graphics to indicate instructional information, such as, for example, fret and string positions for the left hand, strumming timing and directions for the right hand, keyboard keys to play, drums to hit, etc. The computer graphics may be presented as an overlay with video images 560 (e.g., analogous to the overlay of computer graphics provided with video images of football fields in professional football broadcasts, where the computer graphics show the line of scrimmage, the 10-yard line, and other information as if painted on the football field). For example, through image manipulation, video image 560 of a fretboard may be made to appear to have embedded glowing LED(s) at the correct finger position(s) for the note or chord.

As further illustrated, the lower portion of the user interface may include a fingering and time guide 565. In this example, fingering and time guide 565 may include a graphical representation of the musical instrument (i.e., a guitar neck) and performance cues (e.g., expected musical events to be performed). In contrast to fingering 540, fingering and time guide 565 may include current and future musical events. Fingering and time guide 565 may include various shapes, colors, sizes, opaque levels, and the like, to permit the user to follow the performance cues as time progresses.

Settings 570 may be displayed at the bottom of the user interface. As previously described, settings manager 330 may display various user settings, effects, levels, and the like. In this example, settings 570 may include an input level, a tuner, an effects level, a mix level, a band selector, and an output level. According to an exemplary implementation, the settings available to the user may depend on the musical instrument with which user is performing and/or the musical piece. Additionally, settings 570 may permit the user to adjust particular settings not only before a session begins, but also during the session.

FIGS. 6-10 are diagrams that illustrate exemplary performance cues associated with performance cue manager 310 for various musical instruments. According to other implementations, the performance cues associated with performance cue manager 310 may include additional visuals, different visuals, fewer visuals, a different arrangement of visuals, and/or a different orientation than the performance cues illustrated in FIGS. 6-10 and described.

Figure 6:
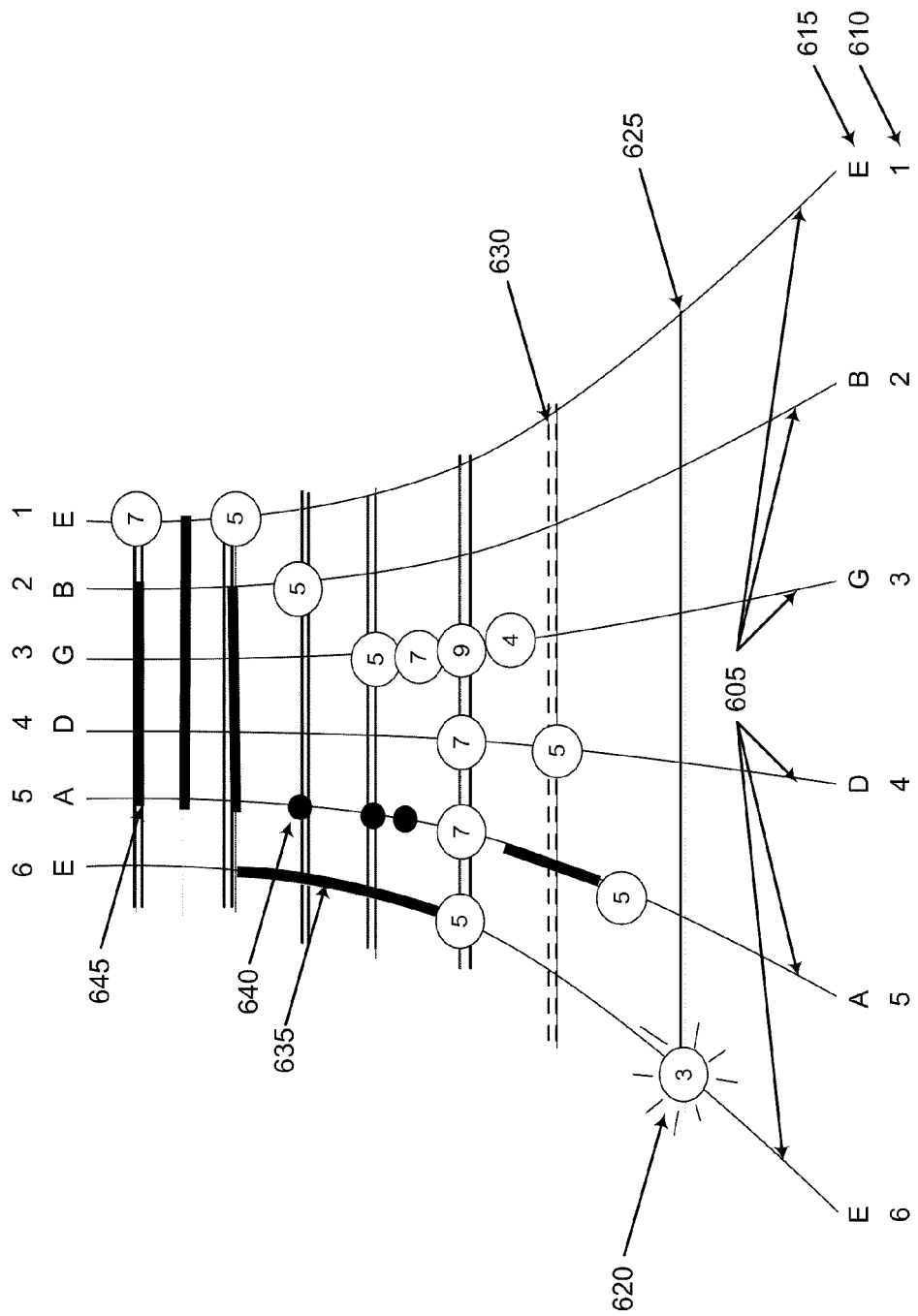

FIG. 6 is a diagram illustrating exemplary performance cues associated with performance cue manager 310 when the musical instrument corresponds to a guitar. As illustrated, the strings of the guitar may be represented by six time lines 605, which may be labeled with string numbers 610 (e.g., 1-6) and corresponding musical event values 615 (E, A, D, G, B, E). Musical event circles 620 may represent performance cues for the user. According to an exemplary implementation, the numbers inside the musical event circles 620 may correspond to the appropriate fret on which a string is to be depressed. Musical event circles 620 may be placed on the appropriate string on which the appropriate musical event may be played. Additionally, according to an exemplary implementation, the vertical position of musical event circles 620 may indicate a time remaining before the musical event should be played. Musical event circles 620 may be synchronized with a timecode associated with musical data (e.g., accompaniment audio tracks, expert performance audio tracks, etc.).

As time progresses, the user interface may scroll time lines 605 and musical event circles 620. For example, the scrolling may be from a top of the user interface toward a bottom of the user interface. According to other implementations, time may not be displayed or represented with depth. For example, the scrolling may be displayed or represented in a two-dimensional manner. The user may attempt to perform musical event circles 620 at a cue line 625. Lines 630 may indicate the musical beats, measures, tempo, and/or timing associated with the musical piece. According to an exemplary implementation, heavy and/or colored lines 635 may indicate a duration on how long a string may be depressed against the fret (i.e., a duration of the musical event). Repeated musical events may be represented with dots 640 or thick horizontal lines for strumming 645. According to other implementations, duration, strumming, and/or repeated musical events may be graphically represented in another manner (e.g., squiggly lines, various line patterns (e.g., dotted, etc.), animated lines, etc.).

FIG. 7A is a diagram illustrating other exemplary performance cues associated with performance cue manager 310 when the musical instrument corresponds to a guitar. In this example, a guitar neck 705 may be displayed with strings represented by horizontal lines 710 and frets represented by vertical lines 715. According to an exemplary implementation, finger positions may be shown with animated concentric circles and symbols 720. By way of example, but not limited thereto, an outermost circle 725 may appear four beats ahead of a performance time. In addition, other circles may appear and transform into smaller, darker, thicker, and/or less transparent circles over time according to a tempo of the musical piece and as the current performance cue time approaches. For example, performance cues that may be three beats away may be represented by smaller, less transparent circles 730. Performance cues that may be two beats away may be represented by yet even smaller, less transparent circles 735, and performance cues that may be a single beat away may be represented by yet even smaller, less transparent circles 740. Performance cues may be displayed in a position corresponding to the appropriate string and fret that the musical event is to be performed.

According to an exemplary implementation, when the user is supposed to pluck a string at a particular position, all of the circles may be present and an icon (e.g., a star) 745 may appear. To communicate the duration of a musical event, an icon (e.g., a star, etc.,) and a number of circles may stay visible for the duration of a musical event 750.

According to an exemplary implementation, multiple performance cues (e.g., 4 consecutive $16^{th}$ notes, etc.) displayed at the same position (e.g., string 1, fret 1, etc.) may be notated by a blinking center with static outer circle, or any other suitable form. Performance cues may also include various effects, such as, for example, vibrations, wave-like effects or other suitable forms to communicate a musical event. Performance cues may also include various shapes, alpha-numeric characters, symbols, as well as various colors to communicate a musical event. According to an exemplary embodiment, placement, timing, tempo, and/or duration of a musical event (e.g., a note) may be visibly depicted to a user through the use of shapes, symbols, alphanumeric characters or the like, as well as other characteristics, such as, for example, size, color, effect, opacity level, or the like. Performance cues may be adapted according to the musical instrument.

Figure 7B:
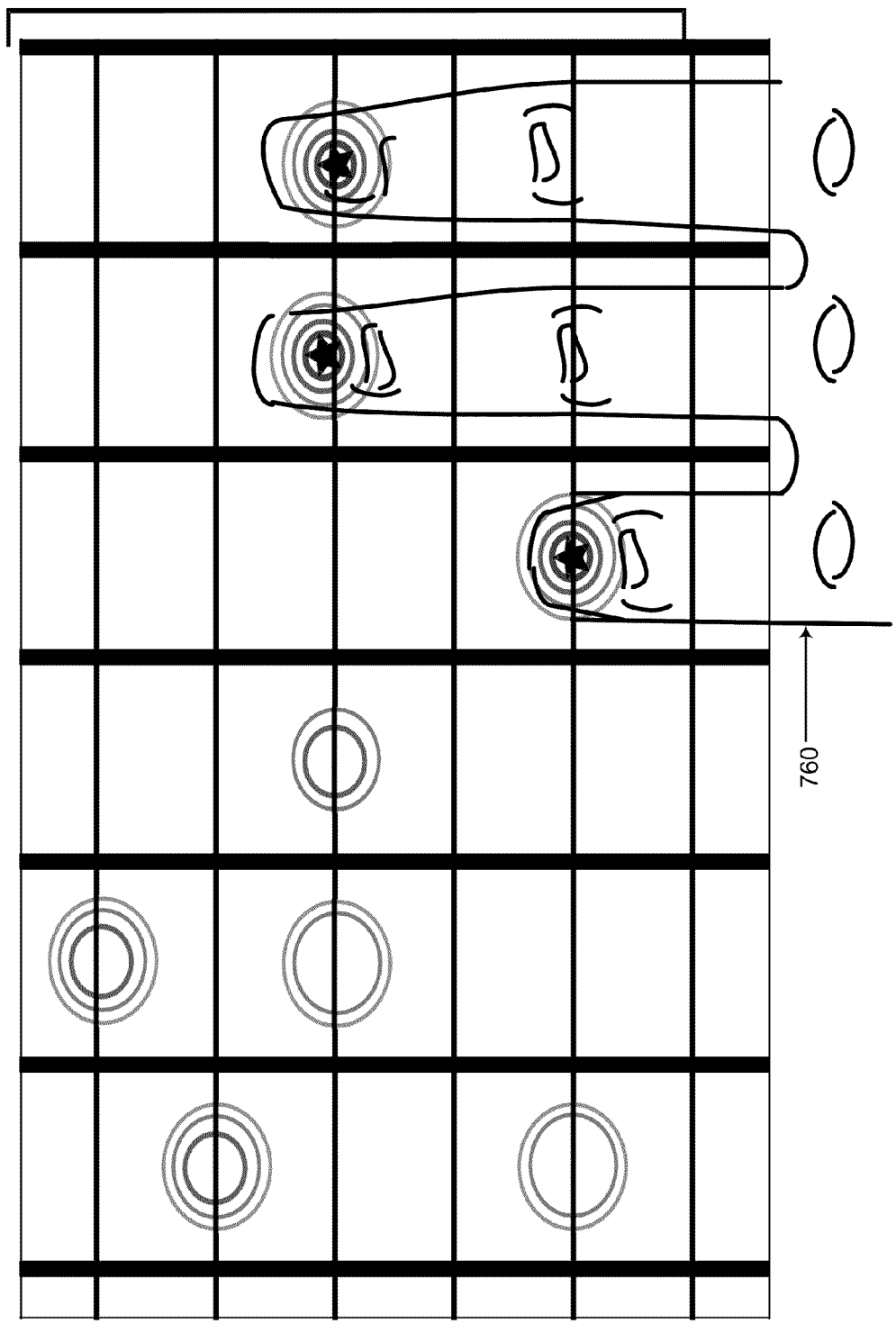

FIG. 7B is a diagram illustrating other exemplary performance cues associated with performance cue manager 310 when the musical instrument corresponds to a guitar. For example, a graphical representation of a hand 760 may illustrate fingerings for executing the performance cues. In this example, hand 760 is represented from a vantage point of the user facing an imaginary performer. However, music instruction system 115 may permit the user to view the fingerings formed by hand 760 at different vantage points (e.g., behind the imaginary performer, behind and over the top of the imaginary performer, etc.).

Figure 8:
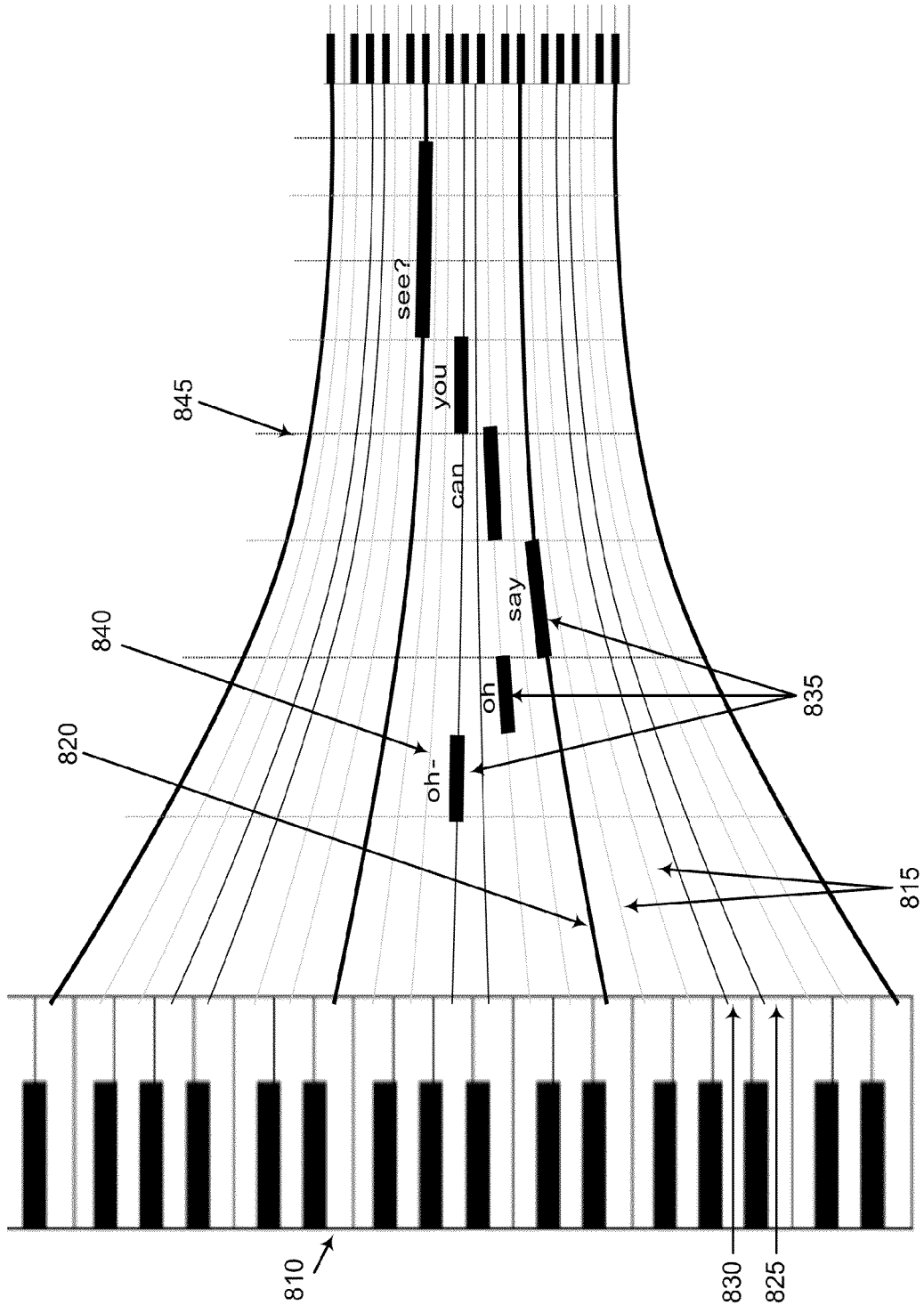
FIG. 8 is a diagram illustrating exemplary performance cues when the musical instrument corresponds to a human voice.

FIG. 8 is a diagram illustrating exemplary performance cues associated with performance cue manager 310 when the musical instrument corresponds to a human voice. As illustrated, a graphical representation of a keyboard 810 may define pitches and time-lines, and spaces between the time-lines may indicate pitches 815. According to an exemplary implementation, thick lines 820 may be aligned to a musical event (e.g., a C note). Additionally, or alternatively, medium line 825 and medium line 830 may indicate other musical events (e.g., an F note and a G note) having a particular interval (e.g., a perfect fourth, a perfect fifth) from C, respectively. As further illustrated, by way of example, but not limited thereto, heavy and/or colored lines 835 may be labeled with lyrics 840. Additionally, musical events may scroll from right to left and vertical lines 845 may represent beats, measures, tempo, and/or timing associated with the musical piece.

Figure 9:
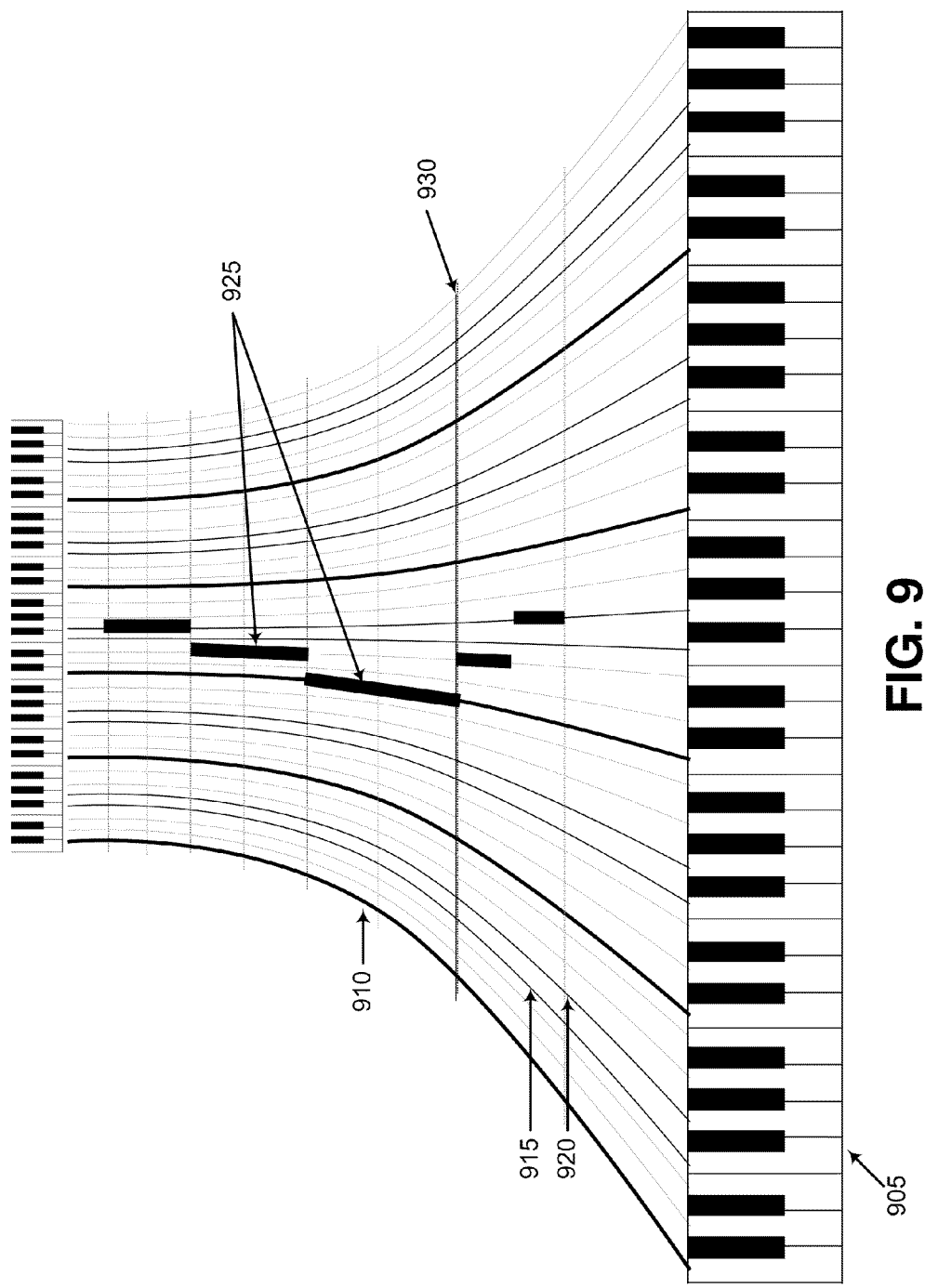
FIG. 9 is a diagram illustrating exemplary performance cues when the musical instrument corresponds to a keyboard.

FIG. 9 is a diagram illustrating exemplary performance cues associated with performance cue manager 310 when the musical instrument corresponds to a keyboard. As illustrated, a graphical representation of a keyboard 905 may be displayed to the user. According to an exemplary implementation, scrolling may occur from top to bottom. Thick lines 910 may be aligned to a particular musical event (e.g., a C note). Additionally, or alternatively, medium line 915 and medium line 920 may be aligned with other musical events (e.g., an F note and a G note) having a particular interval (e.g., a perfect fourth, a perfect fifth) from C, respectively. Performance cues 925 may indicate which musical event the user is to play as well as other characteristic (e.g., duration, etc.). Horizontal lines 930 may represent beats, measures, tempo, and/or timing associated with the musical piece.

Figure 10:
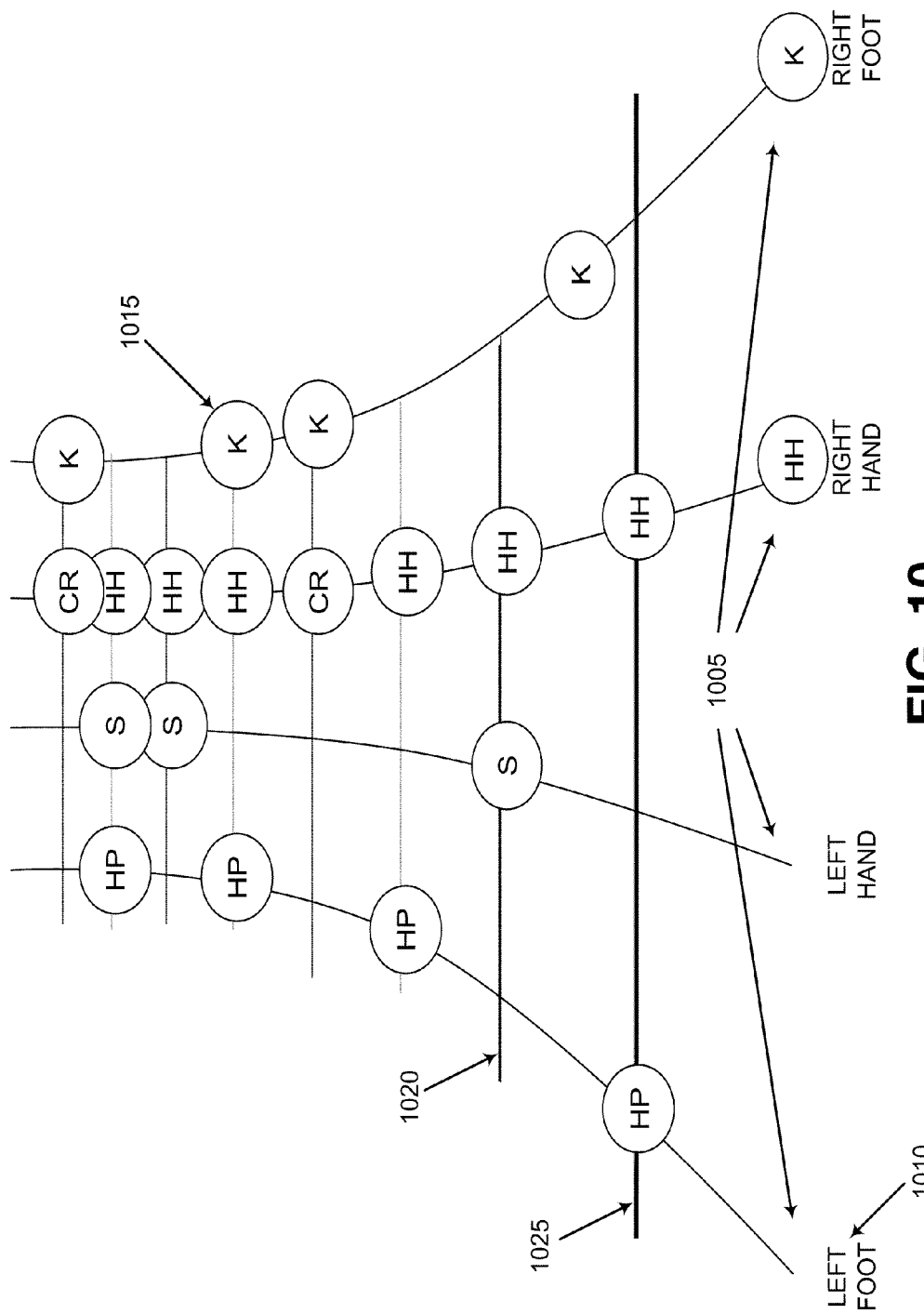
FIG. 10 is a diagram illustrating exemplary performance cues when the musical instrument corresponds to drum kit.

FIG. 10 is a diagram illustrating exemplary information associated with performance cue manager 310 when the musical instrument corresponds to a drum kit. In this example, the four time-lines 1005 may include musical events to be performed by the user. For example, each time-line 1005 may include limb indicators 1010 to indicate to the user whether the musical events are to be performed by the user's hands or the user's feet. The musical events may be indicated by circles 1015. According to an exemplary implementation, circles 1015 may also indicate which piece of the drum kit to play. For example, "HP" may correspond to a hi-hat pedal, "S" may correspond to a snare drum, "HH" may correspond to a hi-hat, and "K" may correspond to a kick drum. Circles 1015 may scroll along time-lines 1005. Horizontal line 1020 may represent beats, measures, tempo, and/or timing associated with the musical piece. Cue line 1025 may indicate to the user when to strike the appropriate piece of the drum kit.

As previously described, music instruction system 115 may provide performance cues that are synchronized to musical data (e.g., auditory musical piece data, visual musical piece data, etc.).

Figure 11:
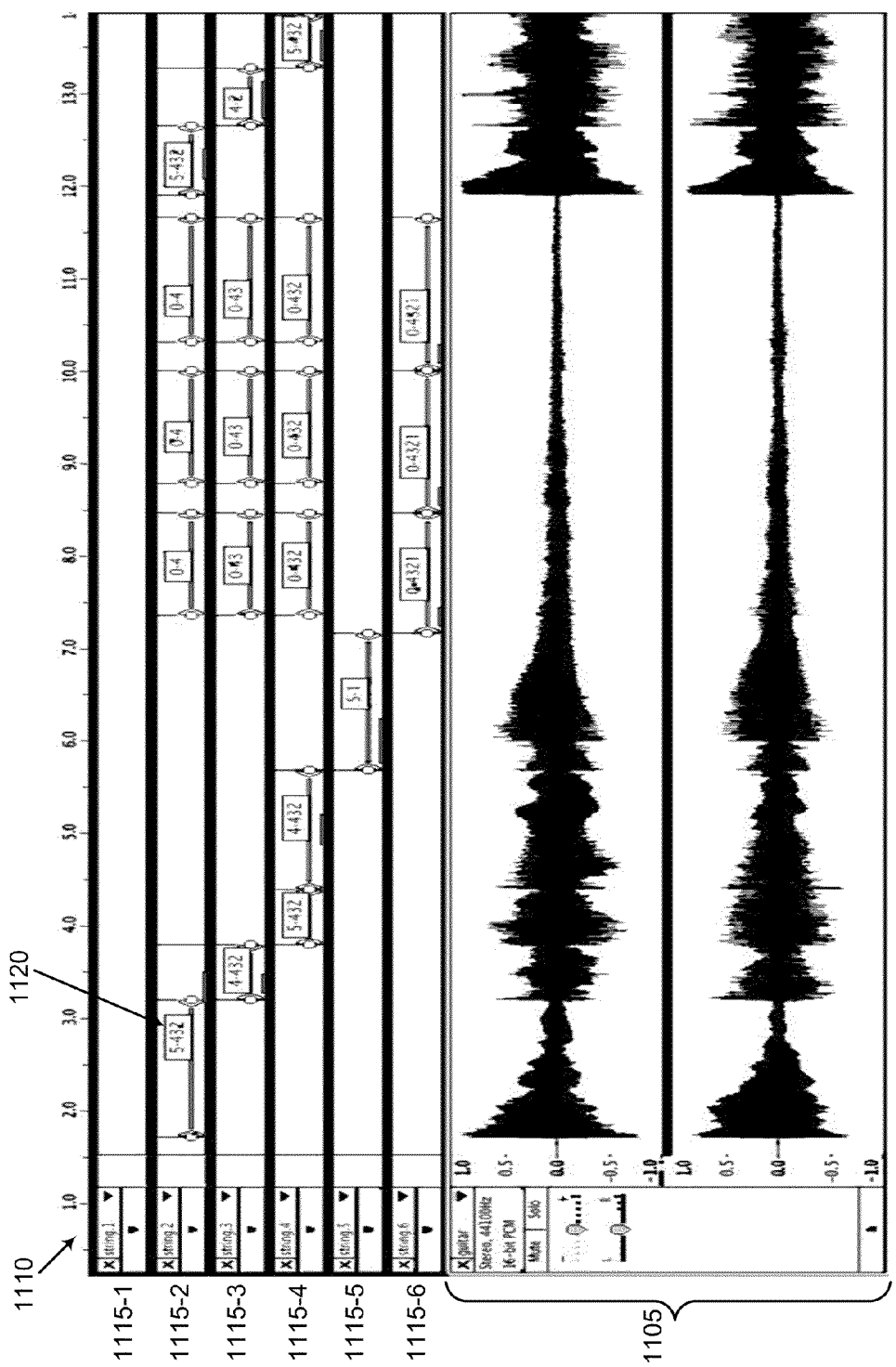
FIG. 11 is a diagram illustrating an exemplary user interface of the music instruction system that includes synchronized performance cues to musical data.

FIG. 11 is a diagram illustrating an exemplary user interface of music instruction system 115 that includes synchronized performance cues to musical data (e.g., expert performance audio tracks 405, accompaniment audio tracks 410, etc.). For example, the exemplary user interface in FIG. 11 may be used to program the synchronization of performance cues with musical events associated with a musical piece.

In this example, the musical data may include a guitar track 1105 having time-code markers 1110 (e.g., in seconds) and a guitar string section 1115-1 through 1115-6 (referred to generally as guitar string section 1115 or guitar string sections 1115) that corresponds to six string lanes. According to an exemplary implementation, each guitar string section 1115 may include a region of time 1120 that provides a performance cue to the user. For example, within guitar string section 1115-2 region of time 1120 includes a value "5-432" that may be aligned to a ruler marker 1110. The value "5-432" may indicate to a user to perform string 2 at the $5^{th}$ fret according to difficulty levels 2, 3, and 4 (e.g., representing medium, hard, and hardest, respectively). Music instruction system 115 may use this synchronized performance cue data to generate a user interface to indicate what and how musical events are to be performed by a user.

Performance cue data may differ depending not only on the type of musical instrument, but also the level of difficulty of the session. For example, the performance cues may be tailored to various user levels (e.g., beginner, easy, novice, skilled, difficult, advanced, prodigy, or the like). Additionally, as described further below, according to an exemplary implementation, the difficulty level of a session may be static throughout the session. However, according to another implementation, the difficulty level of the session may be dynamic during the session. For example, the difficulty level of the session may change during the session based on an evaluation of the user's performance. According to such an implementation, the difficulty level of the session may increase or decrease, and correspondingly, the difficulty level of the performance cues may reflect these changes.

According to exemplary embodiments of music instruction system 115, a user may perform on a "real" musical instrument in contrast to a "virtual musical instrument," such as a game controller. Music instruction system 115 may detect musical events (e.g., notes, etc.) performed on the musical instrument. For example, as previously mentioned, music instruction system 115 may detect musical events played by the user based on a fundamental frequency detection algorithm. This is in contrast to, for example, game systems that use game controllers that do not produce musical events (e.g., notes, etc.) and/or such musical events are not evaluated based on pitch, etc.

Depending on the musical instrument, music instruction system 115 may receive user performance data in various ways. For example, in the case of musical instruments with MIDI functionality, music instruction system 115 may accept direct input (e.g., via a cable or wireless). Since MIDI-type musical instruments may send and receive event messages, which may include pitch, etc., music instruction system 115 may not perform fundamental frequency detection. Alternatively, if the user is learning to play a snare drum, detection of the fundamental frequency may not be relevant. However, in the case of other types of musical instruments, music instruction system 115 may detect a fundamental frequency associated with a particular musical event according to one or more fundamental frequency detection algorithms. For example, music instruction system 115 may use fundamental frequency detection when the musical instrument is an acoustic instrument, an electric musical instrument (e.g., with pickups), or the user performs with or via a microphone. The fundamental frequency detection algorithm may include pitch analysis, fundamental frequency estimation, and chord recognition. According to other exemplary implementations, other methods may be used for input analysis (e.g., template matching, machine learning, non-negative matrix factorization, etc.). Music instruction system 115 may determine whether to use fundamental frequency detection based on the audio received from the musical instrument and/or the type of musical instrument.

Figure 12A:
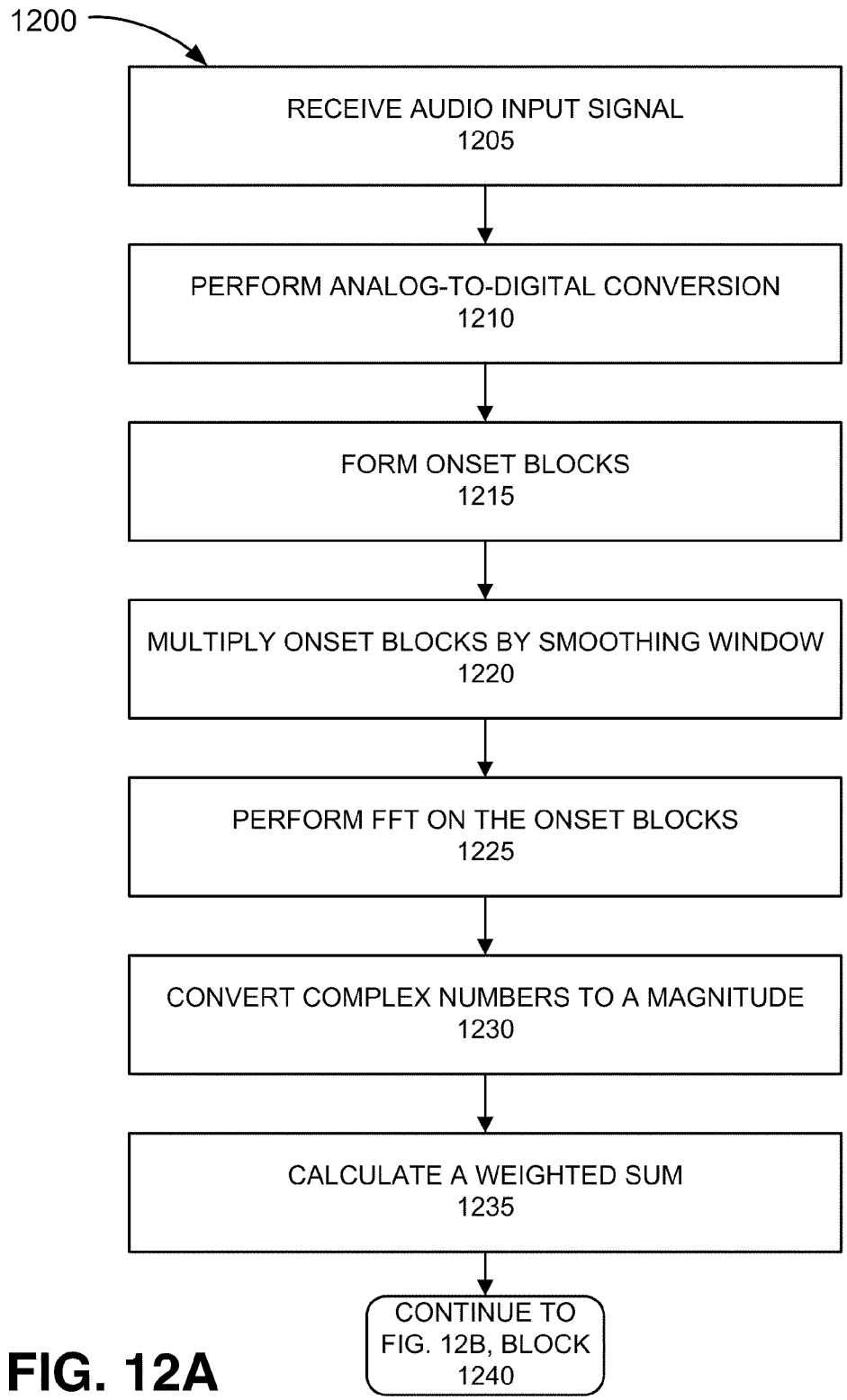
FIGS. 12A-12C are flow diagrams illustrating an exemplary process for detecting a fundamental frequency associated with a musical event.
Figure 12B:
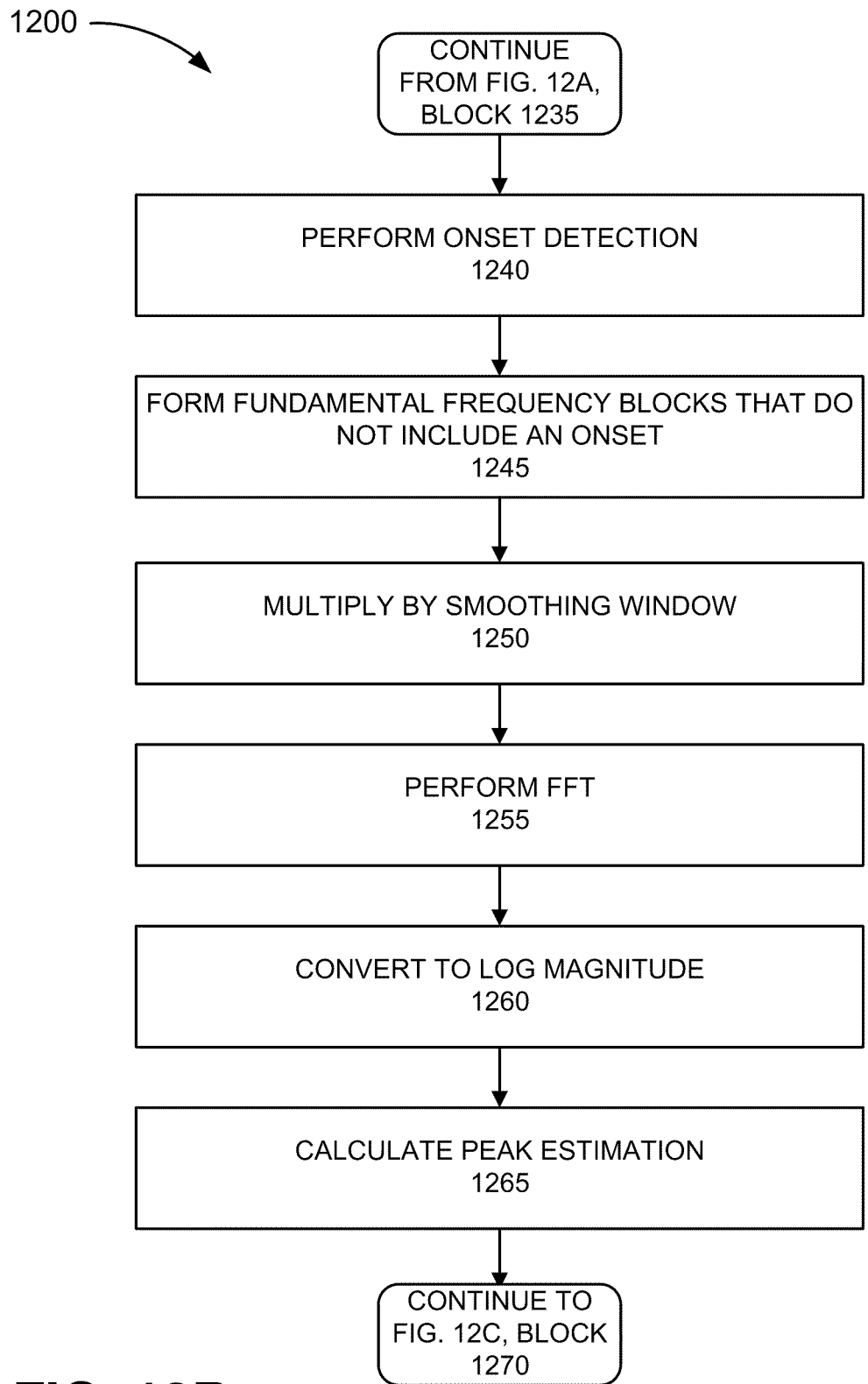
Figure 12C:
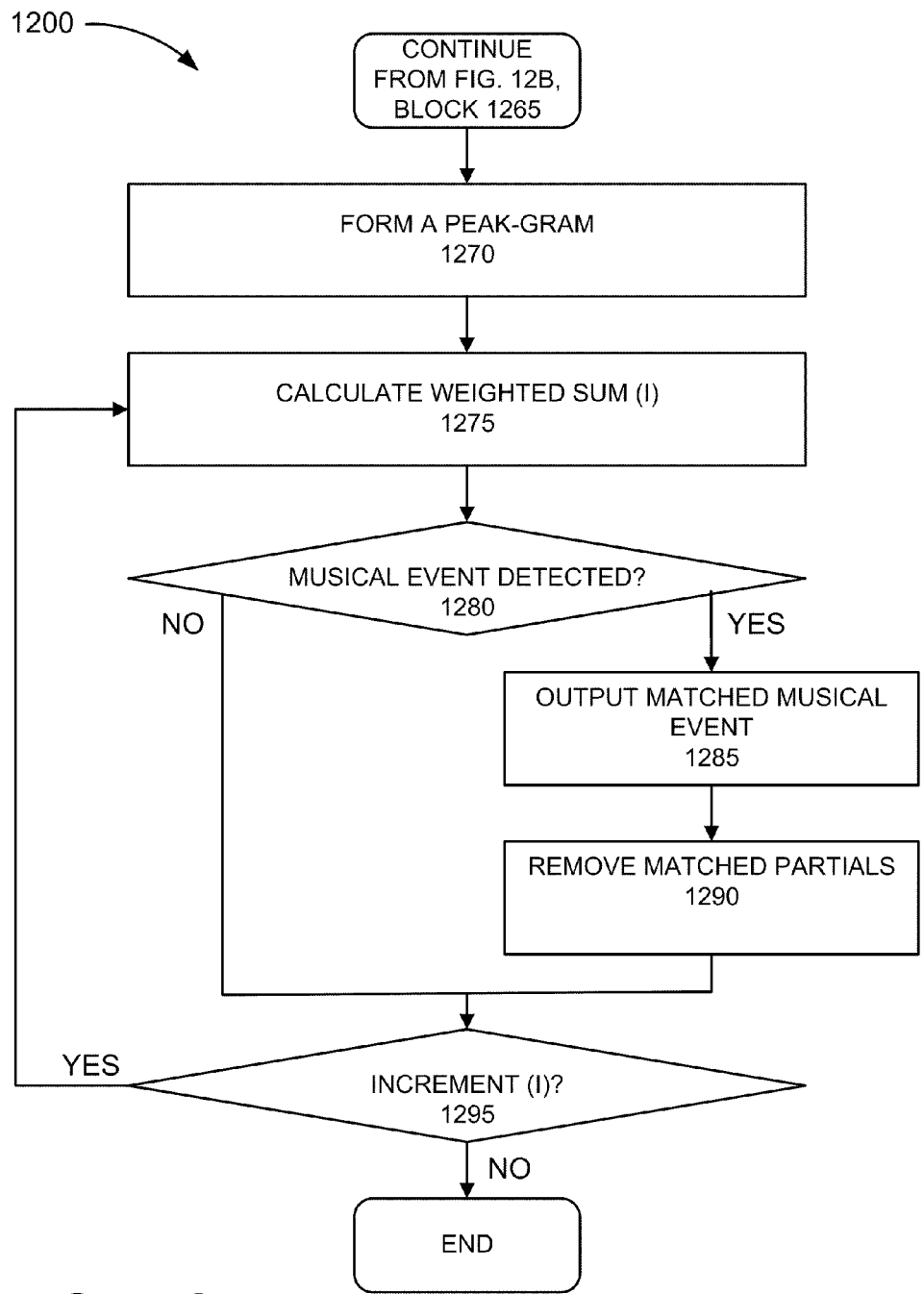

FIGS. 12A-12C illustrate an exemplary process 1200 for detecting a fundamental frequency associated with a musical event. The fundamental frequency may correspond to the frequency of the acoustic vibration that constitutes the musical tone. Monophonic musical instruments, such as the flute, may produce at most one tone at a time. Polyphonic musical instruments, such as the guitar or the piano, may produce more than one tone at a time. For example, the guitar or the piano may produce chords or other polyphonic musical structures. The fundamental frequency detection algorithm may detect fundamental frequencies associated with a monophonic musical structure (e.g., a single musical tone) or a polyphonic musical structure (i.e., two or more musical tones, a chord, etc.).

Process 1200 may include receiving an audio input signal (block 1205). For example, music instruction system 115 may receive an audio input signal. For example, a musical instrument may produce an electrical signal to be used as an audio input signal to music instruction system 115. Alternatively, a microphone or pickup may be used to convert an acoustic signal associated with the musical instrument into an electrical signal, which may be used as an audio input signal.

An analog-to-digital conversion may be performed (block 1210). For example, music instruction system 115 may convert the audio input signal to a digital audio input signal using conventional techniques.

Onset blocks may be formed (block 1215). According to an exemplary implementation, the fundamental frequency detection algorithm may detect a fundamental frequency based on the forming of blocks (e.g., of a fixed-length) that includes a contiguous set of samples from the digital audio input signal. For example, an onset block may include 512 samples to allow for a smaller time window within which an onset time associated with the musical event may be detected.

As previously described, the size of the onset blocks may be smaller than blocks typically used for frequency analysis. For example, it is common for frequency analysis blocks to include 2048 samples. However, to process digital audio using equally spaced blocks of samples, such as every 1024 samples, with a 50% overlap, fundamental frequency detection results may be poor when the onsets begin within blocks of this size. To avoid such poor results, the fundamental frequency detection algorithm may detect onsets (e.g., musical event beginnings) within the formed onset blocks, and when an onset is detected, the frequency detection algorithm may proceed to a next onset block for frequency detection. In this regard, frequency detection analysis may be positioned to onset blocks that do not include onsets. For example, onset blocks that do not include onsets that may be positioned after an onset block that includes an onset.

The onset blocks may be multiplied by a smoothing window (block 1220). The onset blocks may be multiplied by a smoothing window to improve, among other things, the spectral characteristics of the digital audio input signal. According to an exemplary implementation, the type of smoothing window may be selected based on the musical instrument. Music instruction system 115 may include one or more types of smoothing windows (e.g., a Hann window, a Hamming window, a Gaussian window, etc.).

FFT may be performed on the onset blocks (block 1225). A Fast Fourier Transform (FFT) may be applied to the onset blocks, which may yield an estimate of a discrete short-term spectrum. The discrete short-term spectrum may include complex numbers that represent magnitude and phase information.

The complex numbers may be converted to magnitude values (block 1230). For example, the magnitude of each complex number is the square root of the sum of the squares of the imaginary and real parts. For example, if the complex number is a+bi, then the magnitude is $sqrt(a^2+b^2)$, where sqrt represents the square root. The magnitude value may correspond to the amplitude of a sinusoidal component and the sinusoidal components may be equally spaced frequencies. The magnitude values may be stored in a data structure (e.g., an array, etc.) having indexes.

A weighted sum may be calculated (block 1235). For example, a weighted average of the magnitudes may be calculated based on their respective positions in the indexed data structure. As an example, assume that there are four magnitude values (2, 2, 3, 4) that are indexed in a magnitude array. For example, magnitude value=2 may be indexed at position 0 in the magnitude array, magnitude value=2 may be indexed at position 1 in the magnitude array, magnitude value=3 may be indexed at position 2 in the magnitude array, and magnitude value=4 may be indexed at position 3 in the magnitude array. The frequency detection algorithm may multiply each magnitude value by corresponding index. For example, new magnitude values (0, 2, 6, 12) (e.g., 2*0, 2*1, 3*2, 4*3) may be calculated. Next, a summation of the new magnitude values may be calculated and a weighted average may be calculated. According to an exemplary implementation, the weighted average may correspond to the summation of the magnitude values divided by the summation of the multipliers. For example, new magnitude values may be added (0+2+6+12) to form a summed magnitude value=20 and the summed magnitude value may be divided by 6 (0+1+2+3) to yield a weighted sum value=3.33. According to another exemplary implementation, the summation of the new magnitude values may correspond to the weighted sum. For example, the weighted sum value=20. By calculating the weighted sum in the manner described, higher frequencies within the frequency spectrum are given more weight than lower frequencies within the frequency spectrum since, in this example, frequencies may be indexed in the magnitude array from low frequencies to high frequencies. That is, lower weightings (e.g., array index multipliers) may be assigned to lower frequencies and higher weightings may be assigned to higher frequencies.

Referring to FIG. 12B, onset detection may be performed (block 1240). For example, a change in the weighted sum value relative to a weighted sum value associated with a previous onset block may be compared to a threshold value. If the change is above or equal to the threshold value, the onset block is determined to include an onset. If the changed in the weighted sum is below the threshold value, the onset block is determined to not include an onset. According to an exemplary implementation, the threshold value may be reduced after an onset is detected and restored to a previous threshold value when no onset is detected.

According to an exemplary implementation, when an onset does not occur within an onset block, the onset block may be stored in, for example, a buffer. As described further below, the onset blocks that do not include onsets may be used to form fundamental frequency blocks. Conversely, when an onset does occur within an onset block, frequency detection algorithm may disregard the onset block and proceed to the next onset block.

Fundamental frequency blocks may be formed (block 1245). The result of each onset detected may be used to determine a suitable block of samples for fundamental frequency detection. For example, an onset block that is determined to not include an onset may be used to form a fundamental frequency block. As an example, if a fundamental frequency block includes 2048 samples and onset blocks include 512 samples, then a fundamental frequency block may be formed when four contiguous onset blocks are determined to not include an onset. Depending on the size of the onset block formed in block 1215 and the size of the fundamental frequency block, a particular number of contiguous onset blocks determined to not include onsets may be used to form a fundamental frequency block.

The fundamental frequency blocks may be multiplied by a smoothing window (block 1250). The fundamental frequency blocks may be multiplied by a smoothing window to improve, among other things, the spectral characteristics of the digital audio input signal. According to an exemplary implementation, the type of smoothing window may be selected based on the musical instrument. Music instruction system 115 may include one or more types of smoothing windows.

FFT may be performed on the fundamental frequency blocks (block 1255). A Fast Fourier Transform (FFT) may be applied to the fundamental frequency blocks, which may yield an estimate of a discrete short-term spectrum. The discrete short-term spectrum may include complex numbers that represent magnitude and phase information.

The complex numbers may be converted to logarithmic magnitude values (block 1260). The magnitude of each complex number is the square root of the sum of the squares of the imaginary and real parts. For example, if the complex number is a+bi, then the magnitude is $sqrt(a^2+b^2)$. The logarithm of the magnitude may be computed using a standard log function. Each logarithmic value may correspond to the log of the amplitude associated with each sinusoidal component, where the sinusoidal components may be equally spaced frequencies.

A peak estimation may be calculated (block 1265). For example, at lower frequencies, the spacing of the sinusoidal components represented by the log magnitude spectrum may be too wide for accurate musical pitch estimation. According to an exemplary implementation, the log magnitude spectrum may be interpolated. For example, the log magnitude spectrum may be interpolated using quadratic interpolation. At each point in the spectrum where a log magnitude value is greater than its two immediate neighbors, a quadratic polynomial may be fitted to these three points. For each peak point, the log magnitude and frequency of the peak point of the quadratic spline may be computed and may be stored as peak data. Such an approach may improve the accuracy for peak estimations, particularly in instances when the frequency associated with the peak point does not align with a frequency bin (FFT bin) associated with the FFT. For example, if each frequency bin associated with an FFT is 40 Hz, and the peak point is located at 100 Hz, quadratic interpolation may improve the accuracy of identifying the correct frequency and log magnitude of the peak point.

Referring to FIG. 12C, a peak-gram may be formed (block 1270). A peak-gram may be formed according to the peak data. For example, the peak-gram may correspond to an array. Each location in the peak-gram may correspond to a musical semi-tone (e.g., a nominal frequency based on the equal-tempered scale). According to an exemplary implementation, MIDI key numbers may be used as the peak-gram index, and the nominal frequency for index i may correspond to the following exemplary expression:

$$440 * 2^{i-69/12}, \quad (1)$$

where 440 Hz is the standard frequency for the musical event $A_4$, where 69 represents a MIDI note value for the musical event $A_4$, and 12 represents the number of semi-tones in an octave.

For each peak estimated by the quadratic spline in the log magnitude spectrum, the peak value corresponding to the peak-gram location with the most closely matching nominal frequency may be incremented by the square of the peak amplitude. In most cases, at most one peak amplitude will affect a given peak-gram location. In such cases, another array, for example, may be formed to store the precise frequency of the peak point. The frequency may be used to estimate whether the musical event (e.g., a note) is in tune, flat, or sharp.

The peak-gram may include an estimate of the energy in fundamental frequency block at or near each semitone in the musical scale. If the musical event that is present in the fundamental frequency block corresponds to a MIDI key number i, the peak-gram may include a large positive value (i.e., representing energy) at location i, which represents the fundamental frequency, and additional positive values at, for example, locations i+12, i+19, i+24, i+28, i+31, i+34, and i+36, which represent harmonics rounded to the nearest musical semitone (e.g., MIDI key number). According to other implementations, the number of harmonics (or partials) used may be greater or fewer. Additionally, frequencies that reside above the highest frequency represented in the digital audio signal may not be present.

A weighted sum may be calculated (1275). For example, for a musical event (e.g., a note) with a corresponding MIDI key number i, a weighted sum (e.g., a square of the amplitude) may be formed from peak-gram values at the fundamental frequency and its harmonics. For example, a weighted sum may be formed at locations i, i+12, i+19, i+24, i+28, i+31, i+34, and i+36. For high frequencies where some harmonics cannot be present, the weighted sum may be scaled to compensate for the smaller number of harmonics.

It may be determined whether a musical event is detected (block 1280). For example, the weighted sum may be compared to a musical event detection threshold value. If the weighed sum is equal to or above a musical event detection threshold value (block 1280—YES), it may be determined that a musical event is present and the musical event may be output (block 1285). For example, it may be determined that the musical event corresponds to the MIDI key number i. According to an exemplary implementation, the musical event detection threshold value may be lowered when a musical event with the same pitch was detected in the previous fundamental frequency block, since it may be expected that a sustained musical event would have diminished in amplitude with time. Conversely, if the weighted sum is below a musical event detection threshold value (block 1280—NO), it may be determined that a musical event is not present. As illustrated in FIG. 12C, process 1200 may continue to block 1295, as described below.

Matched partials may be removed (block 1290). For example, when a musical event is detected, the peak-gram locations may be set to zero. For example, the peak-gram locations i, i+12, i+19, i+24, i+28, i+31, i+34, and i+36 may be removed to prevent the false detection of additional musical events based on the energy accounted for by the note at MIDI key number i.

It may be determined whether i may be incremented (block 1295). For example, after setting peak-gram locations to zero, it may be determined whether i may be incremented by 1 (i+1) so as to detect other musical events corresponding to other MIDI key numbers. If it is determined that i may be incremented (e.g., the last MIDI key number has not been considered) (block 1295—YES), process 1200 may continue to block 1275. If it is determined that i may not be incremented (e.g., the last MIDI key number has been considered) (block 1295—NO), process 1200 may end.

Although FIGS. 12A-12C illustrate exemplary process 1200 for detecting a fundamental frequency associated with a musical event, in other implementations, process 1200 may include additional operations, fewer operations, and/or different operations than those illustrated in FIGS. 12A-12C and described. For example, according to another implementation, fundamental frequency detection may be performed by searching the peak-gram for evidence of a musical event (e.g., note) according to the following. For example, a musical event with a corresponding MIDI key number i, and where p[k] represents the value of the peak-gram array value for MIDI key number k, a summation may be calculated according to the following exemplary expression:

$$p[i]+\min(p[i],p[i+12])+\min(p[i],p[i+19])+\min(p[i],p[i+24])+\min(p[i],p[i+28])+\min(p[i],p[i+31])+\min(p[i],p[i+34])+\min(p[i],p[i+36]) \quad (2)$$

For high frequencies, where some harmonics cannot be present, the sum may be scaled to compensate for the smaller number of harmonics. This resulting summation may be compared to the musical event detection threshold value, as previously described.

Additionally, as previously described, music instruction system 115 may use other forms of input analysis (e.g., template matching, machine learning, non-negative matrix factorization, etc.). For example, music instruction system 115 may utilize multiple methods of pitch analysis, depending on the musical instrument and/or the musical piece. For example, a method that may be optimized for lower register musical events may be used for musical pieces that feature lower register notes. Conversely, a method that may be optimized for higher register musical events may be used for musical pieces that feature higher register notes. Additionally, or alternatively, a method optimized for monophonic pitch detection may be used for monophonic music passages and/or a method optimized for fast-note note detection may be used for fast-note music passages. In this regard, music instruction system 115 may include profiles of musical pieces to adaptively select one or more fundamental frequency detection methods.

In addition to frequency detection, music instruction system 115 may evaluate other musical characteristics of a musical event performed by a user. For example, music instruction system 115 may evaluate an onset time of a musical event, a release time of a musical event, duration of a musical event, an amplitude of a musical event, or an amplitude contour of a musical event. According to an exemplary implementation, music instruction system 115 may evaluate the amplitude of a musical event based on a sound pressure level, decibel level, or some other measurement of loudness, and map the measurement of loudness to a dynamic level specified in the musical piece. For example, the musical piece may specify a dynamic level of piano (p) and music instruction system 115 may map the dynamic level to range of loudness. Further, the musical piece may specify a crescendo from piano (p) to forte (f) and music instruction system 115 may map the dynamic contour to a loudness contour.

Fundamental frequency detection may be guided by a set of expected fundamental frequencies. By referring to the expected or correct frequencies, the fundamental frequency detection process 1200 may be biased so as to avoid missing musical events that the user actually plays and to avoid detecting incorrect musical events that the user does not play. In this way, the likelihood of falsely penalizing the user for correct performance may be reduced. This may occur at the expense of falsely crediting the user for the correct performance of some musical events, but generally the user will find more satisfaction in receiving too much credit than in being wrongly penalized for correct performance. To bias the fundamental frequency detection process 1200, the musical event detection threshold described above can be adjusted upward to lower the likelihood of detecting a fundamental frequency, or downward to increase the likelihood of detecting a fundamental frequency. For example, if a note is in the performance cue data 415, the detection may be biased toward detecting the fundamental frequency for that note by lowering the musical event detection threshold. If the note is not in the performance cue data 415, the detection may be biased against detecting the fundamental frequency for that note by raising the musical event detection threshold. This is one example of how frequency detection can be biased depending upon expected frequencies present in the performance cue data 415, but other methods of biasing detection may also be used individually or in combination.

According to an exemplary implementation, music instruction system may evaluate the onset time of a musical event based on frequency detection or amplitude. For example, with respect to contiguous musical events having different pitches, music instruction system 115 may evaluate their respective onset times based on frequency detection. Additionally, or alternatively, music instruction system 115 may evaluate an onset time based on amplitude. For example, a sudden increase in amplitude relative to an amplitude associated with a previous onset block, as described above in FIG. 12, may indicate an onset of a musical event. Conversely, music instruction system 115 may evaluate a release time of a musical event based on relative amplitudes between onset blocks. Music instruction system 115 may evaluate the duration of a musical event based on the onset time and the release time.

Music instruction system 115 may compare evaluated musical events performed by the user to expected musical events performed by the expert. Based on the comparison, music instruction system 115 may calculate various scores, statistics, feedback, etc.

FIG. 13 is a diagram illustrating an exemplary process in which music instruction system 115 may evaluate a musical event and score the musical event. As illustrated, a Graph 1 and a Graph 2 are provided. Graph 1 includes a timeline 1300 along an x axis and a score line 1305 along a y axis. Graph 2 includes timeline 1300 along the x axis and a frequency line 1315 along they axis.

Referring to Graph 1, and according to an exemplary case, it may be assumed that Graph 1 represents an expected musical event to have a cue start at 34.0 seconds (i.e., an onset of the expected musical event) and a cue end at 35.0 seconds (i.e., a release time of the expected musical event). In addition, surrounding the cue start, is illustrated an onset tolerance ranging from 33.875-34.125 that provides a tolerance for an early or a late onset time of a musical event performed by the user. Similarly, surrounding the cue end, is illustrated an end tolerance ranging from 34.875-35.125 that provides a tolerance for an early or a late release time of a musical event performed by the user. According to an exemplary implementation, the onset tolerance and the end tolerance have a relationship to score line 1305. For example, as illustrated, a score assigned to a musical event performed by the user may vary depending on the proximity of the onset time and the release time of the musical event relative to the expected musical event. For example, when the onset time of the musical event performed by the user is identical to the onset time of the musical event performed by the expert, music instruction system 115 may award a score of 1.0. However, when the onset time of the musical event performed by the user is not identical but within the onset tolerance range, music instruction system 115 may award a score of less than 1.0. When the onset time of the musical event performed by the user is not within the onset tolerance range, music instruction system 115 may award a score between 0.0 and −1.0 (not illustrated). Music instruction system 115 may award a score with respect to release time in a similar manner. Additionally, music instruction system 115 may evaluate a duration of a musical event performed by the user based on the onset time and the release time, and may calculate an appropriate score.

Referring to Graph 2, music instruction system 115 may evaluate the fundamental frequency of a musical event performed by the user. For example, assume that the fundamental frequency of the expected musical event is 440 Hz. In this example, music instruction system 115 may evaluate the fundamental frequency with a frequency tolerance between 438 Hz-442 Hz. As indicated by user performance frequency 1320, the fundamental frequency associated with the musical event performed by the user is a little sharp (e.g., higher than 440 Hz). Although not illustrated, music instruction system 115 may award a score to the musical event performed by the user with respect to frequency in a manner similar to that described above.

Music instruction system 115 may evaluate musical events that include a variation of one or more musical characteristics (e.g., frequency, amplitude, etc.) over time. For example, music instruction system 115 may evaluate continuous musical gestures, such as slides, bends, scoops, vibrato, or the like.

Figure 14:
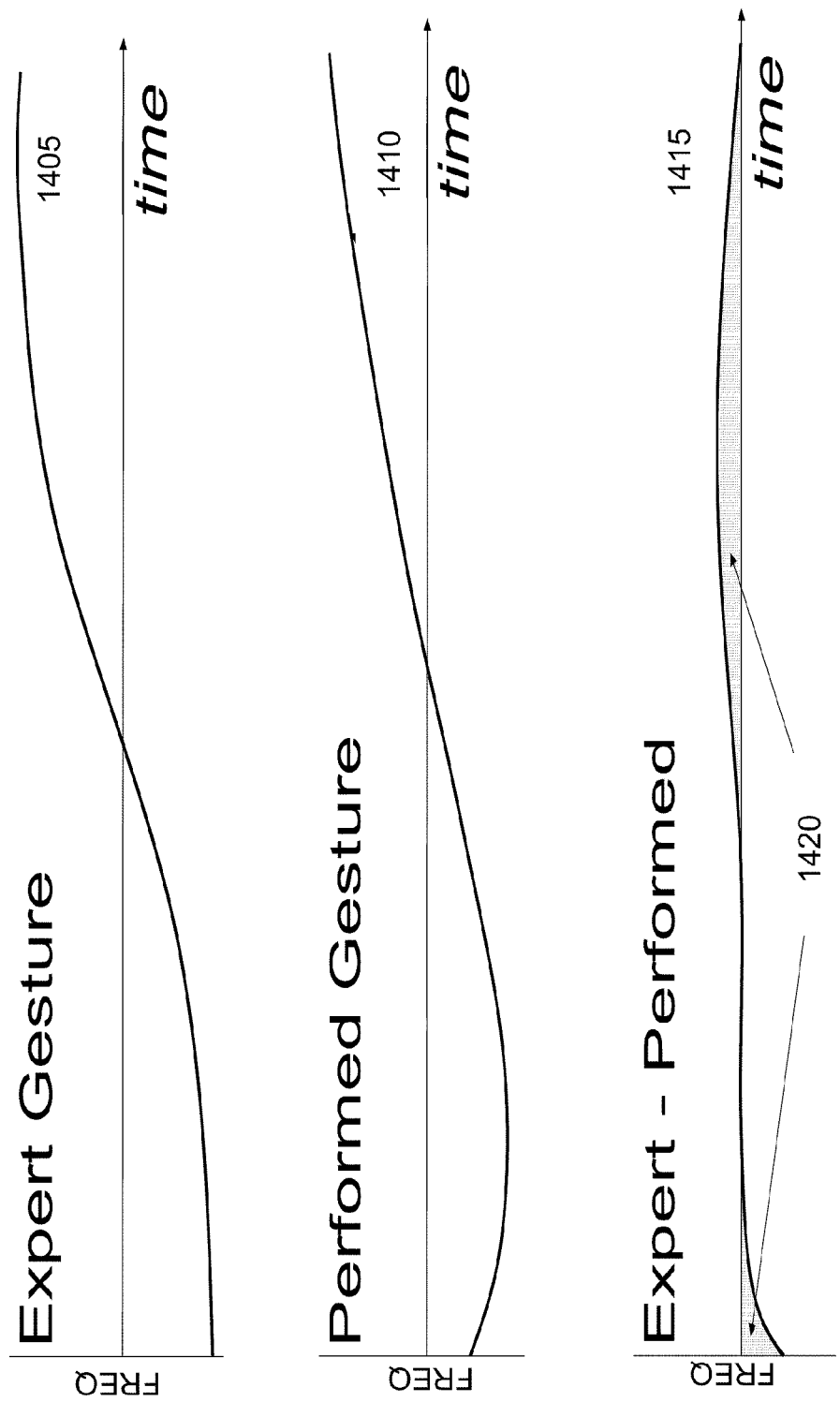
FIG. 14 is a diagram illustrating an exemplary process in which the music instruction system may evaluate a continuous musical gesture based on the fundamental frequency(s) associated with the continuous musical gesture.

FIG. 14 illustrates an exemplary process in which music instruction system 115 may evaluate a continuous musical gesture based on the fundamental frequency(s) associated with the continuous musical gesture. For example, the fundamental frequency(s) may be considered as a function over time (i.e., the duration of a performance cue for the particular musical gesture). According to an exemplary implementation, music instruction system 115 may evaluate a continuous musical gesture based on information associated with a fundamental frequency envelope 1405 that may be associated with an expert's performance of the continuous musical gesture, a fundamental frequency envelope 1410 associated with a user's performance of the continuous musical gesture, and an error fundamental frequency envelope 1415.

According to an exemplary implementation, music instruction system 115 may calculate a difference between fundamental frequency envelope 1405 and fundamental frequency envelope 1410 to generate error fundamental frequency envelope 1415. According to such an implementation, an integral of the absolute value of the error (i.e., the difference between fundamental frequency envelopes 1405 and 1410), which is illustrated by area portions 1420, may represent a measure of error or accuracy of the performance of the continuous musical gesture. In such an implementation, the smaller the total area associated with area portions 1420, the greater the accuracy associated with the performance of the continuous musical gesture. Conversely, the greater the total area associated with area portions 1420, the lesser the accuracy associated with the performance of the continuous musical gesture.

According to an exemplary implementation, music instruction system 115 may calculate points based on the total area associated with area portions 1420. For example, music instruction system 115 may divide the total area by a number or multiply the total area by a number to calculate a points-based score. Additionally, according to an exemplary implementation, music instruction system 115 may consider other factors when calculating the score, such as, for example, the difficulty level of the continuous musical gesture, the difficulty level of the musical piece, as well as other musical characteristics (e.g., release time, amplitude, etc.) and scoring thereof.

As previously described, music instruction system 115 may provide feedback to a user during a session. For example, music instruction system 115 may provide a tallying score to the user as the user is performing. Additionally, or alternatively, music instruction system 115 may provide a final score, as well as other types of scores (e.g., comparison scores, best score, etc.), statistics, etc., to the user. According to an exemplary implementation, music instruction system 115 may calculate a score based on how accurately musical events are played. For example, a score may be calculated according a process described below.

Figure 15:
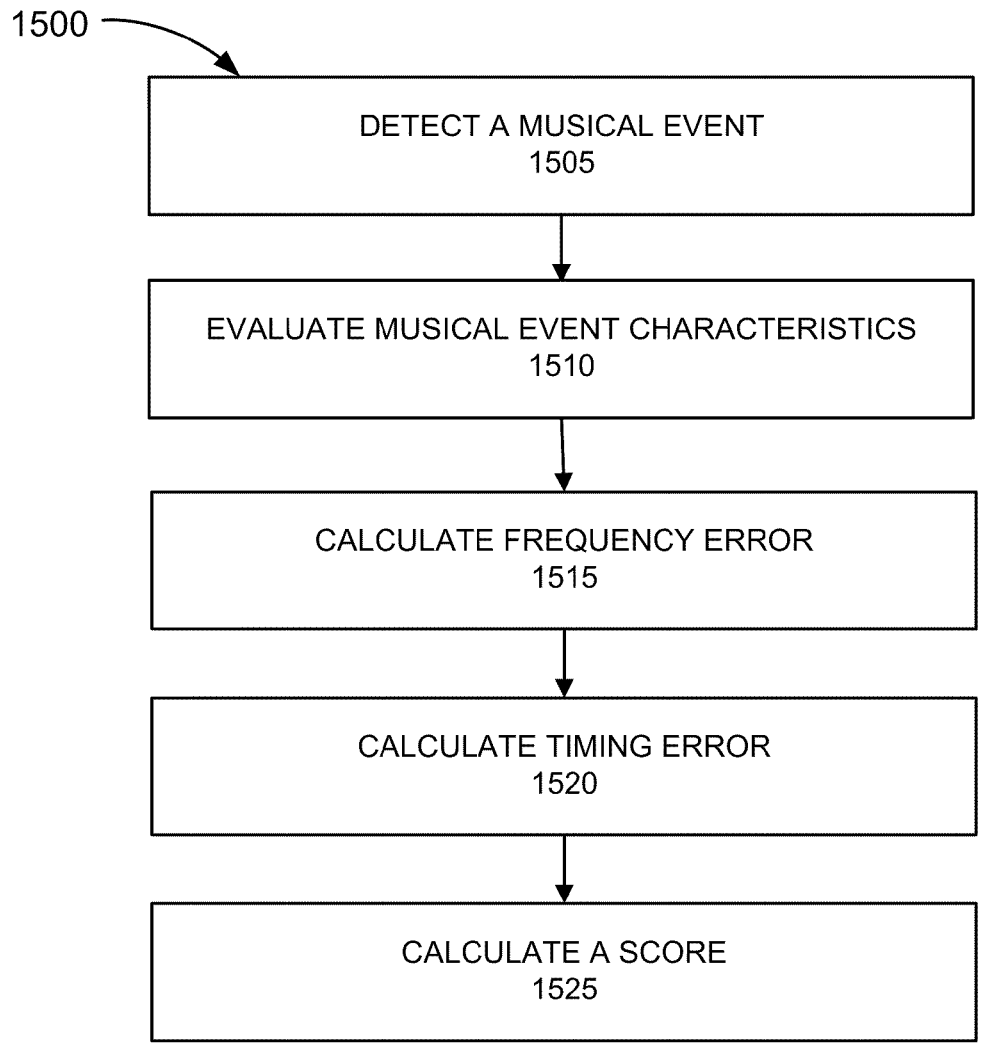
FIG. 15 is a diagram illustrating an exemplary process in which the music instruction system may calculate a score.

FIG. 15 is a diagram illustrating an exemplary process 1500 in which music instruction system 115 may calculate a score. According to an exemplary implementation, the score may include a measure of accuracy in relation to one or more musical characteristics associated with a musical event. For example, as previously described, the musical characteristic may correspond to frequency, amplitude, onset time, release time, duration, amplitude contour, and/or frequency contour. For purposes of discussion, with respect to process 1500, the musical event characteristics may include an onset time, a release time, and a fundamental frequency. According to other implementations, additional, fewer, and/or different musical characteristics associated with a musical event may be considered to calculate the score, as described further below. Furthermore, according to an exemplary implementation, music instruction system 115 may detect monophonic or polyphonic musical events performed by the user.

As illustrated in FIG. 15, process 1500 may include detecting a musical event (block 1505). Music instruction system 115 may detect a musical event played by the user. As previously described, music instruction system 115 may detect the musical event based on audio data received from the musical instrument.

Musical event characteristics may be evaluated (block 1510). Music instruction system 115 may evaluate musical event characteristics associated with the user-performed musical event. For example, music instruction system 115 may use one or more fundamental frequency detection algorithms, and/or perform amplitude evaluation, onset time evaluation, release time evaluation, duration evaluation, amplitude contour evaluation, frequency contour evaluation, etc. However, for purposes of discussion, according to this example, music instruction system 115 may use one or more fundamental frequency algorithms, which may include the fundamental frequency algorithm described above with respect to FIGS. 12A-12C, and onset time and release time evaluations.

A frequency error may be calculated (block 1515). Music instruction system 115 may compare a fundamental frequency associated with the detected musical event to a fundamental frequency associated with the expected musical event. For example, fundamental frequencies $f_1$ and $f_2$ associated with the detected musical event and the expected musical event may be converted to logarithmic scales $s_1$ and $s_2$ based on the following exemplary expression:

$$s = \log_2(f/r)*12 = 69, \quad (3)$$

where r is 440 Hz, the standard frequency for the musical event $A_4$, 12 represents a multiplicative for an octave, and 69 represents a MIDI note value for the musical event $A_4$.

Different values for r may be used to adjust to a tuning of the musical data (i.e., the expected musical event) and/or the user (i.e., the detected musical event). According to an exemplary implementation, converting the fundamental frequencies to a logarithmic scale may permit a frequency error to be expressed as a ratio of the fundamental frequencies. In other words, an interval expressed in semitones between the fundamental frequencies may correspond to a musical interval, which may be more meaningful than simply a frequency difference. According to this implementation, if the fundamental frequencies $f_1$ and $f_2$ are converted to $s_1$ and $s_2$, then a frequency error in semitones may be calculated according to the exemplary expression $s_1 - s_2$.

A timing error may be calculated (block 1520). Music instruction system 115 may compare an onset time associated with the detected musical event to an onset time associated with the expected musical event. For example, if an onset time is $t_1$ for the detected musical event and an onset is $t_2$ for the expected musical event, then a timing error may be calculated according to the exemplary expression $t_1-t_2$. Music instruction system 115 may also compare a release time associated with the detected musical event to a release time associated with the expected musical event. Similarly, music instruction system 115 may calculate a timing error according to the exemplary expression $t_1-t_2$.

A score may be calculated (block 1525). Music instruction system 115 may calculate a score based on the frequency error and the onset error. For example, the score may be calculated based on the following exemplary expression:

$$\text{score}=(\exp(-(t_1-t_2)^2)/v_t)*(\exp(-(s_1-s_2)^2)/v_s) \quad (4),$$

where $v_t$ is a time factor variable and $v_s$ is a frequency factor variable.

The value of $v_t$ may be adjusted to make the score more or less tolerant of timing errors and the value of $v_s$ may be adjusted to make the score more or less tolerant of frequency errors. According to an exemplary implementation, the values for $v_t$ and $v_s$ may be adjusted according to a difficulty level, such as, beginner or expert, so as to influence the score. Furthermore, the value for $v_t$ may be changed in correspondence to a tempo of the musical piece. For example, the value for $v_t$ may be smaller when the tempo is faster. As a result, the user may have to perform with a finer timing accuracy (e.g., within a smaller time window) to obtain a score that is the same as when the tempo is slower.

According to another exemplary implementation, the score may also be calculated based on the following exemplary expression:

$$\text{score}=(\exp(-|t_1-t_2|)/v_t)*(\exp(-(s_1-s_2)^2)/v_s) \quad (5),$$

where according to expression (5), a penalty for timing errors may not increase as rapidly as in expression (4).

According to an exemplary implementation, the scores may have values between zero and one. In such instances, music instruction system 115 may modify these scores by multiplying the scores with a scalar and rounding the scores to the nearest integer values so that the scores displayed to the user are whole numbers. According to an exemplary implementation, the value of the scalar may be based on the level of difficulty associated with the musical piece.

In some instances, multiple detected musical events could match a single expected musical event, which may result in an accumulation of points when extra musical events are played. To ensure that an expected musical event is matched only once with a detected musical event, music instruction system 115 may associate a single score with each expected musical event. When multiple detected musical events are matched to the expected musical event, according to an exemplary implementation, music instruction system 115 may select the detected musical event that yields the highest score. According to an exemplary implementation, music instruction system 115 may select a musical event to compare to an expected musical event based on a time tolerance surrounding the expected musical event. However, in some instances, a user may play multiple musical events even though one expected musical event is expected in accordance with the musical piece.

According to another implementation, music instruction system 115 may subtract a penalty score associated with each extra detected musical event so that the extra detected musical event played may penalize the user and reduce his/her score. In this way, when the user plays extra musical events, the score may not be higher than when the user plays the correct number of musical events.

While it has been described that musical characteristics, such as, for example, onset time and fundamental frequency, associated with a performed musical event (e.g., a detected note) may be compared to corresponding musical characteristics of an expected musical event (e.g., an expected note) in order to calculate a score, other types of musical characteristics associated with a musical event may be evaluated and scored. For example, music instruction system 115 may perform amplitude contour evaluation, frequency contour evaluation, rhythmic evaluation (e.g., based on onset time, release time, duration), timbre evaluation (e.g., frequency spectrum evaluation) for musical pieces that include phrases, such as, for example, bright, flat, warm, etc. Additionally, some musical characteristics may have a greater applicability to some musical instruments than other musical instruments. For example, the tonal qualities or frequencies associated with drums of a drum set may not be relevant in determining a score. However, music instruction system 115 may determine whether the correct drum is played based on the tonal features of the drum. For example, a bass drum or a floor tom may have lower tonal qualities compared to a rack tom or a snare drum. Music instruction system 115 may calculate a score based on whether the correct drum is played, in addition to whether the rhythmic characteristics of the musical events are correctly played. In the case of MIDI musical instruments, timing, velocity, pitch bend wheel are examples of musical characteristics that may be evaluated.

According to an exemplary embodiment, when the user performs musical events, these musical events may be detected and matched to the corresponding expected musical events. For example, as previously described, according to an exemplary implementation, performance evaluation manager 320 may evaluate the extent with which a musical event is played correctly or not. For example, music instruction system 115 may provide frequency tolerances, amplitude tolerances, onset time tolerances, release time tolerances, etc., associated with various musical characteristics of musical events and be able to ascertain an extent with which user-performed musical events are played correctly or not.

Based on this detection, evaluation, and comparison approach, music instructions system 115 may provide the user with appropriate feedback (e.g., negative feedback or positive feedback). For example, according to an exemplary embodiment, music instruction system 115 may provide varying levels of positive feedback or varying levels of negative feedback in correspondence to the extent of correctness or incorrectness of user-performed musical events. For example, music instruction system 115 may provide varying levels of positive/negative visual feedback and varying levels of positive/negative audio feedback in correspondence to the extent of correctness or incorrectness. Examples of varying levels of positive feedback and negative feedback are described further below.

Additionally, as previously described, according to an exemplary embodiment, the difficulty level of the session may be static throughout the session. According to another implementation, the difficulty level of the session may be dynamic. For example, music instruction system 115 may automatically increase the difficulty level of the session or automatically decrease the difficulty level of the session during the session. According to an exemplary implementation, music instruction system 115 may adjust the difficulty level of session based on the user's performance and/or feedback (e.g., score, etc.). For example, when the user's performance is evaluated to be positive and/or the user's score or other performance related statistics, etc. exceeds a threshold value, music instruction system 115 may automatically increase the difficulty level of the session. Conversely, when the user's performance is evaluated to be negative and/or the user's score or other performance related statistics, etc., is below a threshold value, music instruction system 115 may automatically decrease the difficulty level of the session. According to one implementation, when the user's performance is evaluated to be extremely negative or below a stoppage threshold value, music instruction system 115 may automatically end the session. In such cases, music instruction system 115 may communicate to the user, that the user needs more practice or should begin a new session.

Figure 16:
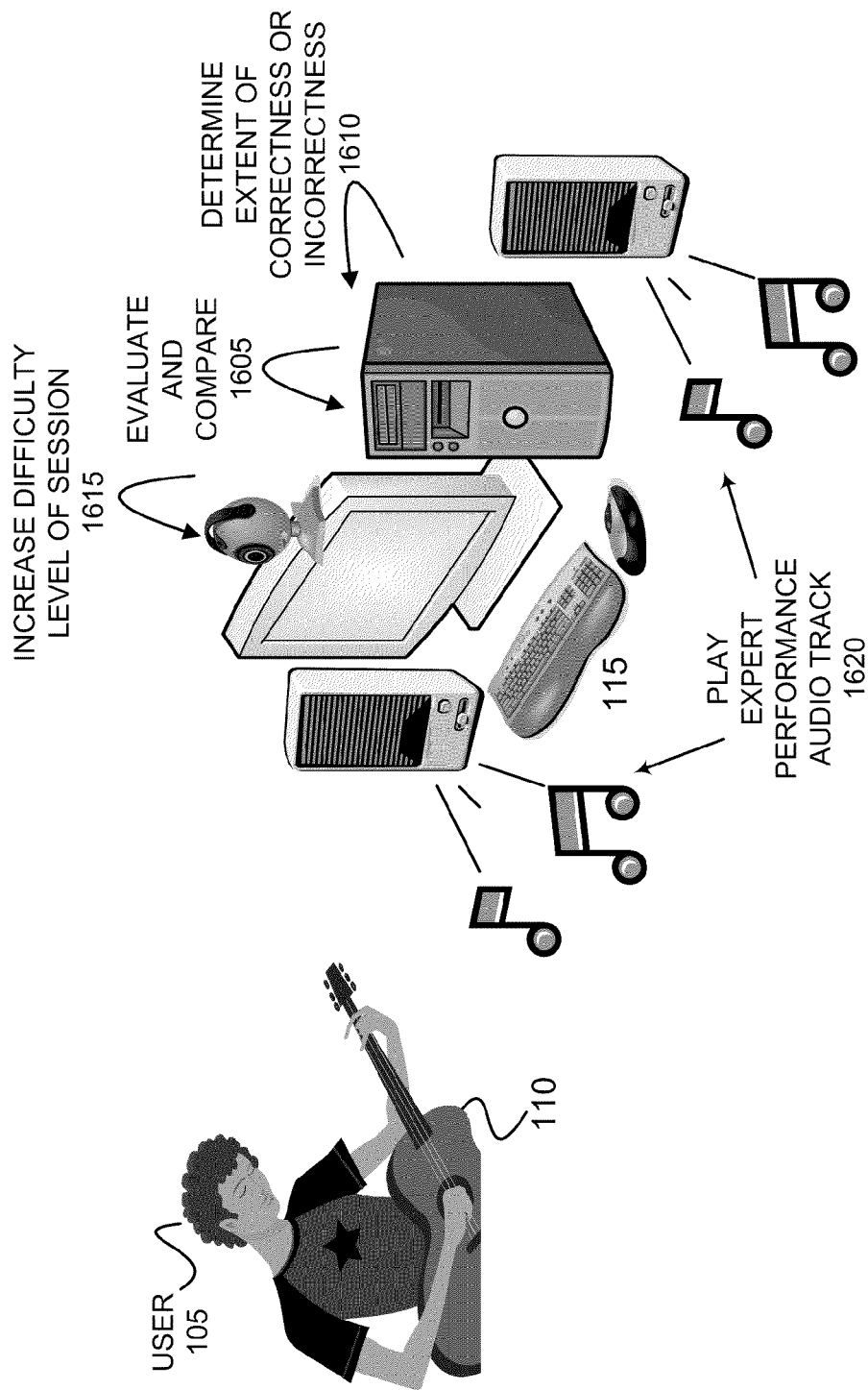
FIG. 16 is a diagram illustrating an exemplary process in which the music instruction system may provide feedback to a user based on the user's performance.

FIG. 16 is a diagram illustrating an exemplary process in which music instruction system 115 may provide feedback to a user based on the user's performance. As illustrated, assume that user 105 is performing a musical piece on musical instrument 110 (e.g., a guitar). Music instruction system 115 (e.g., performance evaluation manager 320) may evaluate and compare 1605 user-performed musical events to expected musical events. Music instruction system 115 may then determine the extent of correctness or incorrectness 1610 of the user-performed musical events. In this example, it may be assumed that user's 105 performance exceeded a threshold score value, and music instruction system 115 automatically increases the difficulty level of the session 1615 from, for example, skilled to difficult. Music instruction system 115 also changes visual performance cues from a skilled level to a difficult level. Additionally, according to an exemplary implementation, music instruction system 115 (e.g., feedback manager 325) may mute the audio of user's 105 performance and may play the expert performance audio track 1620 along with other auditory musical piece data (e.g., accompaniment audio track 410). In this way, user 105 may sound exactly like the expert as user 105 performs the musical piece correctly. As previously described, according to other implementations, feedback manager 325 may play other audio data (e.g., both expert performance audio track 405 and user's 105 performance, only user's 105 performance, etc.), as well as introduce signal processing effects, based on the user's 105 performance. According to other implementations, musical data may include expert performance data in the form of audio and video (e.g., a music video, etc.) compared to only audio (e.g., expert performance audio track 405). In such instances, music instruction system 115 may govern the audio associated with the audio/video in a manner as described with respect to expert performance audio track 405. That is, the audio may be used as a feedback mechanism. Further, music instruction system 115 may govern the video associated with the audio/video as a feedback mechanism. For example, music instruction system 115 may control the clarity of the video (e.g., introduce blurriness, introduce static, enhance the clarity of the video, etc.), content of the video (e.g., fade-in or fade-out between an expert performer playing and the user playing), and/or other aspects of the video (e.g., introduce visual effects, etc.). According to an exemplary embodiment, analogous to the audio manipulation, music instruction system 115 may manipulate the visuals in accordance with the extent with which the user correctly performs musical event(s) or incorrectly performs musical event(s).

Music instruction system 115 may display positive feedback and negative feedback to the user using various user interfaces. By way of example, but not limited thereto, performance cue manager 310 may include visual cues to the user to indicate positive feedback and negative feedback. A user interface may also include other types of cues (e.g., auditory cues) to indicate positive feedback and negative feedback to the user. Described below are examples of cues that may be implemented by music instruction system 115 to indicate positive feedback and negative feedback to the user.

Figure 17:
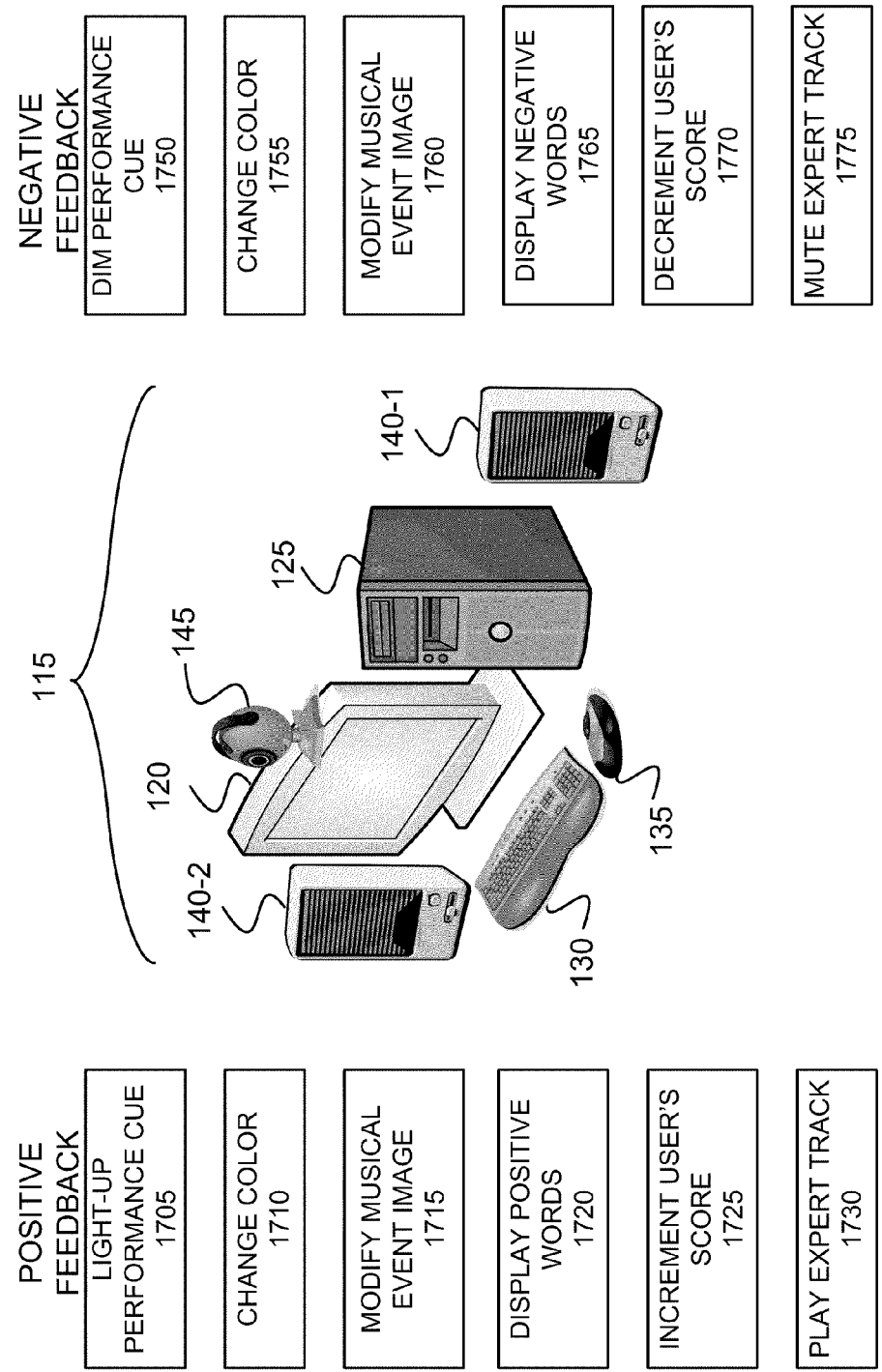
FIG. 17 is a diagram illustrating exemplary positive feedback and negative feedback that may be provided to a user.

FIG. 17 is a diagram illustrating exemplary positive feedback and negative feedback that may be provided to a user. As previously described, music instruction system 115 (e.g., feedback manager 325) may provide varying levels of positive feedback or varying levels of negative feedback to the user. According to an exemplary implementation, the positive feedback and the negative feedback may relate to the success or to the failure of the user's ability to play a musical event/musical piece correctly. Music instruction system 115 may provide the feedback to the user visually, auditorily, and/or tactilely. Music instruction system 115 may provide visual feedback to the user via one or more user interfaces of music instruction system 115. Furthermore, music instruction system 115 may provide auditory feedback via an auditory output (e.g., through speakers 140). Still further, music instruction system 115 may provide tactile feedback (e.g., using a vibratory mechanism, such as when music instruction system 115 is implemented with a portable or a handheld device).

With reference to positive feedback, music instruction system 115 may provide the user with various types and levels of visual and/or auditory positive feedback. For example, music instruction system 115 may light-up a performance cue 1705 when the user performs an expected musical event correctly. Additionally, or alternatively, music instruction system 115 may provide to the user other types of positive visual cues, such as, for example, changing the color of the displayed musical event 1710, modifying the musical event image 1715, or displaying positive words in text 1720 to denote positive feedback. Music instruction system 115 may provide varying levels of positive feedback with respect to these visual cues by displaying varying levels of luminosity, using different colors, using different shapes, etc., to indicate a gradation of positive feedback. Additionally, music instruction system 115 may display positive words in correspondence to the level of positive feedback. By way of example, but not limited thereto, positive words, such as "OK," "Good," "Great," and "Excellent," may represent varying levels of positive feedback. Additionally, or alternatively, music instruction system 115 may increment the user's score 1725, the extent of which may depend on the extent of the correctness of the user-performed musical events.

Additionally, or alternatively, as previously described, according to one implementation, music instruction system 115 may play the expert performance audio track 1730 and mute the audio produced by the user's performance. According to another implementation, music instruction system 115 may output a mix of both the expert performance audio track and the user's performance. According to an exemplary implementation, music instruction system 115 may bias the mix to the expert performance audio track in correspondence to the extent of correctness of the user's performance. According to another exemplary implementation, music instruction system 115 may mute the expert performance audio track and provide only the user's performance.

Music instruction system 115 may provide other types of positive feedback cues. For example, music instruction system 115 may play pre-recorded approval tracks. For example, the pre-recorded approval tracks may include cheers of a crowd, or a virtual instructor voicing encouraging remarks, such as, "You got it!," "Good job!," "Impressive," or the like. The pre-recorded approval tracks may be assigned varying levels of positive feedback, which may be played in correspondence to the extent of correctness of the user's performance.

Additionally, or alternatively, music instruction system 115 may utilize the user's name to generate more personalized remarks, such as, for example, "Getting better Harold," "Nice performance Roger," or the like. For example, the user may provide his/her name to music instruction system 115 (e.g., during an initial set-up). Additionally, or alternatively, music instruction system 115 may play pre-recorded video to indicate positive feedback to the user. For example, the pre-recorded video may include music fans cheering or a virtual instructor showing expressions of approval. Similarly, the pre-recorded video may be assigned varying levels of positive feedback, which may be displayed in correspondence to the extent of correctness of the user's performance. Additionally, or alternatively, music instruction system 115 may display visual effects, such as, for example, screen brightening, screen vibrations, or other suitable video and/or visual effects to provide positive feedback. Additionally, or alternatively, music instruction system 115 may output auditory effects to provide positive feedback. For example, music instruction system 115 may introduce signal processing (e.g., reverb, echo, chorus, flange, harmony, etc.) to enhance the user's performance. The extent of the signal processing may vary in correspondence to the extent of correctness of the user's performance.

With reference to negative feedback, music instruction system 115 may provide the user with various types and levels of visual and/or auditory negative feedback. For example, music instruction system 115 may dim a performance cue 1750 when the user performs an expected musical event incorrectly. Additionally, or alternatively, music instruction system 115 may provide to the user other types of negative visual cues, such as, for example, changing the color of the displayed note 1755, modifying the musical event image 1760, or displaying negative words in text 1765 to denote negative feedback. Music instruction system 115 may provide varying levels of negative feedback with respect to these visual cues by displaying varying levels of luminosity, using different colors, using different shapes, etc., to indicate a gradation of negative feedback. Additionally, music instruction system 115 may display negative words in correspondence to the level of negative feedback. By way of example, but not limited thereto, negative words, such as "Poor," "Bad," "Terrible," and "Horrible," may represent varying levels of negative feedback. Additionally, or alternatively, music instruction system 115 may decrement the user's score 1770, the extent of which may depend on the extent of the incorrectness of the user-performed musical events.

Additionally, or alternatively, as previously described, according to one implementation, music instruction system 115 may mute expert performance tracks 1775 or play the expert performance audio track at a very low output level. According to another implementation, music instruction system 115 may output a mix of both the expert performance audio track and the user's performance. According to an exemplary implementation, music instruction system 115 may bias the mix to the user's performance in correspondence to the extent of incorrectness of the user's performance.

Music instruction system 115 may provide other types of negative feedback cues. For example, music instruction system 115 may play pre-recorded unpleasant tracks that are appropriate for the musical instrument on which the performance errors were performed. For example, in the instance that the musical instrument corresponds to a guitar, the pre-recorded unpleasant tracks may include a feedback sound, a squelch, a chunk, or the like. According to an exemplary implementation, music instruction system 115 may automatically end a session if the number of incorrectly performed musical events exceeds a stoppage threshold value.

Additionally, or alternatively, music instruction system 115 may play pre-recorded disapproval tracks. For example, the pre-recorded disapproval tracks may include boos of a crowd, or a virtual instructor voicing discouraging remarks, such as, "Missed it!," "Need improvement!," "What happened," or the like. Additionally, or alternatively, music instruction system 115 may utilize the user's name to generate more personalized remarks, such as, for example, "Needs more work Harold," "You need to practice Roger," or the like. Additionally, or alternatively, music instruction system 115 may play pre-recorded video to indicate negative feedback to the user. For example, the pre-recorded video may include music fans booing, music fans walking out of the performance, or a virtual instructor showing expressions of disapproval. Additionally, or alternatively, music instruction system 115 may display visual effects, such as, for example, screen dimming, screen vibrations, or other suitable video and effects. Additionally, or alternatively, music instruction system 115 may output auditory effects to provide negative feedback. For example, music instruction system 115 may introduce signal processing (e.g., distortion, pitch shift, etc.) to degrade or diminish the user's performance.

Music instruction system 115 allows beginners, as well as more advanced users, to hear an expert rendition of a musical piece being played in synchrony with the user's performance, even if the user does not perform all of the musical events. For example, when the difficulty level of a musical piece is set to a low level, the user may be required to play only one out of every N musical events, where N>1. If that single musical event is played correctly, the user may experience the other N−1 notes being played perfectly, by hearing the expert performance. In another example, when the difficulty level is set to a high level (e.g., an expert level), the user may be required to correctly play each of N musical events. In such an implementation, music instruction system 115 may not substitute any pre-recorded musical events for the user.

According to such an instructional approach, music instruction system 115 may allow the user to be introduced to his/her musical instrument in a stepwise and progressive manner, which may begin with the user playing some musical events of a musical piece and guiding the user to ultimately play all of the musical events of the musical piece. In this way, an expert proficiency level is not immediately required, and the user may gradually become familiar with his/her musical instrument, the musical piece, and improve their musical ability. In such an approach, music instruction system 115 may provide a highly enjoyable learning experience for the user. As the user progresses and gains skill from session to session, the value of N may be gradually reduced to 1.

Music instruction system 115 may provide other features to help the user. For example, music instruction system 115 may allow the user to adjust the tempo of the musical piece. For example, a beginner user may choose to slow down the tempo of the musical piece in comparison to the original tempo, and a more advanced user may chose to speed up the tempo of the musical piece. Music instruction system 115 may also allow the user to loop a specific section of the musical piece. For example, if the musical piece includes a solo section, which may be the most difficult section of the musical piece, the user may practice only the solo section instead of the entire musical piece. Further, the user may practice only the solo section at a reduced tempo.

Additionally, at higher difficulty levels, music instruction system 115 may provide the user with performance cues not corresponding to a pre-recorded expert performance (e.g., expert performance audio tracks 405). For example, music instruction system 115 may provide performance cues that include melodic enhancements (e.g., melodic embellishments, etc.), harmonic substitutions (e.g., reharmonization, etc.), tempo changes, time changes, etc. Additionally, music instruction system 115 may permit the user to hear a mixture of the pre-recorded accompaniment (e.g., accompaniment audio tracks 410) and the user's performance, just the user's performance, or an enhanced version of the user's performance (e.g., a signal-processed version, etc.).

Figure 18:
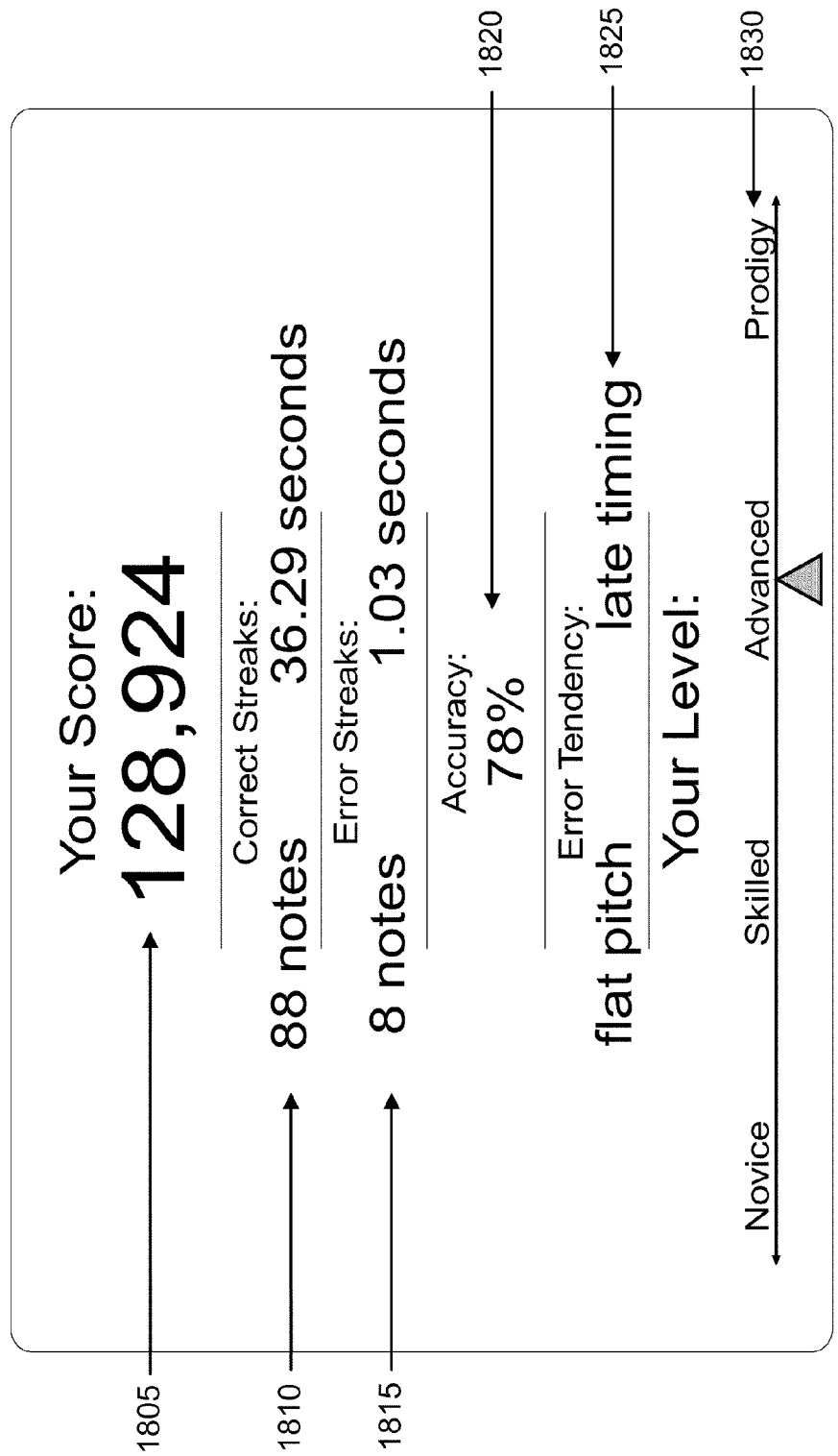
FIG. 18 is a diagram illustrating an exemplary user interface of the music instruction system that includes scoring information.

As previously described, music instruction system 115 may track and report to the user the user's progress. For example, at the end of a session, successful or not, the user may be presented with statistics regarding his/her performance. For example, FIG. 18 is a diagram illustrating an exemplary user interface of music instruction system 115 that includes scoring information. In other implementations, music instruction system 115 may include additional scoring information, different scoring information, and/or fewer scoring information.

As illustrated, the user interface may include an overall score 1805, longest correct streaks 1810, longest error streaks 1815, an accuracy score 1820 (e.g., a percentage of correct notes), an error tendency 1825, and a user level 1830.

Overall score 1805 may indicate an accumulation of points that accrued during the user's performance and session. For example, overall score 1805 may include the accumulation of accuracy points and bonus points. According to an exemplary implementation, overall score 1805 may be used by a virtual store to add musical pieces to the user's repertoire from which the user may select. FIG. 19 illustrates an exemplary user interface that allows a user to select a musical piece based on a user's overall score 1805. As illustrated in FIG. 19, a virtual store associated with music instruction system 115 may allow the user to select from musical pieces that have been unlocked when the user's overall score 1805 exceeds a particular threshold value. In this example, the user is able to select another musical piece (e.g., a song) since his/her overall score exceed 100,000 points.

Music instruction system 115 may enable other features based on overall score 1805. For example, music instruction system 115 may allow the user to perform along with an accompaniment, but instead of providing the user with performance cues and hearing expert performance audio tracks 405, music instruction system 115 may record the user's performance and translate the user's performance into a new set of performance cues. According to an exemplary implementation, the user's performance cues may be shared with other users. Music instruction system 115 may enable other features (e.g., different signal processing effects, etc.) based on overall score 1805.

Referring back to FIG. 18, longest correct streaks 1810 may indicate the number of contiguous notes correctly performed and a period of time within which those notes were played. Longest error streaks 1815 may indicate the number of contiguous notes incorrectly performed and a period of time within which those notes were played. Accuracy score 1820 may indicate a percentage corresponding to the accuracy of the user's performance. Accuracy score 1820 may be calculated based on process 1400 described above.

Error tendency 1825 may indicate different types of errors related to the user's performance. For example, error tendency 1825 may include error tendencies related to pitch (e.g., being sharp or flat) and timing errors (e.g., being late or early). Music instruction system 115 may also provide user interfaces that allow the user to review the user's performance and indicate (visually and/or auditorily) those portions in the musical piece where these errors were made by the user. In this regard, music instruction system 115 may assist the user in improving his/her performance by targeting portions in the musical piece with which the user had difficulty. Music instruction system 115 may provide to the user specific frequency offsets (e.g., in Hz) with respect to each off-pitch musical event. Additionally, music instruction system may provide to the user specific timing offsets (e.g., in milliseconds, etc.) with respect to each off-timed musical event. Music instruction system 115 may allow the user to loop through specific portions of the musical piece so as to improve his/her performance.

User level 1830 may indicate a level of the user based on the scores and statistics associated with the user's performance. For example, user level 1830 may include a range of levels, such as, novice, skilled, advanced, and prodigy. User level 1830 may assist the user in selecting a difficulty level for a subsequent session. As previously described, the user may select a particular difficulty level for any given session. According to an exemplary implementation, music instruction system 115 may provide different rewards (e.g., points, bonuses, etc.), feedback, etc., based on the difficulty level. According to other implementations, music instruction system 115 may not provide different rewards, feedback, etc. based on the difficulty level. Music instruction system 115 may also award bonus points (e.g., the multiplier described above with respect to performance results 555 in FIG. 5) for performing a musical piece above a particular accuracy score, number of correct streaks, etc.

Figure 20:
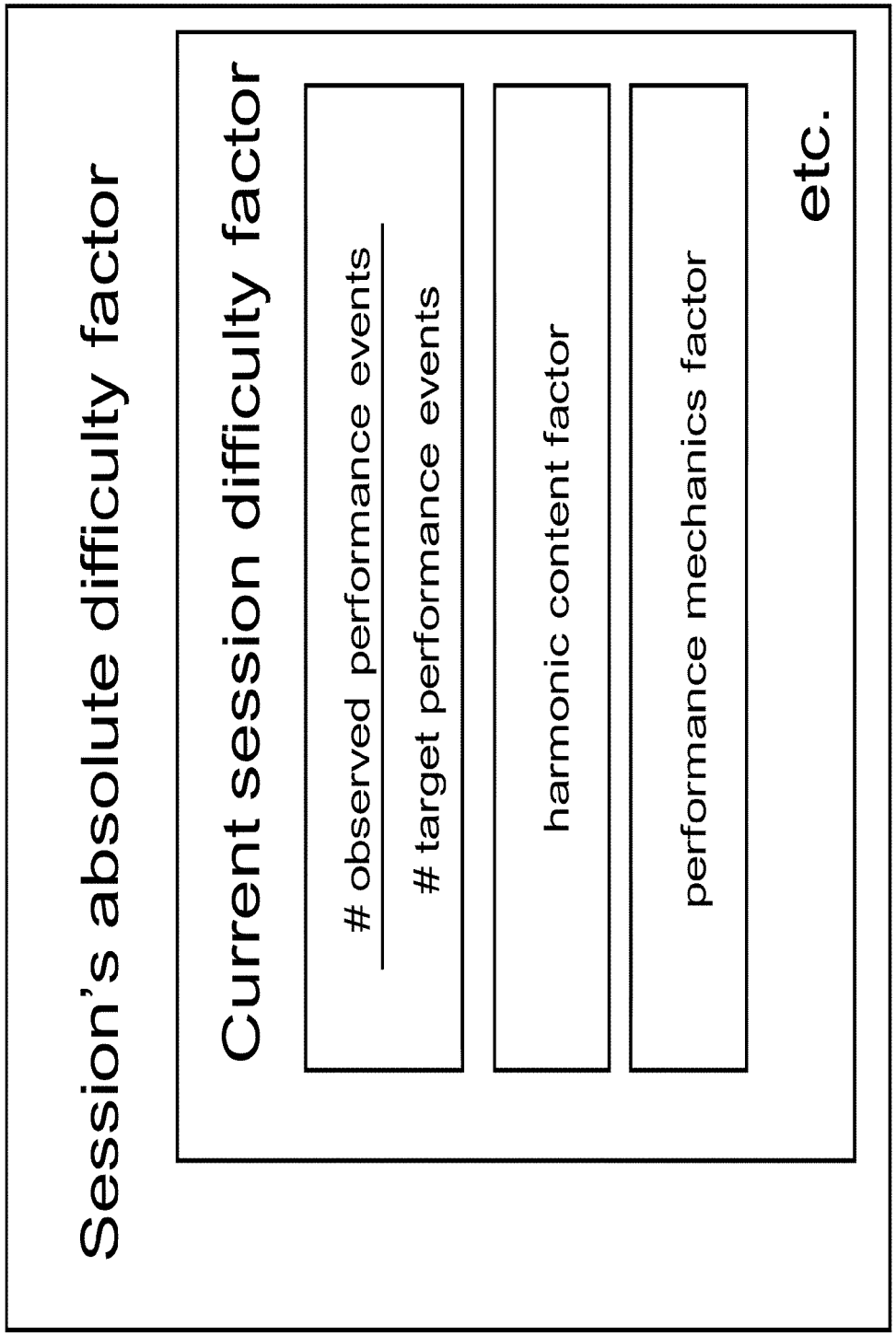
FIG. 20 is a diagram illustrating an exemplary process in which the music instruction system may calculate an overall score for a session.

FIG. 20 illustrates an exemplary process in which music instruction system 115 may calculate an overall score for a session. According to an exemplary implementation, the overall score may be based on a difficulty level associated with the musical piece. For example, when the musical piece corresponds to a C-major scale in comparison to a Bach concerto, music instruction system 115 may account for this factor when calculating the overall score. For example, music instruction system 115 may use factors, such as, for example, harmonic content and/or performance mechanics. For example, one musical piece may include simple chord progressions compared to another musical piece that may include complex chord progressions. Additionally, or alternatively, musical pieces may include a different range of chord structures (e.g., triads, seventh chords, chords with tensions, etc.). As an example of performance mechanics, one musical piece (e.g., a guitar piece) may span four frets and include few changes in fingering positions compared to another musical piece that may span over seven frets and include frequent changes in fingering positions. Music instruction system 115 may use other factors, such as, for example, melodic content, syncopation, time changes, number of observed musical events/number of expected musical events, etc., associated with the musical piece, to assign the difficulty level associated with the musical piece.

Additionally, or alternatively, the overall score may be based on a user difficulty level (e.g., novice, advanced, etc.) associated with the musical piece. For example, the easiest user difficulty level may allow the user to play the least number of notes associated with a musical piece compared to a higher user difficulty level that may require the user to play a greater number of notes. In this way, a user may select a difficult musical piece, but have the opportunity to play a streamlined and/or simplified version of the musical piece. According to an exemplary implementation, the potential of scoring points may be less when the user difficulty level is easy compared to when the user difficulty level is more advanced. Additionally, or alternatively, the overall score may be based on the user's accuracy in performing expected musical events. For example, an accuracy score may be based on the user's performance of musical events divided by the number of expected musical events.

FIG. 21 is a diagram illustrating an exemplary user interface of music instruction system 115 that may summarize the user's progress over time. For example, the user interface may include a time spent section 2105, a sessions started section 2110, a sessions completed section 2115, a high score section 2120, a session difficulty section 2125, an average score section 2130, and an accuracy section 2135. Additionally, as illustrated, the user interface may also include time periods 2140 that correspond to sections 2105-2135. According to other implementations, the user interface may include additional sections, different sections, and/or fewer sections than those illustrated in FIG. 21 and described herein. Additionally, or alternatively, according to other implementations, performance data associated with the user's progress may be presented in forms other than a table, such as, for example, a graph (e.g. a bar graph, a line graph, etc.), a chart (e.g., a pie chart, etc), or some other type of visual (i.e., graphical or non-graphical) representation.

Time spent section 2105 may indicate a duration of time (e.g., hours, days, etc.) that the user has spent using music instruction system 115. Sessions started section 2110 may indicate the number of sessions the user started. Sessions completed section 2115 may indicate the number of sessions the user completed. High score section 2120 may indicate the user's highest score. Session difficulty section 2125 may indicate a difficulty level associated with sessions. Average score section 2130 may indicate an average score and accuracy section 2135 may indicate a measure of accuracy associated with the user's performances.

According to an exemplary implementation, music instruction system 115 may store a user's performance data in a database. For example, the database may reside on a remote device (e.g., a server, etc.) which may be accessed by music instruction system 115 through a network connection (e.g., the Internet). In other instances, when a network connection is not available, music instruction system 115 store performance data in memory/storage 210. The performance data collected by music instruction system 115 may be presented to the user. In this way, the user may gain insight into his/her progress. Additionally, music instruction system 115 may permit the user to share his/her performance data with other users, parents, music instructors, friends, etc. For example, other users, etc., may access the remote device. The remote device may store various types of information (e.g., statistics, scores, performance videos, etc.) among users of music instruction system 115 that wish to have their performance data available to others. According to an exemplary implementation, the remote device may provide security measures (e.g., require a log-in, etc.) to maintain privacy, etc. The remote device may also provide updates (e.g. software updates) to music instruction system 115.

Figure 22:
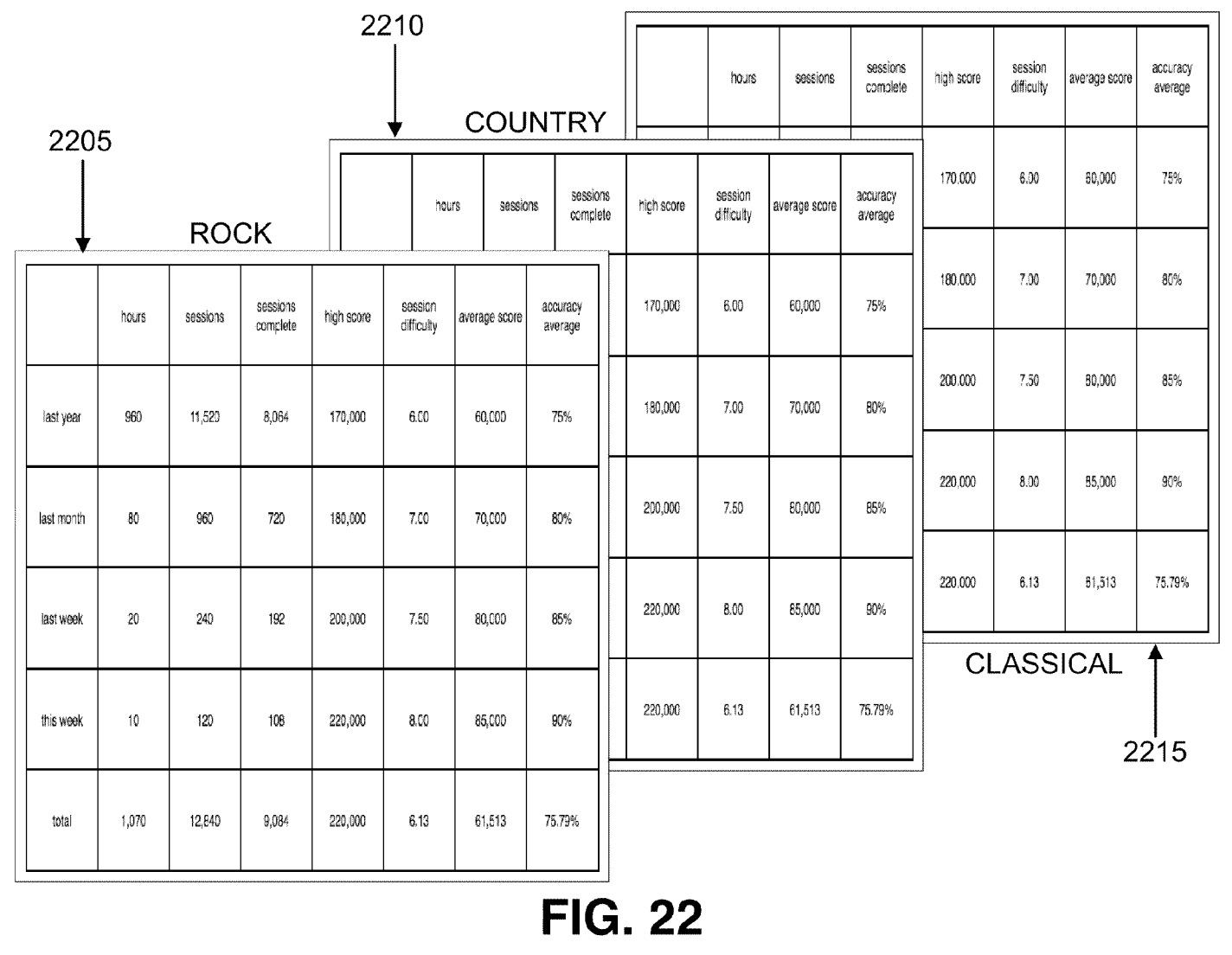

FIG. 22 illustrates an exemplary process in which music instruction system 115 may track the skill of the user according to musical genres. For example, the musical genres may include rock, country, classical, jazz, blues, pop, etc. According to an exemplary implementation, music instruction system 115 may gather performance data and store the performance data in one or multiple suitable musical genres. For example, as illustrated in FIG. 22, performance data may be stored in a rock genre 2205, a country genre 2210, or a classical genre 2215. Musical pieces may be mapped to one or multiple musical genres.

Depending on the user's goals, music instruction system 115 may allow a user to recognize his/her proficiency with respect to multiple musical genres. This may be beneficial to the user's overall musical development. For example, users may develop a repertoire (e.g., a set of songs, compositions, harmonies, scales, etc.) that in aggregate may assist users in developing their musical abilities and musical knowledge.

FIG. 23 is a diagram illustrating an exemplary conversion chart 2300 that may be used by music instruction system 115. As illustrated, conversion chart 2300 may relate to a musical instrument, such as a guitar (e.g., a six string guitar) in which on the vertical axes, notes E, B, G, D, A, and E are included, along with frequency, MIDI note and note octave information, and on the horizontal axes, fret position information is presented. Depending on the musical instrument and/or tuning of the musical instrument, music instruction system 115 may use a suitable conversion chart.

According to an exemplary implementation, music instruction system 115 may automatically derive expected musical events from performance cue data based on conversion chart 2300. For example, music instruction system 115 may use conversion chart 2300 to derive performance data 420 from performance cues 415. According to another implementation, music instruction system 115 may use conversion chart 2300 to derive performance cues 415 from performance data 420.

Figure 24:
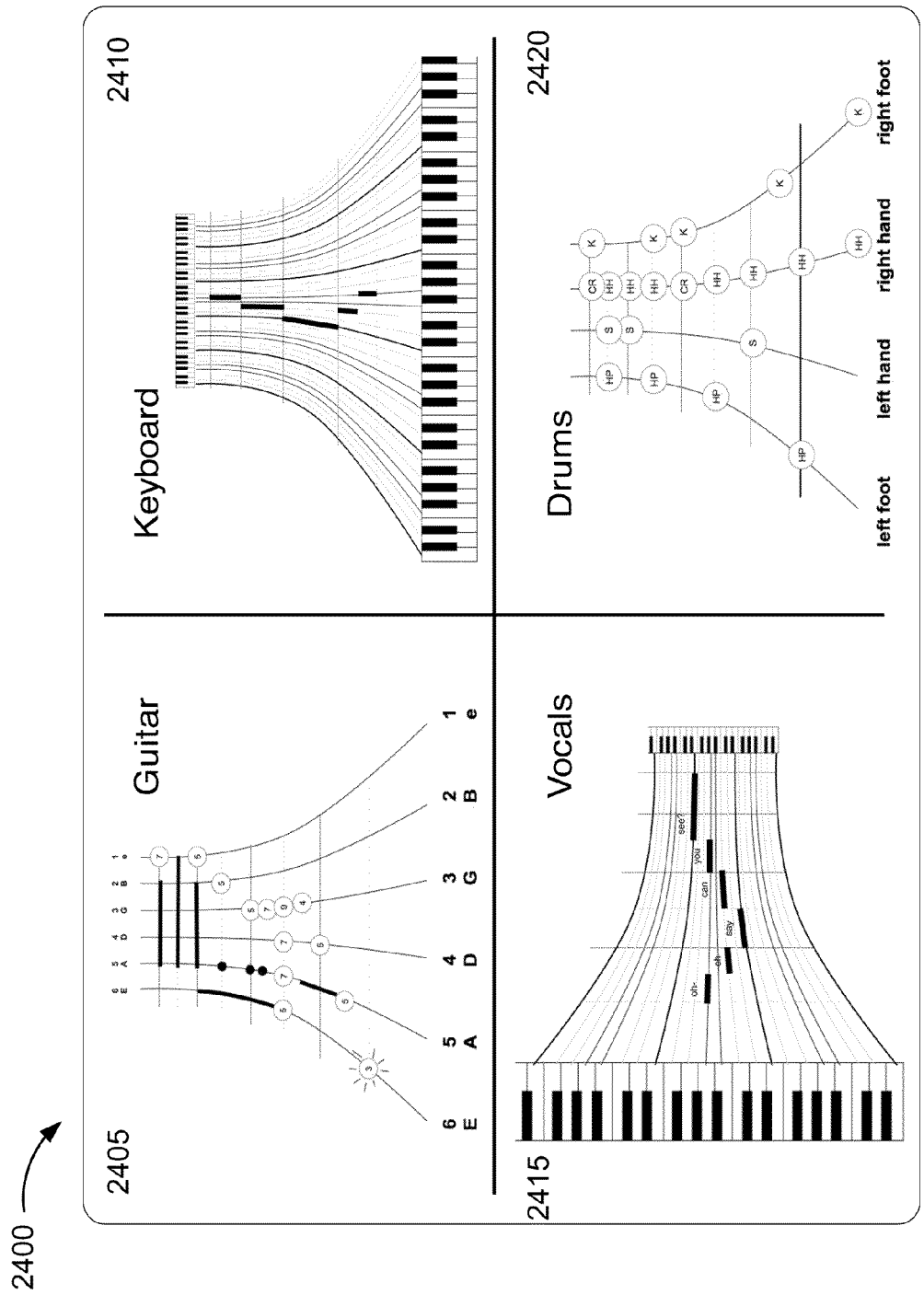
FIG. 24 is a diagram illustrating an exemplary user interface of the music instruction system that includes exemplary visuals for multiple users.

According to an exemplary embodiment, music instruction system 115 may provide user interfaces for multiple users simultaneously, rather than for a single user. For example, music instruction system 115 may provide user interfaces to multiple users that are performing on the same or different musical instruments. For example, FIG. 24 is a diagram illustrating an exemplary user interface 2400 that include exemplary visuals for multiple users. As illustrated, user interface 2400 may include a guitar section 2405, a keyboard section 2410, a vocals section 2415, and a drums section 2420. In this way, users may play a musical piece together with music instruction system 115. Under such circumstances, each user may have an input to music instruction system 115. According to an exemplary implementation, music instruction system 115 may provide only one accompaniment audio track 410 for all of the users. However, accompaniment audio track 410 may include a multi-channel recording in which each channel includes the sound of a different musical instrument. Music instruction system 115 may permit a user to select the musical instrument to playback. By way of example, but not limited thereto, the playback of the accompaniment audio track 410 may only include musical instruments that are not being performed by the group of users.

As previously described, music instruction system 115 may include input 225, such as mouse 135 and keyboard 130, to allow the user to navigate, enter information, and/or interact with music instruction system 115. However, interacting with music instruction system 115 may be burdensome because the user may have to keep switching hands between the musical instrument and input 225. According to an exemplary implementation, music instruction system 115 may allow the user to input notes or percussive inputs to interact, navigate, etc., with music instruction system 115. In other words, music instruction system 115 may map notes or percussive inputs to, for example, keystrokes, mouse clicks, and/or other types of input commands. For example, music instruction system 115 may allow the user to start or stop a session based on playing a particular note or sequence of notes. Additionally, music instruction system 115 may allow the user to access various user interfaces provided by music instruction system 115 in correspondence to the user playing a particular note or sequence of notes. Additionally, or alternatively, music instruction system 115 may respond to vocal commands (e.g., words, phrases, etc).

According to an exemplary embodiment, a user may perform a musical piece during a session. Music instruction system 115 may provide user interfaces to allow the user to select, among other things, the musical piece, a session difficulty level (e.g., beginner, novice, skilled, advanced, prodigy, or the like), the type of performance cues (e.g., a tablature, a standard music notation, etc.), and the musical instrument. When the user is ready to perform, music instruction system 115 may provide performance cues and music accompaniment. Music instruction system 115 may evaluate the user's performance and provide feedback (e.g., positive or negative) to the user in real-time or near real time, as well as performance results (e.g., scores, etc.). Music instruction session 115 may provide performance results to the user when the session is completed. Described below is an exemplary process for providing a session to the user.

Figure 25B:
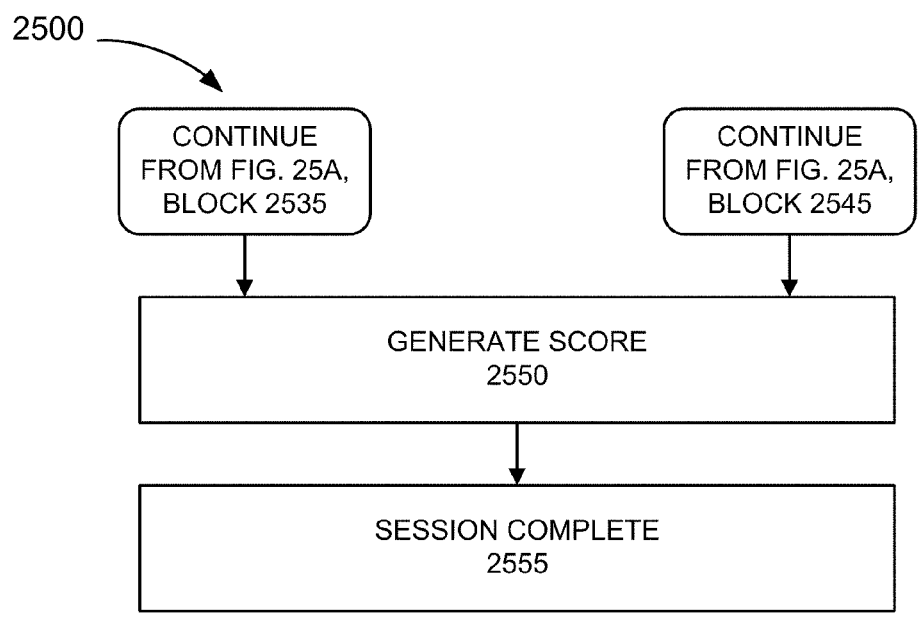

FIGS. 25A-25B are flow diagrams illustrating an exemplary process 2500 in which music instruction system 115 may provide a session to a user.

Process 2500 may include receiving user settings (block 2505). For example, a user may prepare his/her musical instrument before his/her performance. Music instruction system 115 may receive various user settings, such as, for example, tuning, input levels (e.g., musical instrument level, master level, accompaniment level, etc.), effect levels (e.g., mix level, digital audio effects level, etc.), selection of a musical piece, tempo setting, selection of a difficulty level, etc. Music instruction system 115 may provide other types of user settings. For example, the user may be guided through steps to set the musical instrument to a pitch corresponding to the musical data (e.g., an expert performance audio track, an accompaniment audio track).

A session may be prepared (block 2510). For example, music instruction system 115 may load and/or align the musical data (e.g., an expert performance track, an accompaniment track, etc.), initialize time-codes, initialize a session interface, etc.

Performance cues and accompaniment may be provided (block 2515). For example, according to one implementation, music instruction system 115 may begin playing auditory musical piece data. For example, music instruction system 115 may play an accompaniment audio track. According to other exemplary implementations, music instruction system 115 may begin playing both an accompaniment audio track and an expert audio track. Music instruction system 115 may provide a user with appropriate performance cues. The performance cues may be synchronized to the auditory musical piece data.

A performance of the user may be detected (block 2520). For example, music instruction system 115 may detect the user's performance of his/her musical instrument. Depending on the musical instrument, music instruction system 115 may receive performance data via a microphone, a pickup, or directly from the musical instrument via line out, MIDI, or other methods. Music instruction system 115 may utilize the performance data to generate waveforms, MIDI files, etc.

A performance evaluation may be determined (block 2525). For example, music instruction system 115 may compare the received performance data to expected performance data, as previously described. Music instruction system 115 may determine which musical events have been correctly played and which musical events have been incorrectly played. According to exemplary implementation, as previously described, music instruction system 115 may use various tolerances to determine which musical events have been correctly or incorrectly played, and to what extent the musical events have been correctly or incorrectly played.

According to an exemplary implementation, the tolerances may vary depending on a session difficulty level setting. For example, with reference to a frequency-based tolerance, a session difficulty level of "hard" may allow only a 2 Hz difference frequency, or perhaps, a 0 Hz difference frequency with respect to a given musical event, while a session difficulty level of "easy" may allow a 10 Hz difference frequency, or perhaps more, for the same musical event. Additionally, the frequency-based tolerance with respect to the session difficulty level may vary according to the equal-tempered scale and/or other tuning system. That is, for example, the session difficulty level of "hard" may allow only a 2 Hz difference frequency for musical events between middle C and A (440 Hz), while musical events above A (440 Hz) may be allowed a frequency-based tolerance more than 2 Hz given the logarithmic nature of the equal-tempered scale. In this regard, music instruction system 115 may be flexible with regard to whether the musical event played by the user is, for example, sharp or flat, depending on the session difficulty level, the particular musical event, etc. According to an exemplary implementation, the tolerances may be user-configurable parameters. According to another exemplary implementation, music instruction system 115 may set default tolerances based on the session difficulty level.

According to an exemplary embodiment, the tolerances with respect to a particular musical characteristic may be static during a session. As previously described, tolerances may relate to various musical characteristics associated with musical events, such as, for example, amplitude, duration, frequency, amplitude contour, onset time, etc. When the tolerances are static during a session, a particular tolerance may be applied continuously throughout the musical piece regardless of the difficulty level of a passage within the musical piece. For example, a simple rhythmic passage within the musical piece may have the same onset time tolerance as a very complex rhythmic passage within the musical piece.

According to another exemplary embodiment, music instruction system 115 may use dynamic tolerances based on characteristics associated with the musical piece, such as, for example, tempo, register, difficulty of passage, syncopation associated with the musical piece, tempo changes, modulations, etc.

If it is determined that the performance evaluation is positive (block 2525-POSITIVE), positive feedback may be provided to the user (block 2530). For example, if it is determined musical events have been correctly played by the user, music instruction system 115 may provide positive feedback to the user. As previously described, music instruction system 115 may provide various visual cues and/or auditory cues to indicate varying levels of positive feedback to the user.

It may be determined whether the session is complete (block 2535). Music instruction system 115 may determine whether the session is complete (e.g., whether the musical piece has ended). If it is determined that the session is complete (block 2535—YES), process 2500 may proceed to block 2550 of FIG. 25B, described below. If it is determined that the session is not complete (block 2535—NO), process 2500 may proceed to block 2515. According to an exemplary implementation, music instruction system 115 may automatically increase the difficulty level of the musical piece, during the user's performance, when the performance has satisfied a performance-based threshold value and the user has been awarded positive feedback. For example, the performance-based threshold value may relate to time (e.g., playing the musical piece correctly for a certain period of time), number of musical events played correctly, number of consecutive musical events played correctly, or the like. According to other exemplary implementations, music instruction system 115 may not increase the difficulty level.

If it is determined that the performance evaluation is negative (block 2525—NEGATIVE), negative feedback may be provided to the user (block 2540). For example, if it is determined that notes have been incorrectly played, music instruction system 115 may provide negative feedback to the user. As previously described, music instruction system 115 may provide various visual cues and/or auditory cues to indicate varying levels of negative feedback to the user.

It may be determined whether the session is complete (block 2545). Music instruction system 115 may determine whether the session is complete (e.g., whether the musical piece has ended). If it is determined that the session is complete (block 2545—YES), process 2500 may proceed to block 2550 of FIG. 25B, described below. If it is determined that the session is not complete (block 2545—NO), process 2500 may proceed to block 2515. According to an exemplary implementation, music instruction system 115 may automatically decrease the difficulty level of the musical piece, during the user's performance, when the performance has not satisfied a performance-based threshold value and the user has been provided negative feedback. For example, the performance-based threshold value may relate to time (e.g., playing the musical piece incorrectly for a certain period of time), number of musical events played incorrectly, number of consecutive musical events played incorrectly, or the like. Additionally, or alternatively, according to an exemplary implementation, music instruction system 115 may automatically end a session when the user's performance falls below a performance-based threshold. According to other exemplary implementation, music instruction system 115 may not decrease the difficulty level and/or end the session based on the user's performance.

Referring to FIG. 25B, a score may be generated (block 2550). For example, music instruction system 115 may generate a score for the user, as well as other types of feedback information, such as performance-related statistics (e.g., missed musical events, correctly played musical events, etc.), as previously described.

The session is completed (block 2555). For example, music instruction system 115 may display the score results to the user. Music instruction system 115 may also display other types of information, such as, for example, areas for improvement (e.g., playing of chords, maintaining the tempo, etc.) and/or a user's skill level progression.

Although FIGS. 25A-25B illustrates an exemplary process 2500 for providing a session to a user, in other implementations, process 2500 may include additional operations, fewer operations, and/or different operations than those illustrated in FIGS. 25A-25B and described.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 12A-12C, 15, and 25A-25B, the order of the blocks may be modified in other implementations. Further, non-dependent blocks may be performed in parallel.

Embodiments described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" or a "component" that performs one or more functions. This logic or component may include hardware (e.g., processing system 205), a combination of hardware and software, a combination of hardware with firmware, or a combination of hardware, software and firmware.

In the preceding description, various embodiments have been described with reference to the accompanying drawings. It will, however, be evident that various modifications and changes may be made thereto, and additional embodiments may be implemented, without departing from the broader scope of the invention as set forth in the claims that follow. The description and the drawings are accordingly to be regarded as illustrative rather than restrictive.

No element, act, or instruction used in the present application should be construed as critical or essential to the implementations described herein unless explicitly described as such.

What is claimed is:

1. A method comprising:
   receiving a user selection of a musical piece;
   providing performance cues to a user to perform musical events on a musical instrument, wherein the performance cues are synchronized to expert performance data of the musical piece, wherein the expert performance data includes a pre-recorded audio track;
   providing the expert performance data to the user;
   receiving audio data corresponding to musical events performed by the user on the musical instrument;
   detecting fundamental frequencies associated with the user-performed musical events;
   determining an extent to which the user-performed musical events have been correctly or incorrectly performed;
   providing real-time or near real-time audio feedback, visual feedback and/or tactile feedback indicating the extent to which the user-performed musical events have been correctly or incorrectly performed; and
   using the expert performance data as real-time or near real-time audio or real-time or near real-time audio/video feedback by controlling an output level of the expert performance data that includes the pre-recorded audio track that is output to the user during a session.

2. The method of claim 1, further comprising:
   automatically adjusting a difficulty level of the musical piece during the session based on the extent to which user-performed musical events have been correctly or incorrectly performed.

3. The method of claim 1, wherein, when using the expert performance data, the user-performed musical events are muted and the output level of the expert performance data is increased when the user-performed musical events have been correctly performed.

4. The method of claim 1, wherein the detecting further comprises:
   detecting onsets of the user-performed musical events; and performing fundamental frequency detection on a set of contiguous blocks in the audio data that do not include the onsets.

5. The method of claim 4, wherein the detecting further comprises:
forming blocks of audio data having a first size to detect the onsets; and
forming blocks of audio data having a second size to detect the fundamental frequencies, wherein the first size is smaller than the second size.

6. The method of claim 4, wherein the detecting further comprises:
calculating a weighted sum of magnitudes associated with frequencies included in the audio data, wherein the weighted sum is calculated based on multipliers having values corresponding to indexes that are multiplied by the magnitudes.

7. The method of claim 1, wherein the determining comprises:
assigning one or more musical characteristic tolerances with respect to musical events associated with the musical piece, wherein each musical characteristic tolerance includes a range of values corresponding to a musical characteristic associated with the musical events; and
determining the extent to which the user-performed musical events are correctly or incorrectly performed based on the musical characteristic tolerances.

8. The method of claim 7, wherein the musical characteristic relates to one of frequency, amplitude, onset time, release time, or duration, and wherein the range of values assigned are based on a difficulty level of the session.

9. The method of claim 1, further comprising:
providing a video image of the user during a performance of the musical piece.

10. The method of claim 1, further comprising:
displaying a scrolling waveform corresponding to an expert performance of the musical piece; and
displaying a scrolling waveform corresponding to the user's performance of the musical piece.

11. The method of claim 1, wherein the providing of performance cues comprises:
displaying fingering positions for performing musical events, wherein the displaying includes a representation of a human hand.

12. The method of claim 1, further comprising:
providing score information to the user, wherein the score information includes error tendencies associated with the user's performance of the musical piece.

13. A device comprising:
one or more memories to store instructions; and
one or more processors to execute the instructions in the one or more memories to:
receive a user selection of a musical piece;
provide performance cues to a user to perform musical events associated with the musical piece on a musical instrument, wherein the performance cues are synchronized to expert performance data of the musical piece, and wherein the expert performance data includes a pre-recorded audio track;
provide the expert performance data to the user;
receive audio data from the musical instrument, wherein the audio data comprises user-performed musical events;
detect fundamental frequencies associated with the user-performed musical events;
determine an extent to which the user-performed musical events have been correctly or incorrectly performed based on one or more musical characteristic tolerances associated with the musical events; and
provide real-time or near real-time visual feedback and/or audio feedback to the user, by controlling an output level of the expert performance data that includes the pre-recorded audio track, that indicates the extent to which the user-performed musical events have been correctly or incorrectly performed based on the determining.

14. The device of claim 13, wherein the performance cues are synchronized to expert performance data corresponding to an expert performance of the musical piece.

15. The device of claim 14, wherein the one or more processors are to execute instructions to:
provide the expert performance data as visual feedback to the user, wherein a visual clarity of a displaying of the expert performance data is based on the extent to which the user-performed musical events have been played correctly or not, wherein the expert performance data includes a pre-recorded visual track.

16. The device of claim 13, wherein the one or more processors are to execute instructions to:
introduce one or more first signal processing audio effects to an audio output of the user-performed musical events when it is determined that the user-performed musical events have been correctly performed; and
introduce one or more second signal processing audio effects to the output of the user-performed musical events when it is determined that the user-performed musical events have not been correctly performed, wherein the one or more first signal processing audio effects enhance the user-performed musical events and the one or more second signal processing audio effects diminish the user-performed musical events.

17. The device of claim 13, wherein the device comprises at least one of a game system, a computer, or a portable communication device.

18. The device of claim 13, wherein the one or more processors are to execute instructions to:
display scrolling tablatures that include the performance cues, wherein the scrolling tablatures include a graphical representation of the musical instrument and the performance cues include visual cues corresponding to the musical events.

19. The device of claim 13, wherein when detecting the fundamental frequencies, the one or more processors are to execute instructions to:
form first blocks of audio data having a first size to detect onsets of the user-performed musical events; and
form second blocks of audio data having a second size to detect fundamental frequencies, wherein the first size is smaller than the second size, and the second blocks include a set of contiguous first blocks that do not include the onsets.

20. The device of claim 13, wherein each musical characteristic tolerance includes a range of values corresponding to a musical characteristic associated with the musical events, wherein the musical characteristic includes at least one of frequency, amplitude, onset time, release time, rhythm, or duration, and each range of values includes a value corresponding to an expert performance of the musical events, and wherein when determining whether the user-performed musical events have been correctly or incorrectly performed, the one or more processors are to execute instructions to:
evaluate the musical characteristics associated with the user-performed musical events;

compare values corresponding to the musical characteristics associated with the user-performed musical events to the range of values; and determine an extent to which the user-performed musical events have been correctly or incorrectly performed based on the comparing.

21. The device of claim 13, wherein the one or more processors are to execute instructions to:

map notes performed on the musical instrument as input commands to allow the user to navigate and interact with user interfaces associated with the device.

22. The device of claim 13, wherein the one or more processors are to execute instructions to:

calculate a score corresponding to whether the user-performed musical events have been correctly or incorrectly performed, wherein the score is calculated based on a difficulty level assigned to the musical piece; and display the score to the user.

23. The device of claim 13, wherein the one or more processors are to execute instructions to:

output to a display one or more of a virtual mentor, an instructor, or a coach that provides audio feedback and visual feedback to the user during a session or a video image of the user during the session.

24. The device of claim 13, wherein the one or more processors are to execute instructions to:

calculate a weighted sum of magnitudes associated with frequencies included with the user-performed musical events, wherein the weighted sum is calculated based on multipliers having values corresponding to indexes that are multiplied by the magnitudes.

25. A computer-readable medium containing instructions executable by at least one processor, the computer-readable medium storing instructions to:

receive a user selection of a musical piece;

provide performance cues to a user to perform musical events associated with the musical piece on a musical instrument, wherein the performance cues are synchronized to expert performance data of the musical piece, wherein the expert performance data includes a pre-recorded audio track;

provide the expert performance data to the user;

receive audio data from the musical instrument, wherein the audio data comprises user-performed musical events;

determine whether to detect fundamental frequencies associated with the user-performed musical events based on at least one of the audio data or the musical instrument;

determine an extent to which the user-performed musical events have been correctly or incorrectly performed; and provide feedback to the user indicating the extent to which the user-performed musical events have been correctly performed based on the determining, wherein the feedback includes controlling an output level of the expert performance data that includes the pre-recorded audio track that is output to the user during a session.

26. The computer-readable medium of claim 25, further comprising one or more instructions to:

detect fundamental frequencies associated with the user-performed musical events;

calculate a weighted sum of magnitudes associated with frequencies included with the user-performed musical events;

detect onsets of the user-performed musical events;

perform fundamental frequency detection on a set of contiguous blocks of the audio data that do not include the onsets; and calculate peak estimations associated with frequencies included in the set of contiguous blocks.

27. The computer-readable medium of claim 26, further comprising one or more instructions to:

calculate the weighted sum based on multipliers having values corresponding to indexes that are multiplied by the magnitudes.

28. The computer-readable medium of claim 25, further comprising one or more instructions to:

store performance statistics associated with the user according to a genre of the musical piece.

29. The computer-readable medium of claim 25, further comprising one or more instructions to:

provide different levels of difficulties for performing the musical piece;

receive a user selection of one of the levels of difficulties;

automatically increase a difficulty level of the musical piece during a session when the extent to which the user-performed musical events have been correctly performed exceeds a first threshold value;

automatically decrease a difficulty level of the musical piece during the session when the extent to which the user-performed musical events been incorrectly performed is below a second threshold value; and automatically end the session when the extent to which the user-performed musical events have been incorrectly performed is below a stoppage threshold value.

30. The computer-readable medium of claim 25, further comprising one or more instructions to:

store a database that includes data related to the user's progress occurring over multiple sessions.

* * * * *

UNITED STATES PATENT AND TRADEMARK OFFICE
CERTIFICATE OF CORRECTION

| | |
|---|---|
| PATENT NO. | : 8,629,342 B2 |
| APPLICATION NO. | : 12/775665 |
| DATED | : January 14, 2014 |
| INVENTOR(S) | : Lee et al. |

Page 1 of 1

It is certified that error appears in the above-identified patent and that said Letters Patent is hereby corrected as shown below:

In the Claims:

At column 44, line 41, change the term "events been" to "events have been".

Signed and Sealed this
Thirteenth Day of May, 2014

Michelle K. Lee
*Deputy Director of the United States Patent and Trademark Office*